United States Patent
Royer et al.

(10) Patent No.: US 12,523,821 B2
(45) Date of Patent: Jan. 13, 2026

(54) TELECOMMUNICATIONS CONNECTOR WITH LATCH RELEASE MECHANISM

(71) Applicant: CommScope Technologies LLC, Hickory, NC (US)

(72) Inventors: Tyler John Royer, York, PA (US); Robert Charles Flaig, Lancaster, PA (US); Michael S. Riegel, Bonfield, IL (US); Michael Lawrence Gurreri, York, PA (US); Brent Campbell, Minneapolis, MN (US); Adam Verne Broughton, Harrisburg, PA (US); David John Anderson, Bloomington, MN (US); Michael Aaron Kadar-Kallen, Harrisburg, PA (US); Josiah D. Kadar-Kallen, Harrisburg, PA (US); Michael W. Zitsch, Cumberland, PA (US)

(73) Assignee: CommScope Technologies LLC, Claremont, NC (US)

( * ) Notice: Subject to any disclaimer, the term of this patent is extended or adjusted under 35 U.S.C. 154(b) by 285 days.

(21) Appl. No.: 18/553,959

(22) PCT Filed: Apr. 6, 2022

(86) PCT No.: PCT/US2022/023720
§ 371 (c)(1),
(2) Date: Oct. 4, 2023

(87) PCT Pub. No.: WO2022/216861
PCT Pub. Date: Oct. 13, 2022

(65) Prior Publication Data
US 2024/0192449 A1    Jun. 13, 2024

Related U.S. Application Data

(60) Provisional application No. 63/172,319, filed on Apr. 8, 2021.

(51) Int. Cl.
*G02B 6/36* (2006.01)
*G02B 6/38* (2006.01)

(52) U.S. Cl.
CPC ......... *G02B 6/3831* (2013.01); *G02B 6/3825* (2013.01); *G02B 6/38875* (2021.05)

(58) Field of Classification Search
CPC ................ G02B 6/3831; G02B 6/3825; G02B 6/38875; G02B 6/3879; G02B 6/3893; G02B 6/36
See application file for complete search history.

(56) References Cited

U.S. PATENT DOCUMENTS

| 5,011,424 A | 4/1991 | Simmons |
| 5,090,916 A | 2/1992 | Magnier |

(Continued)

FOREIGN PATENT DOCUMENTS

| CN | 1658441 A | 8/2005 |
| CN | 1770568 A | 5/2006 |

(Continued)

OTHER PUBLICATIONS

Extended European Search Report for European Patent Application No. 21812515.1 mailed Jun. 14, 2024, 10 pages.

(Continued)

*Primary Examiner* — Jennifer Doan
(74) *Attorney, Agent, or Firm* — Merchant & Gould P.C.

(57) ABSTRACT

The present disclosure relates to a telecommunications connector. The connector includes at least one connector portion including a front housing portion coupled to a rear housing portion. The front housing portion defines a front end and a rear end, the front housing portion including a ferrule terminating a cable fixed to the at least one connector portion, the front housing portion further including a latch that is configured to contact a fiber optic adapter for locking the connector to the fiber optic adapter when the connector (Continued)

is inserted into the fiber optic adapter, wherein the latch is movable about a connection location on the front housing portion. The latch defines a permanently attached rear extension that extends rearward past the rear end of the front housing portion, the rear extension configured to be contacted for moving the latch for freeing the connector from the fiber optic adapter.

33 Claims, 57 Drawing Sheets

(56) References Cited

U.S. PATENT DOCUMENTS

| | | |
|---|---|---|
| 5,123,071 A | 6/1992 | Mulholland et al. |
| 5,211,572 A | 5/1993 | Comstock et al. |
| 5,315,679 A | 5/1994 | Baldwin et al. |
| 5,335,301 A | 8/1994 | Newman et al. |
| 5,462,457 A | 10/1995 | Schroepfer et al. |
| 5,481,634 A | 1/1996 | Anderson et al. |
| 5,574,812 A | 11/1996 | Beier et al. |
| 5,579,425 A | 11/1996 | Lampert et al. |
| 5,638,474 A | 6/1997 | Lampert et al. |
| 5,651,690 A | 7/1997 | Klas et al. |
| 5,675,682 A | 10/1997 | De Marchi |
| 6,024,498 A | 2/2000 | Carlisle et al. |
| 6,076,974 A | 6/2000 | Carlisle et al. |
| 6,164,835 A | 12/2000 | Imasaki |
| 6,196,733 B1 | 3/2001 | Wild |
| 6,250,817 B1 | 6/2001 | Lampert et al. |
| 6,250,942 B1 | 6/2001 | Lemke et al. |
| 6,250,949 B1 | 6/2001 | Lin |
| 6,254,418 B1 | 7/2001 | Tharp et al. |
| 6,276,839 B1 | 8/2001 | De Marchi |
| 6,325,547 B1 | 12/2001 | Cammons et al. |
| 6,357,934 B1 | 3/2002 | Driscoll et al. |
| 6,364,685 B1 | 4/2002 | Manning |
| 6,409,392 B1 | 6/2002 | Lampert et al. |
| 6,435,732 B1 | 8/2002 | Asao et al. |
| 6,443,627 B1 | 9/2002 | Anderson et al. |
| 6,447,170 B1 | 9/2002 | Takahashi et al. |
| 6,565,262 B2 | 5/2003 | Childers et al. |
| 6,692,289 B2 | 2/2004 | Nemoto |
| 6,776,645 B2 | 8/2004 | Roth et al. |
| 6,848,836 B2 | 2/2005 | Ueda et al. |
| 6,863,556 B2 | 3/2005 | Viklund et al. |
| 6,885,560 B2 | 4/2005 | Zaremba |
| 6,994,580 B1 | 2/2006 | Chen |
| 7,018,108 B2 | 3/2006 | Makhlin et al. |
| 7,037,129 B2 | 5/2006 | Lo et al. |
| 7,052,186 B1 | 5/2006 | Bates |
| 7,101,212 B1 | 9/2006 | Larkin |
| 7,163,414 B2 | 1/2007 | Lo et al. |
| 7,281,856 B2 | 10/2007 | Grzegorzewska et al. |
| 7,281,938 B1 | 10/2007 | Wu |
| 7,297,013 B2 | 11/2007 | Caveney et al. |
| 7,326,075 B1 | 2/2008 | Armstrong et al. |
| 7,329,137 B2 | 2/2008 | Martin et al. |
| 7,341,383 B2 | 3/2008 | Droege et al. |
| 7,354,292 B1 | 4/2008 | Lloyd et al. |
| 7,413,473 B2 | 8/2008 | Wu |
| 7,421,181 B2 | 9/2008 | Kanou et al. |
| 7,425,159 B2 | 9/2008 | Lin |
| 7,440,670 B2 | 10/2008 | Kanou et al. |
| 7,445,484 B2 | 11/2008 | Wu |
| 7,465,180 B2 | 12/2008 | Kusuda et al. |
| 7,500,790 B2 | 3/2009 | Erdman et al. |
| 7,534,125 B1 | 5/2009 | Schroll |
| 7,534,128 B2 | 5/2009 | Caveney et al. |
| 7,537,393 B2 | 5/2009 | Anderson et al. |
| 7,549,888 B1 | 6/2009 | Armstrong et al. |
| 7,572,065 B2 | 8/2009 | Lu et al. |
| 7,588,373 B1 | 9/2009 | Sato et al. |
| 7,594,766 B1 | 9/2009 | Sasser et al. |
| 7,632,125 B2 | 12/2009 | Irwin et al. |
| 7,641,398 B2 | 1/2010 | O'Riorden et al. |
| 7,651,361 B2 | 1/2010 | Henry et al. |
| 7,666,023 B2 | 2/2010 | Wu |
| 7,690,939 B2 | 4/2010 | Wu |
| 7,736,171 B2 | 6/2010 | Reed et al. |
| 7,744,288 B2 | 6/2010 | Lu et al. |
| 7,753,710 B2 | 7/2010 | George |
| 7,758,257 B2 | 7/2010 | Anderson et al. |
| 7,771,225 B1 | 8/2010 | Wu |
| 7,892,012 B1 | 2/2011 | Foung |
| 7,997,806 B2 | 8/2011 | Nakagawa |
| 8,043,013 B2 | 10/2011 | Lichoulas et al. |
| 8,109,679 B2 | 2/2012 | Danley et al. |
| 8,152,384 B2 | 4/2012 | De Jong et al. |
| 8,152,385 B2 | 4/2012 | De Jong et al. |
| 8,187,018 B2 | 5/2012 | Kosugi |
| 8,221,007 B2 | 7/2012 | Peterhans et al. |
| 8,235,745 B1 | 8/2012 | Armstrong et al. |
| 8,267,712 B2 | 9/2012 | Huang et al. |
| 8,317,406 B2 | 11/2012 | Tamekuni et al. |
| 8,317,408 B2 | 11/2012 | Nakagawa |
| 8,317,532 B2 | 11/2012 | Kosugi |
| 8,382,506 B2 | 2/2013 | Reed et al. |
| 8,465,317 B2 | 6/2013 | Gniadek et al. |
| 8,506,174 B2 | 8/2013 | Nakagawa |
| 8,556,645 B2 | 10/2013 | Crain |
| 8,559,781 B2 | 10/2013 | Childers et al. |
| 8,646,989 B2 | 2/2014 | Zimmel et al. |
| 8,678,669 B2 | 3/2014 | Lee |
| 8,690,593 B2 | 4/2014 | Anderson et al. |
| 8,702,323 B2 | 4/2014 | Nhep |
| 8,747,141 B2 | 6/2014 | Crain |
| 8,753,022 B2 | 6/2014 | Schroeder et al. |
| 8,764,308 B2 | 7/2014 | Irwin et al. |
| 8,770,862 B2 | 7/2014 | Lu et al. |
| 8,770,863 B2 | 7/2014 | Cooke et al. |
| 8,821,034 B2 | 9/2014 | Kwasny |
| 8,834,038 B2 | 9/2014 | Limbert et al. |
| 8,840,320 B2 | 9/2014 | Park et al. |
| 8,864,390 B2 | 10/2014 | Chen et al. |
| 8,870,466 B2 | 10/2014 | Lu |
| 8,876,403 B2 | 11/2014 | Katoh |
| 8,894,298 B2 | 11/2014 | Wakjira et al. |
| 8,979,569 B2 | 3/2015 | Aekins |
| 8,989,541 B2 | 3/2015 | Zimmel |
| 8,998,505 B2 | 4/2015 | Motofuji |
| 9,063,296 B2 | 6/2015 | Dong et al. |
| 9,103,995 B2 | 8/2015 | Park et al. |
| 9,116,306 B2 | 8/2015 | Li et al. |
| 9,122,022 B2 | 9/2015 | Wakjira et al. |
| 9,140,858 B2 | 9/2015 | Xiong |
| 9,151,923 B2 | 10/2015 | Nielson et al. |
| 9,158,076 B2 | 10/2015 | Guo et al. |
| 9,246,262 B2 | 1/2016 | Brown et al. |
| 9,297,976 B2 | 3/2016 | Hill, II et al. |
| 9,395,499 B2 | 7/2016 | Huang et al. |
| 9,448,366 B2 | 9/2016 | Lichoulas et al. |
| 9,448,368 B2 | 9/2016 | Wei et al. |
| 9,448,370 B2 | 9/2016 | Xue et al. |
| 9,494,744 B2 | 11/2016 | de Jong |
| 9,500,816 B2 | 11/2016 | Lu |
| 9,507,101 B2 | 11/2016 | Wong et al. |
| 9,551,842 B2 | 1/2017 | Theuerkorn |
| 9,557,495 B2 | 1/2017 | Raven et al. |
| 9,563,024 B2 | 2/2017 | Zhong et al. |
| 9,570,852 B2 | 2/2017 | Plamondon et al. |
| 9,588,304 B2 | 3/2017 | Durrant et al. |
| 9,595,786 B1 | 3/2017 | Takano et al. |
| 9,599,778 B2 | 3/2017 | Wong et al. |
| 9,638,871 B2 | 5/2017 | Bund et al. |
| 9,664,862 B2 | 5/2017 | Lu et al. |
| 9,678,283 B1 | 6/2017 | Chang et al. |
| 9,709,751 B2 | 7/2017 | Park |
| 9,733,123 B2 | 8/2017 | Marple et al. |
| 9,733,436 B2 | 8/2017 | Van Baelen et al. |
| 9,739,955 B2 | 8/2017 | Lee |
| 9,761,998 B2 | 9/2017 | De Dios Martin et al. |
| 9,766,413 B2 | 9/2017 | Zimmel et al. |
| 9,825,403 B2 | 11/2017 | De Dios Martin et al. |

(56) References Cited

U.S. PATENT DOCUMENTS

| | | |
|---|---|---|
| 9,829,644 B2 | 11/2017 | Nguyen et al. |
| 9,829,650 B2 | 11/2017 | Irwin et al. |
| 9,829,653 B1 | 11/2017 | Nishiguchi |
| 9,829,657 B2 | 11/2017 | Lee |
| 9,846,284 B2 | 12/2017 | Griffiths et al. |
| 9,864,151 B2 | 1/2018 | Lu |
| 9,869,825 B2 | 1/2018 | Bailey et al. |
| 9,910,224 B2 | 3/2018 | Liu et al. |
| 9,927,582 B2 | 3/2018 | Chang et al. |
| 9,933,584 B2 | 4/2018 | Lin |
| 9,946,035 B2 | 4/2018 | Gustafson et al. |
| 9,946,036 B2 | 4/2018 | Carapella et al. |
| 9,958,621 B2 | 5/2018 | Wong et al. |
| 9,971,103 B2 | 5/2018 | de Jong et al. |
| 9,989,712 B1 | 6/2018 | Takano et al. |
| 9,991,635 B2 | 6/2018 | De Dios Martin et al. |
| 10,007,069 B2 | 6/2018 | Zseng |
| 10,012,801 B2 | 7/2018 | Foung |
| 10,012,805 B2 | 7/2018 | Anderson et al. |
| 10,054,747 B2 | 8/2018 | Lee |
| 10,067,301 B2 | 9/2018 | Murray et al. |
| 10,071,497 B2 | 9/2018 | Gregorski |
| 10,114,179 B2 | 10/2018 | Kamada et al. |
| 10,114,180 B2 | 10/2018 | Suzic |
| 10,120,138 B2 | 11/2018 | Jones |
| 10,126,508 B2 | 11/2018 | Compton et al. |
| 10,146,018 B2 | 12/2018 | Griffiths et al. |
| 10,158,194 B2 | 12/2018 | Takano et al. |
| 10,191,227 B2 | 1/2019 | Lee |
| 10,228,516 B2 | 3/2019 | Veatch et al. |
| 10,254,495 B2 | 4/2019 | Lu |
| 10,288,817 B2 | 5/2019 | Nguyen et al. |
| 10,288,819 B2 | 5/2019 | Chang et al. |
| 10,295,758 B2 | 5/2019 | Chen |
| 10,295,759 B2 | 5/2019 | Wong et al. |
| 10,302,878 B2 | 5/2019 | Anderson et al. |
| 10,338,323 B2 | 7/2019 | Reagan |
| D860,142 S | 9/2019 | Childers et al. |
| 10,444,442 B2 | 10/2019 | Takano et al. |
| 10,451,817 B2 | 10/2019 | Lu |
| 10,451,830 B2 | 10/2019 | Szumacher et al. |
| 10,466,425 B2 | 11/2019 | Liu et al. |
| 10,473,865 B2 | 11/2019 | Wakjira et al. |
| 10,520,683 B2 | 12/2019 | Nhep |
| 10,520,687 B2 | 12/2019 | Lee |
| 10,520,690 B2 | 12/2019 | Takano et al. |
| 10,545,296 B2 | 1/2020 | Murray et al. |
| 10,578,812 B2 | 3/2020 | Anderson et al. |
| 10,578,813 B2 | 3/2020 | Takano et al. |
| 10,585,247 B2 | 3/2020 | Takano et al. |
| 10,598,865 B2 | 3/2020 | Ott |
| 10,598,870 B2 * | 3/2020 | Lin ................ G02B 6/3825 |
| 10,620,384 B2 | 4/2020 | Iizumi et al. |
| 10,627,581 B2 | 4/2020 | Hsu et al. |
| 10,634,854 B2 | 4/2020 | Davidson et al. |
| 10,641,971 B2 | 5/2020 | Kamada et al. |
| 10,663,676 B2 | 5/2020 | Takano et al. |
| 10,663,678 B2 | 5/2020 | Andres |
| 10,684,423 B2 | 6/2020 | Chen |
| 10,712,507 B2 * | 7/2020 | Childers ............ G02B 6/3895 |
| 10,712,511 B2 | 7/2020 | Wong et al. |
| 10,712,512 B2 | 7/2020 | Ho et al. |
| 10,746,939 B2 | 8/2020 | Lu et al. |
| 10,754,102 B2 | 8/2020 | Zimmel et al. |
| 10,775,570 B2 | 9/2020 | Rossi et al. |
| 10,795,095 B2 | 10/2020 | Takano et al. |
| 10,802,228 B2 | 10/2020 | Dannoux et al. |
| 10,830,963 B2 | 11/2020 | Elenbaas et al. |
| 10,852,490 B2 | 12/2020 | Chang et al. |
| 10,866,371 B2 | 12/2020 | Gniadek |
| 10,877,224 B2 | 12/2020 | Lu et al. |
| 10,921,529 B2 | 2/2021 | Childers et al. |
| 10,928,594 B2 | 2/2021 | Iizumi et al. |
| 10,948,660 B2 | 3/2021 | Huang et al. |
| 10,948,664 B2 | 3/2021 | Takano et al. |
| 10,962,732 B2 | 3/2021 | Takano et al. |
| 10,983,286 B2 | 4/2021 | Takano et al. |
| 11,009,667 B2 | 5/2021 | Isenhour et al. |
| 11,036,011 B2 | 6/2021 | Wong et al. |
| 11,048,051 B2 | 6/2021 | Verheyden et al. |
| 11,061,190 B2 | 7/2021 | Takano et al. |
| 11,079,556 B2 | 8/2021 | Murray et al. |
| 11,086,087 B2 | 8/2021 | Wong et al. |
| 11,092,752 B2 | 8/2021 | Li |
| 11,112,567 B2 | 9/2021 | Higley et al. |
| 11,112,568 B2 | 9/2021 | Anderson et al. |
| 11,169,332 B2 | 11/2021 | Ott |
| 11,169,333 B2 | 11/2021 | Davidson et al. |
| 11,249,259 B2 | 2/2022 | Hu et al. |
| 11,275,218 B2 | 3/2022 | Otomitsu et al. |
| 11,314,021 B2 | 4/2022 | Takano et al. |
| 11,320,602 B2 | 5/2022 | Davidson et al. |
| 11,322,889 B2 | 5/2022 | De Dios Martin et al. |
| 11,327,240 B2 | 5/2022 | Van Baelen |
| 11,327,245 B2 | 5/2022 | Leeson |
| 11,327,246 B2 | 5/2022 | Qi et al. |
| 11,340,406 B2 | 5/2022 | Gniadek et al. |
| 11,347,007 B2 | 5/2022 | Fujita et al. |
| 11,378,754 B2 | 7/2022 | Leeson et al. |
| 11,385,414 B2 | 7/2022 | Isenhour et al. |
| 11,409,057 B2 | 8/2022 | Lu et al. |
| 11,415,760 B2 | 8/2022 | Takano et al. |
| 11,422,313 B2 | 8/2022 | Iizumi et al. |
| 11,435,532 B2 | 9/2022 | Fujita |
| 11,442,233 B2 | 9/2022 | Zhu et al. |
| 11,467,355 B2 | 10/2022 | Gniadek |
| 11,474,308 B2 | 10/2022 | Cloud et al. |
| 11,474,309 B2 | 10/2022 | Anderson et al. |
| 11,480,741 B2 | 10/2022 | Ho et al. |
| 11,487,064 B2 | 11/2022 | Isenhour et al. |
| 11,495,913 B2 | 11/2022 | Liu et al. |
| 11,506,848 B2 | 11/2022 | Higley et al. |
| 11,525,965 B2 | 12/2022 | Childers et al. |
| 11,531,169 B2 | 12/2022 | Gniadek |
| 11,531,176 B2 | 12/2022 | Wang et al. |
| 11,543,598 B2 | 1/2023 | Hsu |
| 11,555,968 B2 | 1/2023 | Ott |
| 11,555,969 B2 | 1/2023 | Compton et al. |
| 11,579,371 B2 | 2/2023 | Wimmer |
| 11,579,380 B2 | 2/2023 | Claver et al. |
| 11,585,987 B2 | 2/2023 | Crawford et al. |
| 11,592,627 B2 | 2/2023 | Higley et al. |
| 11,598,923 B2 | 3/2023 | Cui et al. |
| 11,604,319 B2 | 3/2023 | Murray et al. |
| 11,624,875 B2 | 4/2023 | Ho et al. |
| 11,630,267 B2 | 4/2023 | Lu et al. |
| 11,635,576 B2 | 4/2023 | Hu et al. |
| 11,650,376 B2 | 5/2023 | Leeson et al. |
| 11,650,379 B2 | 5/2023 | Higley |
| 11,675,137 B2 | 6/2023 | Takano et al. |
| 11,675,138 B2 | 6/2023 | Takano et al. |
| 11,681,106 B2 | 6/2023 | Conrad |
| 11,686,904 B2 | 6/2023 | Wang et al. |
| 11,693,191 B2 | 7/2023 | Lu |
| 11,719,893 B2 | 8/2023 | Higley et al. |
| 11,719,894 B2 | 8/2023 | Isenhour et al. |
| 11,740,413 B1 | 8/2023 | Huang et al. |
| 11,747,575 B2 | 9/2023 | Giglio et al. |
| 11,754,789 B2 | 9/2023 | Ott |
| 11,754,791 B2 | 9/2023 | Coenegracht |
| 11,768,331 B2 | 9/2023 | Hsu |
| 11,768,334 B2 | 9/2023 | Miller et al. |
| 11,782,224 B2 | 10/2023 | Nhep |
| 11,808,993 B2 | 11/2023 | Baca et al. |
| 11,815,724 B1 | 11/2023 | Higley et al. |
| 11,835,773 B2 | 12/2023 | Wu et al. |
| 11,846,813 B2 | 12/2023 | Childers et al. |
| 11,867,871 B2 | 1/2024 | Inaba et al. |
| 11,874,509 B2 | 1/2024 | Lin |
| 11,899,247 B2 | 2/2024 | Trezise |
| 11,906,794 B2 | 2/2024 | Higley et al. |
| 11,934,017 B2 | 3/2024 | Rosson |
| 11,966,088 B2 | 4/2024 | Leeson et al. |
| 11,971,583 B2 | 4/2024 | Nguyen et al. |

(56) References Cited

U.S. PATENT DOCUMENTS

| | | | |
|---|---|---|---|
| 11,971,585 B2 | 4/2024 | Van Baelen et al. |
| 11,971,587 B2 | 4/2024 | Higley |
| 11,982,847 B2 | 5/2024 | Cloud et al. |
| 12,001,062 B2 | 6/2024 | Conrad et al. |
| 12,013,580 B2 | 6/2024 | Higley et al. |
| 12,055,767 B2 | 8/2024 | Crawford et al. |
| 12,061,362 B2 | 8/2024 | Higley et al. |
| 12,066,667 B2 | 8/2024 | Paul |
| 12,078,850 B2 | 9/2024 | Borer et al. |
| 12,085,765 B2 | 9/2024 | Leeson et al. |
| 12,111,502 B2 | 10/2024 | Lu et al. |
| 12,158,621 B2 | 12/2024 | Smith et al. |
| 12,158,622 B2 | 12/2024 | Giglio et al. |
| 12,174,429 B2 | 12/2024 | Wu et al. |
| 12,181,717 B2 | 12/2024 | Good et al. |
| 12,181,718 B2 | 12/2024 | Lu et al. |
| 12,197,013 B2 | 1/2025 | Shinoda et al. |
| 12,197,018 B2 | 1/2025 | Backes |
| 12,204,153 B2 | 1/2025 | Claver et al. |
| 12,222,560 B2 | 2/2025 | Anderson et al. |
| 12,228,775 B2 | 2/2025 | Mendenhall et al. |
| 12,235,493 B2 | 2/2025 | Takano et al. |
| 12,242,117 B2 | 3/2025 | Davidson et al. |
| 12,248,184 B2 | 3/2025 | Hirose |
| 12,259,585 B2 | 3/2025 | Gniadek et al. |
| 12,265,265 B2 | 4/2025 | Carapella et al. |
| 12,276,843 B2 | 4/2025 | Lu et al. |
| 12,276,848 B2 | 4/2025 | Cloud et al. |
| 12,298,568 B2 | 5/2025 | Dannoux et al. |
| 12,298,570 B2 | 5/2025 | Verheyden |
| 12,313,889 B2 | 5/2025 | Gniadek et al. |
| 12,321,019 B2 | 6/2025 | Higley |
| 12,345,928 B2 | 7/2025 | Kanno |
| 2002/0090177 A1 | 7/2002 | Anderson et al. |
| 2003/0017729 A1 | 1/2003 | Huang |
| 2003/0147598 A1 | 8/2003 | McPhee et al. |
| 2003/0220008 A1 | 11/2003 | Viklund et al. |
| 2003/0220080 A1 | 11/2003 | Chuberre et al. |
| 2003/0220081 A1 | 11/2003 | Dykstra et al. |
| 2003/0220082 A1 | 11/2003 | Yoshida |
| 2003/0220083 A1 | 11/2003 | Lee et al. |
| 2003/0220084 A1 | 11/2003 | Makarov |
| 2003/0220085 A1 | 11/2003 | Khawand et al. |
| 2003/0220086 A1 | 11/2003 | Birkett |
| 2003/0220087 A1 | 11/2003 | Suhonen |
| 2003/0220088 A1 | 11/2003 | Cowley et al. |
| 2003/0220089 A1 | 11/2003 | Chang et al. |
| 2003/0222008 A1 | 12/2003 | Nightlinger et al. |
| 2004/0247252 A1 | 12/2004 | Ehrenreich et al. |
| 2005/0054230 A1 | 3/2005 | Huang |
| 2005/0058404 A1 | 3/2005 | Ngo |
| 2005/0101178 A1 | 5/2005 | Patterson |
| 2005/0124201 A1 | 6/2005 | Lo et al. |
| 2006/0049826 A1 | 3/2006 | Daneman et al. |
| 2006/0089039 A1 | 4/2006 | Caveney et al. |
| 2006/0276071 A1 | 12/2006 | Rossi |
| 2007/0049082 A1 | 3/2007 | Wu |
| 2007/0077806 A1 | 4/2007 | Martin et al. |
| 2007/0140621 A1 | 6/2007 | Decusatis et al. |
| 2007/0232118 A1 | 10/2007 | Wu |
| 2007/0298636 A1 | 12/2007 | Kusuda et al. |
| 2008/0030220 A1 | 2/2008 | Agarwal et al. |
| 2008/0226237 A1 | 9/2008 | O'Riorden et al. |
| 2009/0042424 A1 | 2/2009 | Kaneda |
| 2009/0047818 A1 | 2/2009 | Irwin et al. |
| 2009/0245732 A1 | 10/2009 | Murano |
| 2010/0216325 A1 | 8/2010 | Huang |
| 2010/0220961 A1 | 9/2010 | De Jong et al. |
| 2011/0058773 A1 | 3/2011 | Peterhans et al. |
| 2011/0081113 A1 | 4/2011 | Jones |
| 2011/0091159 A1 | 4/2011 | De Jong et al. |
| 2011/0123157 A1 | 5/2011 | Belsan et al. |
| 2011/0183541 A1 | 7/2011 | Kosugi |
| 2011/0217008 A1 | 9/2011 | Cline et al. |
| 2011/0299814 A1 | 12/2011 | Nakagawa |
| 2012/0057826 A1 | 3/2012 | Katoh |
| 2012/0141074 A1* | 6/2012 | Sabo ................ G02B 6/3885 385/78 |
| 2012/0155810 A1 | 6/2012 | Nakagawa |
| 2012/0208388 A1 | 8/2012 | Kosugi |
| 2012/0213478 A1 | 8/2012 | Chen et al. |
| 2012/0308183 A1 | 12/2012 | Irwin et al. |
| 2013/0115794 A1 | 5/2013 | Chang et al. |
| 2013/0163934 A1 | 6/2013 | Lee et al. |
| 2013/0301994 A1 | 11/2013 | Motofuji |
| 2013/0323949 A1 | 12/2013 | De Dios Martin et al. |
| 2014/0141641 A1 | 5/2014 | De Dios Martin et al. |
| 2014/0169727 A1 | 6/2014 | Veatch et al. |
| 2015/0016780 A1 | 1/2015 | Skluzacek et al. |
| 2015/0036982 A1 | 2/2015 | Nhep et al. |
| 2016/0116685 A1 | 4/2016 | Wong et al. |
| 2016/0349458 A1 | 12/2016 | Murray et al. |
| 2016/0356962 A1 | 12/2016 | Moriyama et al. |
| 2017/0031109 A1 | 2/2017 | Meadowcroft et al. |
| 2017/0052330 A1 | 2/2017 | Lee |
| 2017/0192183 A1 | 7/2017 | Wong et al. |
| 2017/0307831 A1 | 10/2017 | Katagiyama et al. |
| 2018/0217339 A1 | 8/2018 | Ma et al. |
| 2018/0267243 A1 | 9/2018 | Nhep et al. |
| 2018/0329158 A1 | 11/2018 | Chang |
| 2019/0154922 A1 | 5/2019 | Elenbaas et al. |
| 2019/0243072 A1 | 8/2019 | Takano et al. |
| 2020/0064564 A1 | 2/2020 | Ho et al. |
| 2020/0081198 A1 | 3/2020 | Takano et al. |
| 2020/0241216 A1 | 7/2020 | Iizumi et al. |
| 2020/0379192 A1 | 12/2020 | Ho et al. |
| 2021/0132301 A1 | 5/2021 | Anderson et al. |
| 2021/0356677 A1 | 11/2021 | Murray et al. |
| 2022/0269015 A1 | 8/2022 | Leeson |
| 2022/0368074 A1 | 11/2022 | De Dios Martin et al. |
| 2023/0031728 A1 | 2/2023 | Cloud et al. |
| 2023/0152530 A1 | 5/2023 | Lu et al. |
| 2023/0161112 A1 | 5/2023 | Ciechomski |
| 2023/0221500 A1 | 7/2023 | Elenbaas et al. |
| 2023/0244041 A1 | 8/2023 | Royer et al. |
| 2023/0266539 A1 | 8/2023 | Wilson et al. |
| 2023/0280544 A1 | 9/2023 | Murray et al. |
| 2023/0305238 A1 | 9/2023 | Petersen |
| 2023/0350136 A1 | 11/2023 | Higley et al. |
| 2024/0142724 A1 | 5/2024 | Ma |
| 2024/0302603 A1 | 9/2024 | Higley et al. |

FOREIGN PATENT DOCUMENTS

| | | |
|---|---|---|
| CN | 101065888 A | 10/2007 |
| CN | 101133524 A | 2/2008 |
| CN | 101160696 A | 4/2008 |
| CN | 101313441 A | 11/2008 |
| CN | 102365568 A | 2/2012 |
| CN | 103091793 A | 5/2013 |
| CN | 203705688 U | 7/2014 |
| CN | 102749682 B | 5/2015 |
| CN | 103837939 B | 3/2017 |
| CN | 210155362 | 3/2020 |
| EP | 1 271 706 A2 | 1/2003 |
| EP | 1 653 566 A1 | 5/2006 |
| EP | 1 855 360 A1 | 11/2007 |
| EP | 2 063 497 A1 | 5/2009 |
| EP | 2 144 100 A1 | 1/2010 |
| EP | 2 337 163 A1 | 6/2011 |
| JP | S63-184271 A | 7/1988 |
| JP | 2003-526116 A | 9/2003 |
| JP | 2005-189288 A | 7/2005 |
| JP | 4278148 B2 | 6/2009 |
| JP | 2012-128341 A | 7/2012 |
| JP | 4995305 B2 | 8/2012 |
| JP | 5085694 B2 | 11/2012 |
| JP | 5275953 B2 | 8/2013 |
| KR | 10-2006-0016122 A | 2/2006 |
| KR | 10-1800506 B1 | 11/2017 |
| WO | 2004/065999 A2 | 8/2004 |
| WO | 2005/041363 A1 | 5/2005 |
| WO | 2006/047258 A1 | 5/2006 |
| WO | 2007/044310 A1 | 4/2007 |

(56) References Cited

FOREIGN PATENT DOCUMENTS

| WO | 2009/135787 A1 | 11/2009 |
|---|---|---|
| WO | 2010/038283 A1 | 4/2010 |
| WO | 2012/054174 A1 | 4/2012 |
| WO | 2012/107439 A1 | 8/2012 |
| WO | 2012/107441 A1 | 8/2012 |
| WO | 2012/151175 A2 | 11/2012 |
| WO | 2013/124785 A1 | 8/2013 |
| WO | 2015/103783 A1 | 7/2015 |
| WO | 2018/226959 | 12/2018 |
| WO | 2021/243076 A1 | 12/2021 |
| WO | 2024160065 | 8/2024 |
| WO | 2024241088 | 11/2024 |
| WO | 2024247936 | 12/2024 |
| WO | 2025016131 | 1/2025 |
| WO | 2025053078 | 3/2025 |
| WO | 2025053088 | 3/2025 |
| WO | 2025053091 | 3/2025 |
| WO | 2025057801 | 3/2025 |
| WO | 2025069057 | 4/2025 |
| WO | 2025075365 | 4/2025 |
| WO | 2025091203 | 5/2025 |
| WO | 2025126835 | 6/2025 |

OTHER PUBLICATIONS

LC Duplex Connectors, https://suncallamerica.com/products/lc-series/lc-duplex-connectors/, Suncall America Inc., 5 pages (Copyright 2019).

LC Push-Pull Uniboot Connectors, https://suncallamerica.com/products/lc-series/lc-push-pull-uniboot-connectors/, Suncall America Inc., 5 pages (Copyright 2019).

LC Uniboot Connectors, https://suncallamerica.com/products/lc-series/lc-uniboot-connectors/, Suncall America Inc., 4 pages (Copyright 2019).

Chinese Office Action dated May 22, 2015; CN Patent Appln. No. 201280017489.2; 7 pages.

Chinese Office Action dated Jun. 18, 2015; CN Patent Appln. No. 201280017445.X; 5 pages.

Extended European Search Report for European Patent Application No. 14878059.6 mailed Aug. 9, 2017, 10 pages.

Extended European Search Report for European Patent Application No. 21170383.0 mailed Oct. 7, 2021, 11 pages.

International Search Report for International Application No. PCT/EP2012/052036 mailed Mar. 22, 2012. (2 pages).

International Search Report for International Application No. PCT/EP2012/052039 mailed May 31, 2012. (3 pages).

International Search Report for International Application No. PCT/IB2013/051329 mailed Jun. 13, 2013 (2 pages).

International Written Opinion for International Application No. PCT/IB2013/051329 mailed Jun. 13, 2013 (7 pages).

International Search Report for International Application No. PCT/CN2014/070514 mailed Oct. 22, 2014 (5 pages).

International Written Opinion for International Application No. PCT/CN2014/070514 mailed Oct. 22, 2014 (4 pages).

International Search Report and Written Opinion for Application No. PCT/US2021/034612 mailed Sep. 15, 2021.

Spanish Search Report for corresponding application No. ES 201130169 mailed May 24, 2013 (with English Translation), 10 pages.

Spanish Search Report for application No. ES 201130168 mailed Jul. 1, 2013 (with English Translation); 8 pages.

International Search Report and Written Opinion for Application No. PCT/US2023/062861 mailed Jun. 13, 2023.

International Search Report and Written Opinion for Application No. PCT/US2022/023720 mailed Jul. 27, 2022.

* cited by examiner

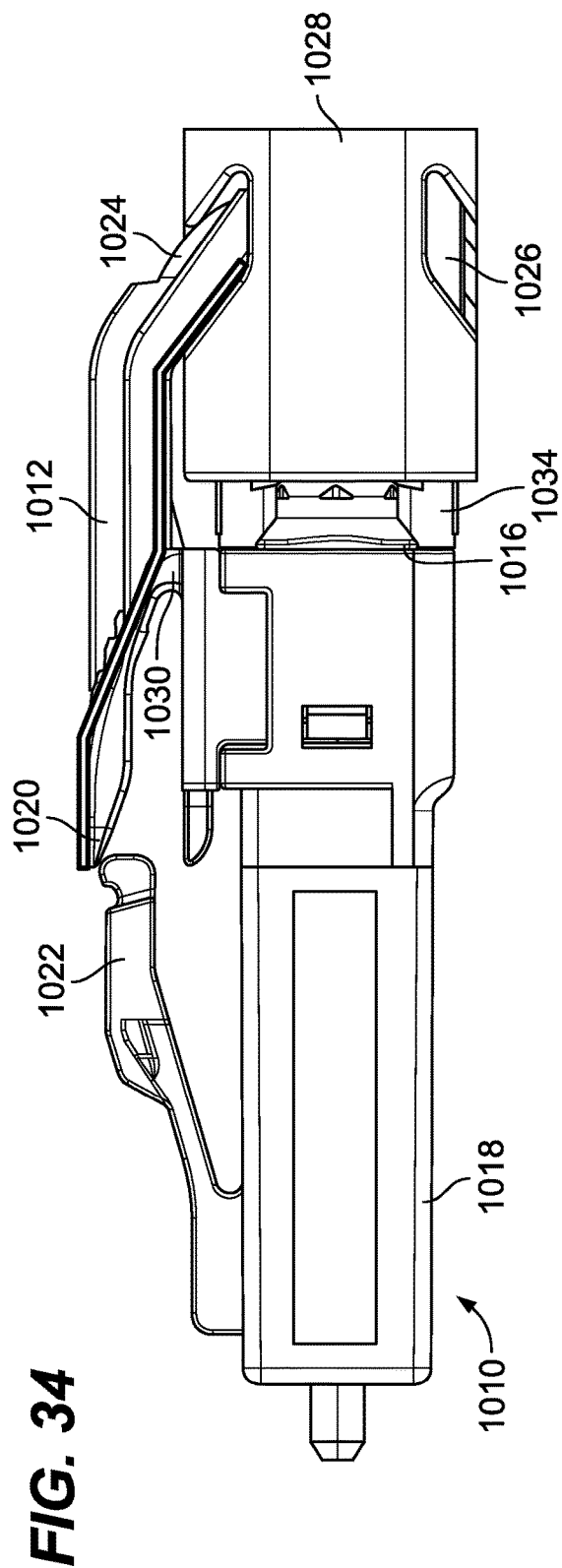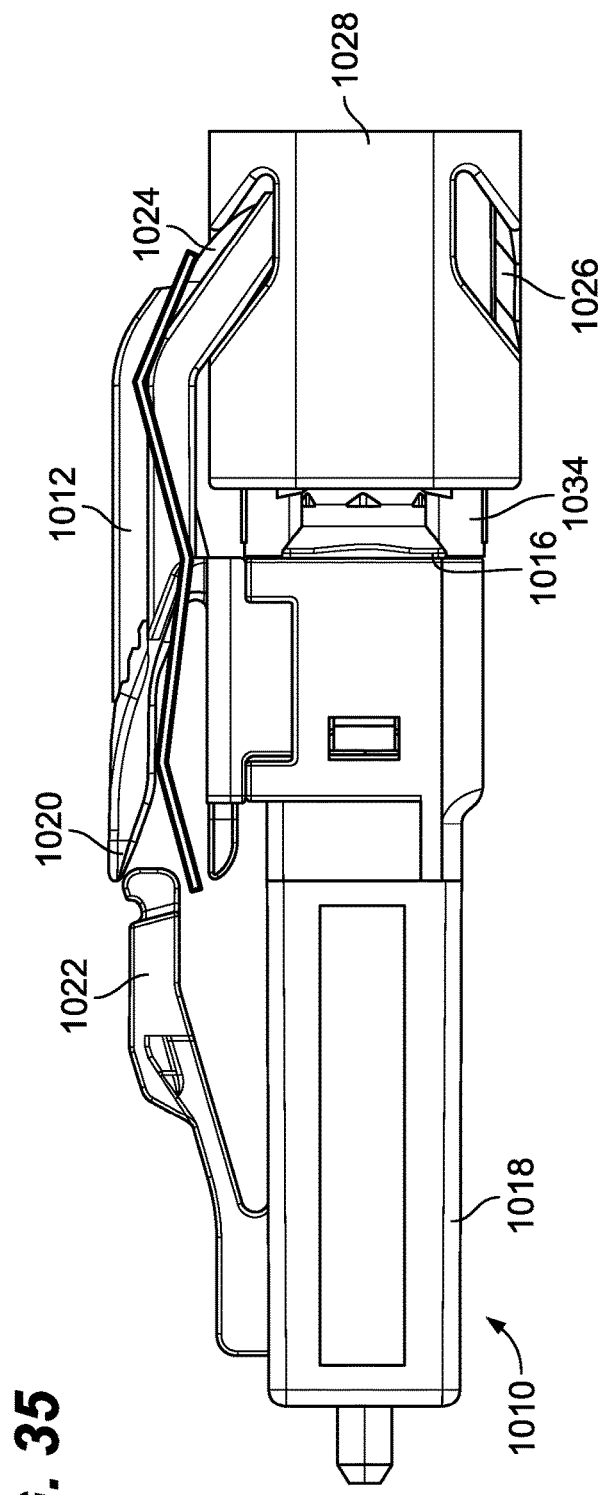

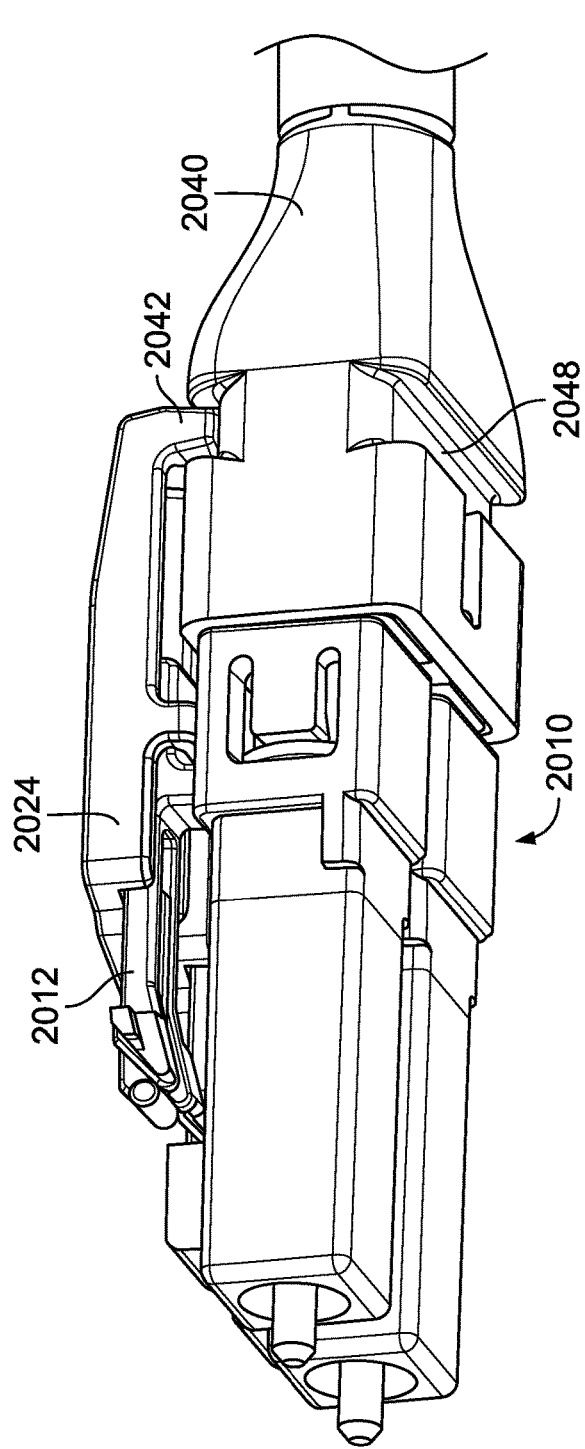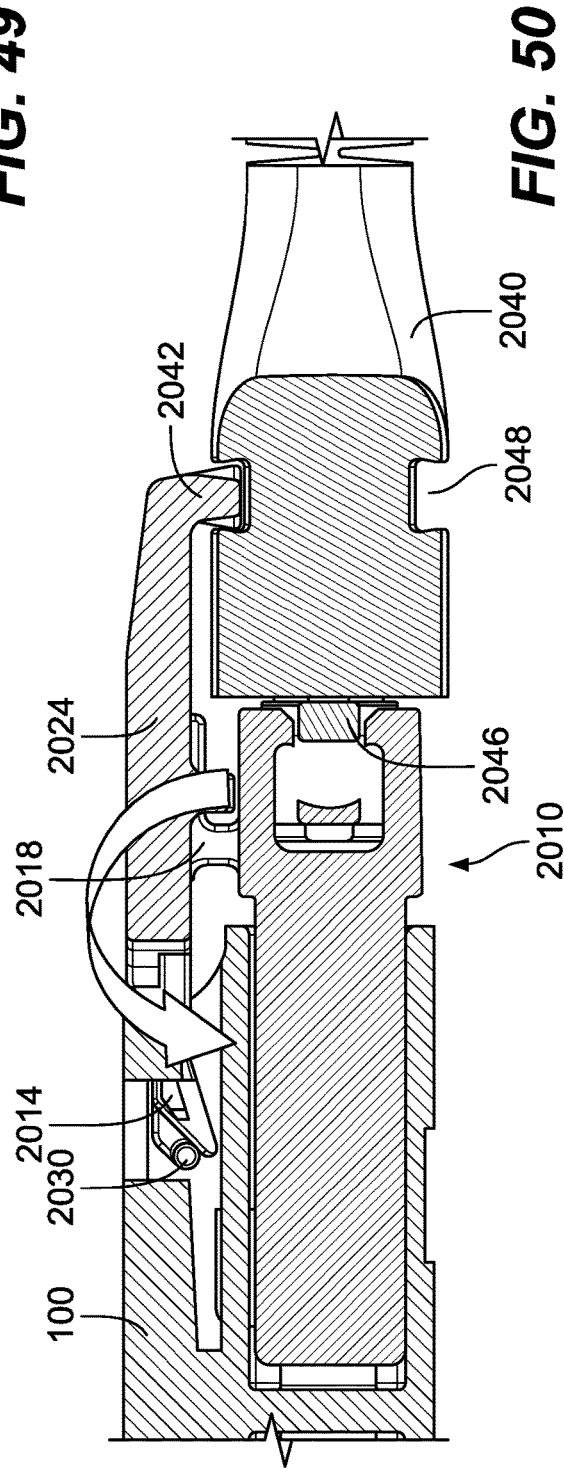

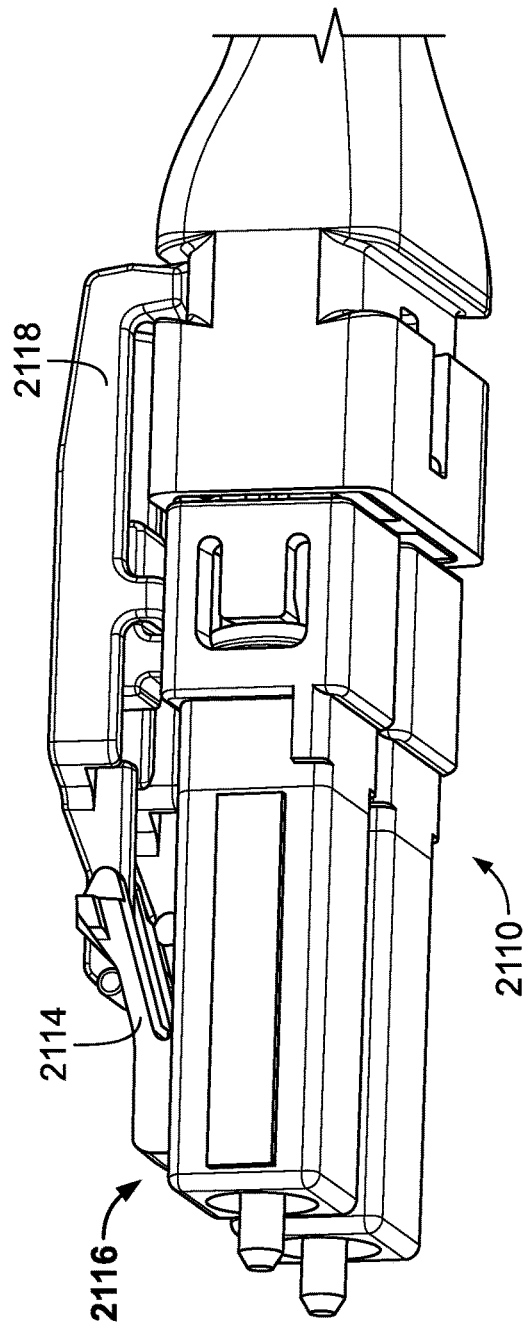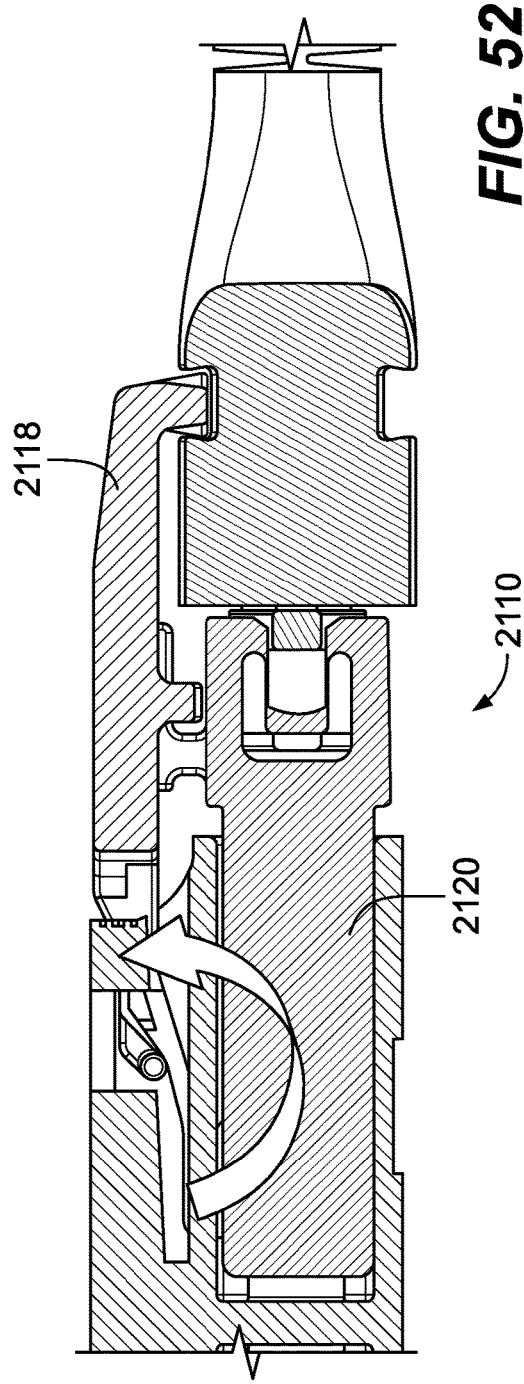

TELECOMMUNICATIONS CONNECTOR WITH LATCH RELEASE MECHANISM

CROSS-REFERENCE TO RELATED APPLICATION

This application is a National Stage Application of PCT/US2022/023720, filed on Apr. 6, 2022, which claims the benefit of U.S. Patent Application Ser. No. 63/172,319, filed on Apr. 8, 2021, the disclosures of which are incorporated herein by reference in their entireties. To the extent appropriate, a claim of priority is made to each of the above disclosed applications.

TECHNICAL FIELD

The present disclosure relates generally to telecommunications systems. More particularly, the present disclosure relates to optical fiber communications systems and fiber optic connectors used in optical fiber communications systems.

BACKGROUND

Fiber optic communications systems are becoming prevalent in part because service providers want to deliver high bandwidth communication capabilities (e.g., data and voice) to customers. Fiber optic communications systems employ a network of fiber optic cables to transmit large volumes of data and voice signals over relatively long distances. Optical fiber connectors are an important part of most fiber optic communication systems. Fiber optic connectors allow two optical fibers to be quickly optically connected without requiring a splice. Fiber optic connectors can be used to optically interconnect two lengths of optical fiber. Fiber optic connectors can also be used to interconnect lengths of optical fiber to passive and active equipment.

A typical fiber optic connector includes a ferrule assembly supported at a front end of a connector housing. A spring is used to bias the ferrule assembly in a forward direction relative to the connector housing. The ferrule functions to support an end portion of at least one optical fiber (in the case of a multi-fiber ferrule, the ends of multiple fibers are supported). The ferrule has a front end face at which a polished end of the optical fiber is located. When two fiber optic connectors are interconnected, the front end faces of the ferrules abut one another, and the ferrules are forced rearward relative to their respective connector housings against the bias of their respective springs. With the fiber optic connectors connected, their respective optical fibers are coaxially aligned such that the end faces of the optical fibers directly oppose one another. In this way, an optical signal can be transmitted from optical fiber to optical fiber through the aligned end faces of the optical fibers. For many fiber optic connector styles, alignment between two fiber optic connectors is provided through the use of an intermediate fiber optic adapter.

A fiber optic connector is often secured to the end of a corresponding fiber optic cable by anchoring strength members of the cable to the connector housing of the connector. Anchoring is typically accomplished through the use of conventional techniques such as crimps or adhesives. Anchoring the strength members of the cable to the connector housing is advantageous because it allows tensile load applied to the cable to be transferred from the strength members of the cable directly to the connector housing. In this way, the tensile load is not transferred to the ferrule assembly of the fiber optic connector. If the tensile load were to be applied to the ferrule assembly, such tensile load could cause the ferrule assembly to be pulled and result in optical disconnection between the connector and its corresponding mated connector.

An example of a prior art LC style fiber optic connector 20 is illustrated in FIGS. 1 and 2. As shown in FIGS. 1 and 2, the conventional LC connector 20 includes a connector housing 22 defining a front housing portion 24 and a rear housing portion 26. The LC connector 20 includes a ferrule assembly 28 defined by a ferrule 30, a hub 32, and a spring 34. A rear end 36 of the ferrule 30 is secured within the ferrule hub 32. When the LC connector 20 is assembled, the ferrule hub 32 and the spring 34 are captured between the front housing portion 24 and the rear housing portion 26 of the connector housing 22 and a front end 38 of the ferrule 30 projects outwardly beyond a front end 40 of the connector housing 22. The spring 34 is configured to bias the ferrule 30 in a forward direction relative to the connector housing 22. According to some versions, the front housing portion 24 may be formed from a molded plastic.

In the depicted example of the prior art LC connector 20, a strain relief boot 56 is slid over a rear end 58 of the rear housing portion 26 and snaps over a boot flange 60 to retain the boot 56 with respect to the connector housing 22. The rear housing portion 26 may define a crimp region 62 for crimping a fiber optic cable's strength layer to the rear housing portion 26, normally with the use of a crimp sleeve (not shown). An exterior surface 64 of the rear housing portion 26 defining the crimp region 62 can be textured (e.g., knurled, ridged, provided with small projections, etc.) to assist in retaining the crimp on the housing 22.

Still referring to FIGS. 1 and 2, the front housing portion 24 defines a latch 42 extending from a top wall 44 of the front housing portion 24 toward the rear end 46, the latch 42 extending at an acute angle with respect to the top wall 44 of the front housing portion 24. The rear housing portion 26 also includes a latch trigger 48 that extends from the rear end 46 of the front housing portion 24 toward the front end 40. The latch trigger 48 also extends at an acute angle with respect to the top wall 44. The latch trigger 48 is configured to come into contact with the latch 42 for flexibly moving the latch 42 downwardly.

As is known in the art, when the fiber optic connector 20 is placed in an LC format adapter 100, an example of which is shown in FIGS. 3-5, for optically coupling light from two optical fibers together, the latch 42 functions to lock the fiber optic connector 20 in place within the adapter 100. The fiber optic connector 20 may be removed from the adapter 100 by depressing the latch trigger 48, which causes the latch 42 to be pressed in a downward direction, freeing catch portions 52 of the latch 42 from the fiber optic adapter 100.

In dense panel environments, where a large number of connectors, such as connector 20, are placed in a side-by-side arrangement, access becomes a big issue. Since the latch triggers 48 have to be accessed and pushed down for unlatching the latches 42 from the adapters 100, removal of connectors can become difficult and cumbersome. In dense panel designs, even though it is normally fairly easy to insert and latch connectors such as connectors 20 by pushing from an end of the connector's boot, removal is difficult because the latches are far forward on the connectors.

Improvements in connector design are desired to facilitate use in high density environments.

SUMMARY

One aspect of the present disclosure relates to a telecommunications connector (e.g., a fiber optic connector) having features that facilitate connector latching and unlatching.

Another aspect of the disclosure relates to a duplex telecommunications connector design, where front housings of two connector portions that are positioned side-by-side can be rotated about their longitudinal axes to change the polarity of the two connector portions.

According to one aspect, the disclosure is directed to a telecommunications connector, for example, a fiber optic connector, that includes at least one connector portion including a front housing portion coupled to a rear housing portion. The front housing portion is rotatable relative to the rear housing portion about a longitudinal axis defined by the front housing portion, the front housing portion including a ferrule and a latch. The latch defines a front end and a rear end, and is pivotable relative to the rest of the front housing portion at a connection portion. According to one embodiment, the connection portion is an intermediate connection portion positioned between the front end and the rear end of the latch.

The telecommunications connector also includes a yoke coupled to the rear housing portion of the at least one connector portion, wherein the rear housing portion is rotationally and axially fixed with respect to the yoke, and a boot mounted to the yoke, the boot movable longitudinally relative to the yoke, wherein the boot is configured to engage the rear end of the latch and cause the front end of the latch to pivot toward the ferrule of the front housing portion as the boot is moved away from the yoke.

According to another aspect of the disclosure, the telecommunications connector is a duplex fiber optic connector that includes two connector portions provided in a side-by-side relationship, each connector portion including a front housing portion coupled to a rear housing portion, wherein each front housing portion is rotatable relative to the rear housing portion about a longitudinal axis defined by the front housing portion to change the polarity of the two connector portions. Each front housing portion includes a ferrule and a latch, wherein the latch defines a front end and a rear end, and is pivotable relative to the rest of the front housing portion at a connection portion. A yoke is coupled to the rear housing portion of each of the connector portions, wherein the rear housing portions are rotationally and axially fixed with respect to the yoke. A boot is mounted to the yoke, the boot movable longitudinally relative to the yoke, wherein the boot is configured to engage the rear ends of each of the latches and cause the front ends of each of the latches to pivot toward the ferrules of the front housing portions as the boot is moved away from the yoke.

According to another aspect of the disclosure, a telecommunications connector comprises at least one connector portion including a front housing portion coupled to a rear housing portion, wherein the front housing portion is rotatable relative to the rear housing portion about a longitudinal axis defined by the front housing portion, the front housing portion including a ferrule and a latch, wherein the latch defines a front end and a rear end, and is pivotable relative to the rest of the front housing portion at a connection portion, a yoke coupled to the rear housing portion of the at least one connector portion, wherein the rear housing portion is rotationally and axially fixed with respect to the yoke, and a boot mounted to the yoke, the boot movable longitudinally relative to the yoke, wherein the boot is configured to engage at least a portion of the latch and cause the latch to pivot relative to the rest of the front housing portion as the boot is moved relative to the yoke.

According to yet another aspect of the disclosure, a telecommunications connector comprises a front housing portion coupled to a rear housing portion and a crimp region, wherein the front housing portion includes a ferrule and a latch, wherein the latch defines a front end and a rear end, and is pivotable relative to the rest of the front housing portion at a connection portion, the crimp region configured for crimping at least a portion of a cable terminated by the ferrule, wherein the crimp region defines a plurality of spaced apart crimp rings stacked longitudinally, each crimp ring defining discretely spaced scalloped portions that are positioned peripherally around the rings, wherein the scalloped portions between adjacent rings are provided in a staggered position in a longitudinal direction defined by the telecommunications connector.

According to yet another embodiment of the disclosure, a telecommunications connector includes at least one connector portion including a front housing portion coupled to a rear housing portion, wherein the front housing portion is rotatable relative to the rear housing portion about a longitudinal axis defined by the front housing portion, the front housing portion including a ferrule and a latch, wherein the latch defines a front end and a rear end, and is pivotable relative to the rest of the front housing portion at a connection portion, and a boot mounted on the telecommunications connector, the boot movable longitudinally relative to the rear housing portion, wherein the boot is configured to engage at least a portion of the latch of the front housing portion and cause the latch to pivot relative to the rest of the front housing portion as the boot is moved relative to the rear housing portion.

According to yet another embodiment of the disclosure, a telecommunications connector includes at least one connector portion including a front housing portion coupled to a rear housing portion. The front housing portion defines a front end and a rear end, the front housing portion including a ferrule terminating a cable fixed to the at least one connector portion, the front housing portion further including a latch that is configured to contact a fiber optic adapter for locking the connector to the fiber optic adapter when the connector is inserted into the fiber optic adapter, wherein the latch is movable about a connection location on the front housing portion. The latch defines a permanently attached rear extension that extends rearward past the rear end of the front housing portion, the rear extension configured to be contacted for moving the latch for freeing the connector from the fiber optic adapter.

According to yet another embodiment, a telecommunications connector comprises at least one connector portion including a front housing portion coupled to a rear housing portion, the front housing portion defining a front end and a rear end, the front housing portion including a ferrule terminating a cable fixed to the at least one connector portion, the front housing portion further including a latch that is configured to contact a fiber optic adapter for locking the telecommunications connector to the fiber optic adapter when the telecommunications connector is inserted into the fiber optic adapter, wherein the latch is movable about a connection location on the front housing portion, the front housing portion further including a movable release trigger configured to contact the latch for moving the latch about the connection location for freeing the telecommunication connector from the fiber optic adapter, the movable release trigger defining a rear extension that extends rearward past the rear end of the front housing portion, the rear extension of the movable release trigger configured to be contacted for moving the latch for freeing the telecommunications connector from the fiber optic adapter, and a strain relief boot movably mounted to the telecommunications connector, the boot movable longitudinally relative to the front housing portion, the boot configured to contact the rear extension of the movable release trigger for moving the release trigger to cause the release trigger to move the latch about the connection location to free the telecommunications connector from the fiber optic adapter.

According to yet another embodiment, the disclosure is directed to a telecommunications connector comprising at least one connector portion including a front housing portion coupled to a rear housing portion, the front housing portion defining a front end and a rear end, the front housing portion including a ferrule terminating a cable fixed to the at least one connector portion, the front housing portion further including a latch that is configured to contact a fiber optic adapter for locking the telecommunications connector to the fiber optic adapter when the telecommunications connector is inserted into the fiber optic adapter, wherein the latch is movable about a connection location on the front housing portion, the front housing portion further including a movable release trigger configured to contact the latch for moving the latch about the connection location for freeing the telecommunications connector from the fiber optic adapter, the movable release trigger defining a rear extension that extends rearward past the rear end of the front housing portion, the rear extension of the movable release trigger configured to be contacted for moving the latch for freeing the telecommunications connector from the fiber optic adapter, the movable release trigger non-removably attached to the front housing portion.

According to yet another embodiment, the disclosure is directed to a telecommunications connector comprising at least one connector portion including a front housing portion coupled to a rear housing portion, the front housing portion defining a front end and a rear end, the front housing portion including a ferrule terminating a cable fixed to the at least one connector portion, the front housing portion further including a latch that is configured to contact a fiber optic adapter for locking the telecommunications connector to the fiber optic adapter when the telecommunications connector is inserted into the fiber optic adapter, wherein the latch is movable about a connection location on the front housing portion. The front housing portion further includes a movable release trigger configured to contact the latch for moving the latch about the connection location for freeing the telecommunication connector from the fiber optic adapter, the movable release trigger defining a rear extension that extends rearward past the rear end of the front housing portion, the rear extension of the movable release trigger configured to be contacted for moving the latch for freeing the telecommunications connector from the fiber optic adapter, wherein a majority of a length of the movable release trigger is configured to overlap the latch.

According to yet another embodiment, the disclosure is directed to a telecommunications connector comprising at least one connector portion including a front housing portion coupled to a rear housing portion, the front housing portion defining a front end and a rear end, the front housing portion including a ferrule terminating a cable fixed to the at least one connector portion. The front housing portion further includes a latch that is configured to contact a fiber optic adapter for locking the telecommunications connector to the fiber optic adapter when the telecommunications connector is inserted into the fiber optic adapter, wherein the latch is movable between a raised latching position and a lowered release position, wherein the latch is spring-biased toward the lowered release position. The connector includes a movable wedge structure configured to keep the latch in the raised latching position against the bias of the latch when the wedge structure is at least partially inserted under the latch, wherein the wedge structure is configured such that when the wedge structure is moved away from the front end of the front housing portion, the latch automatically moves to the lowered release position to free the telecommunications connector from the fiber optic adapter.

A variety of additional aspects will be set forth in the description that follows. The aspects relate to individual features and to combinations of features. It is to be understood that both the foregoing general description and the following detailed description are exemplary and explanatory only and are not restrictive of the broad inventive concepts upon which the embodiments disclosed herein are based.

BRIEF DESCRIPTION OF THE DRAWINGS

FIG. 17 illustrates another partial assembly view of the fiber optic connector of FIG. 16 with a cross-sectional view of the yoke added in;

FIG. 34 illustrates a side view of a portion of yet another embodiment of a fiber optic connector having features that are examples of inventive aspects in accordance with the present disclosure;

FIG. 35 diagrammatically illustrates the bending path of the flexible latch trigger of the fiber optic connector of FIG. 34;

FIG. 49 is a bottom perspective view of a duplex version of the fiber optic connector of FIGS. 47 and 48:

FIG. 50 is a cross-sectional view taken along a plane parallel to the longitudinal axis of the fiber optic connector of FIG. 49 illustrating the latching of the fiber optic connector with an LC format fiber optic adapter;

FIG. 51 is a bottom perspective view of a portion of yet another embodiment of a duplex fiber optic connector having features that are examples of inventive aspects in accordance with the present disclosure, the illustrated duplex fiber optic connector having to features similar to the connector of FIGS. 47-50;

FIG. 52 is a cross-sectional view taken along a plane parallel to the longitudinal axis of the fiber optic connector of FIG. 51 illustrating the latching of the fiber optic connector with an LC format fiber optic adapter;

DETAILED DESCRIPTION

Figure 1:
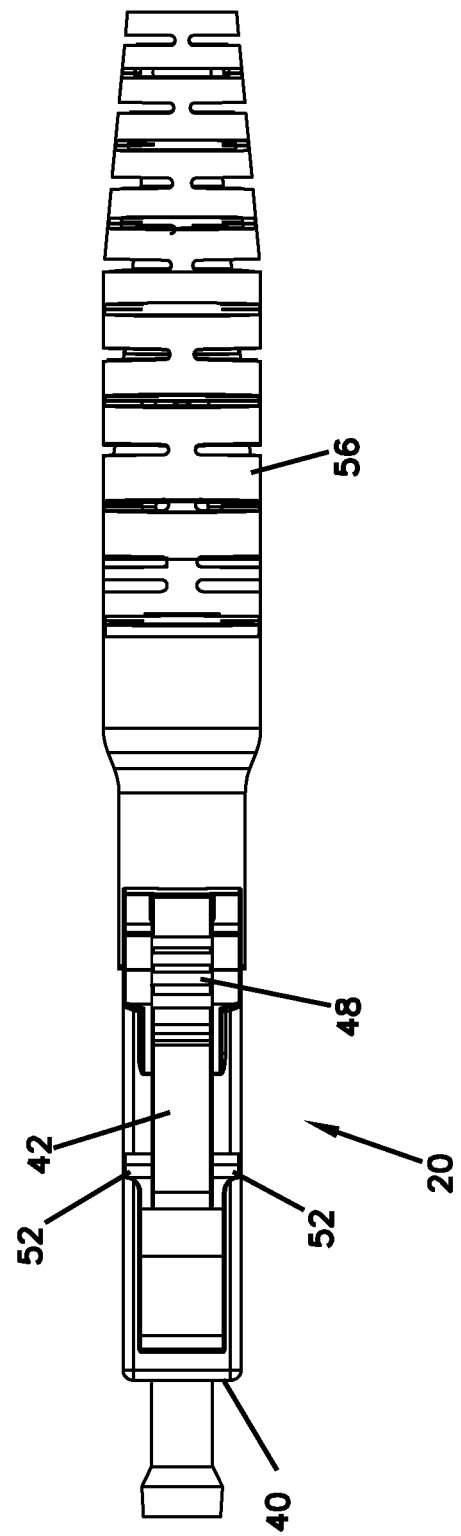
FIG. 1 is a top view of a conventional LC style fiber optic connector.

Referring now to FIGS. 6-24, an example embodiment of a connector 110 having features that are examples of inventive aspects in accordance with the present disclosure is illustrated. The illustrated connector 110 is a fiber optic connector that is used for aligning optical fibers. However, it should be noted that the inventive features discussed herein are fully applicable to other types of connectors that are not necessarily fiber optic connectors.

The connector 110 may be considered a duplex LC format connector, transitioning optical fibers from a single optical cable to two front fiber optic connector portions 112 as will be discussed in further detail below. In the illustrated embodiment, each connector portion 112 may define an LC profile, meaning that the connector portions 112 can mate to other LC type connectors via an LC adapter, such as the adapter 100 shown in FIGS. 3-5, as noted above. As such, it should be noted that certain structures and functionality of those structures may be similar to the simplex LC connector 20 discussed above with respect to FIGS. 1-2.

Still referring now to FIGS. 6-24, the connector portions 112 of the illustrated connector 110 each houses a ferrule 78 for terminating the optical fiber of a fiber optic cable. As noted above, connector 110 may also be referred to as duplex connector assembly or simply a duplex connector. As noted above, connector 110 is matable via the adapter 100 shown in FIGS. 3-5. Adapter 100 mates two of the connectors 110 together or mates another LC format connector to connector 110 for fiber optic signal transmission.

Figure 6:
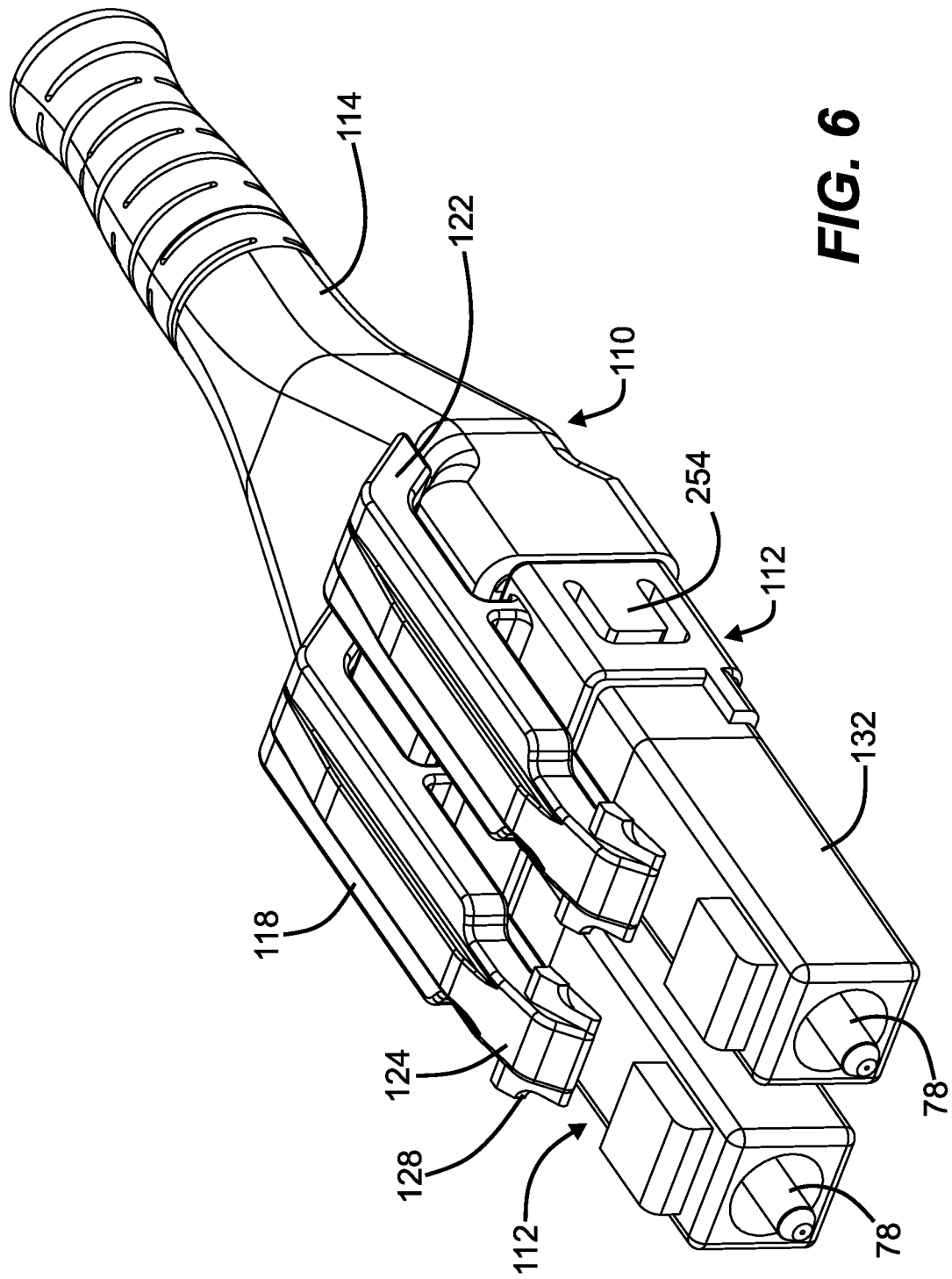
FIG. 6 is a perspective view of one example fiber optic connector having features that are examples of inventive aspects in accordance with the present disclosure.

In the depicted embodiment of the connector 110, the two connector portions 112 are arranged side-by-side and in a parallel position, as illustrated in FIG. 6. Each connector portion 112 is formed from a front housing 132 that is coupled to and rotatable relative to a rear housing 90. A ferrule assembly 76 is positioned within the front housing 132. Ferrule assembly 76 includes the ferrule 78, a hub 80 which holds the ferrule 78, and a spring 82 which is positioned between a rear shoulder 81 of the ferrule hub 80 and a front end 91 of the rear housing 90. The spring 82 is configured to bias hub 80 and ferrule 78 forwardly.

Figure 13:
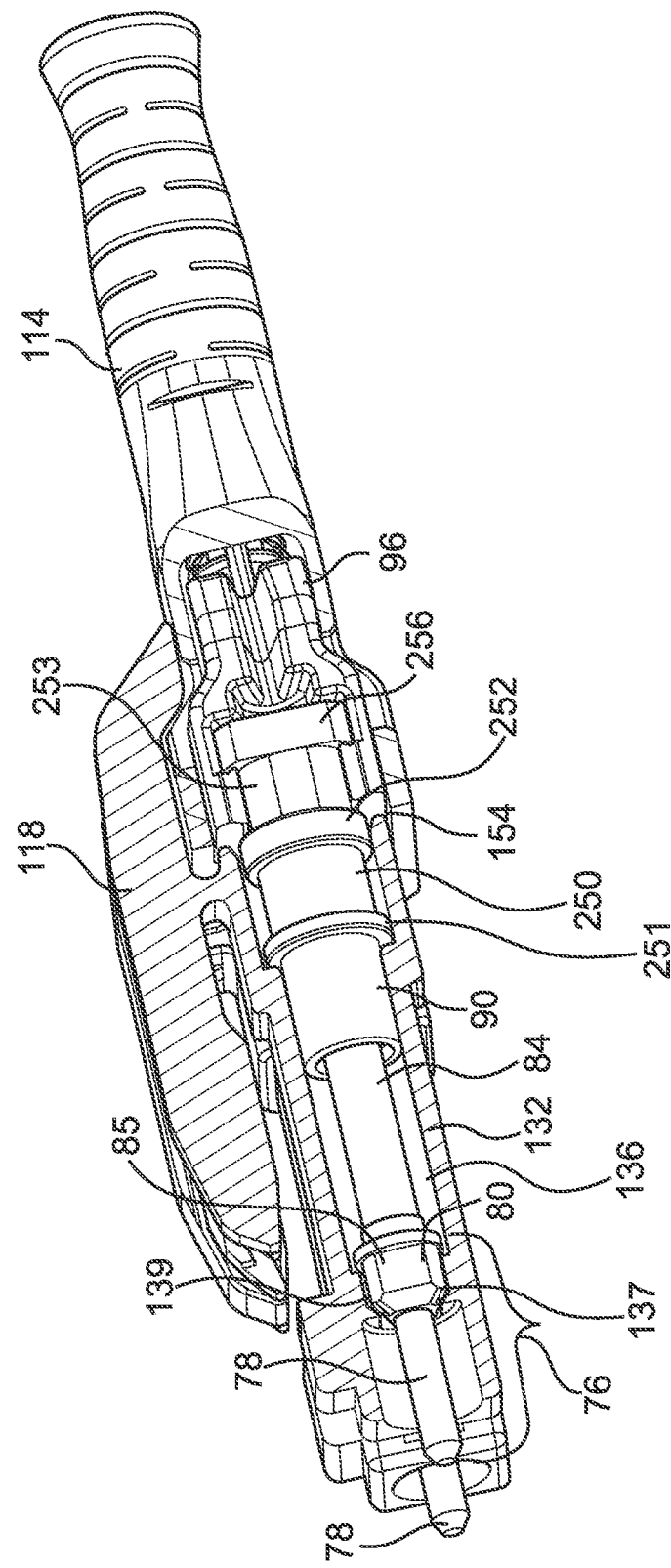
FIG. 13 is a perspective view of the fiber optic connector of FIGS. 6-8 with a portion of the front housing broken away to illustrate the internal features thereof.
Figure 14:
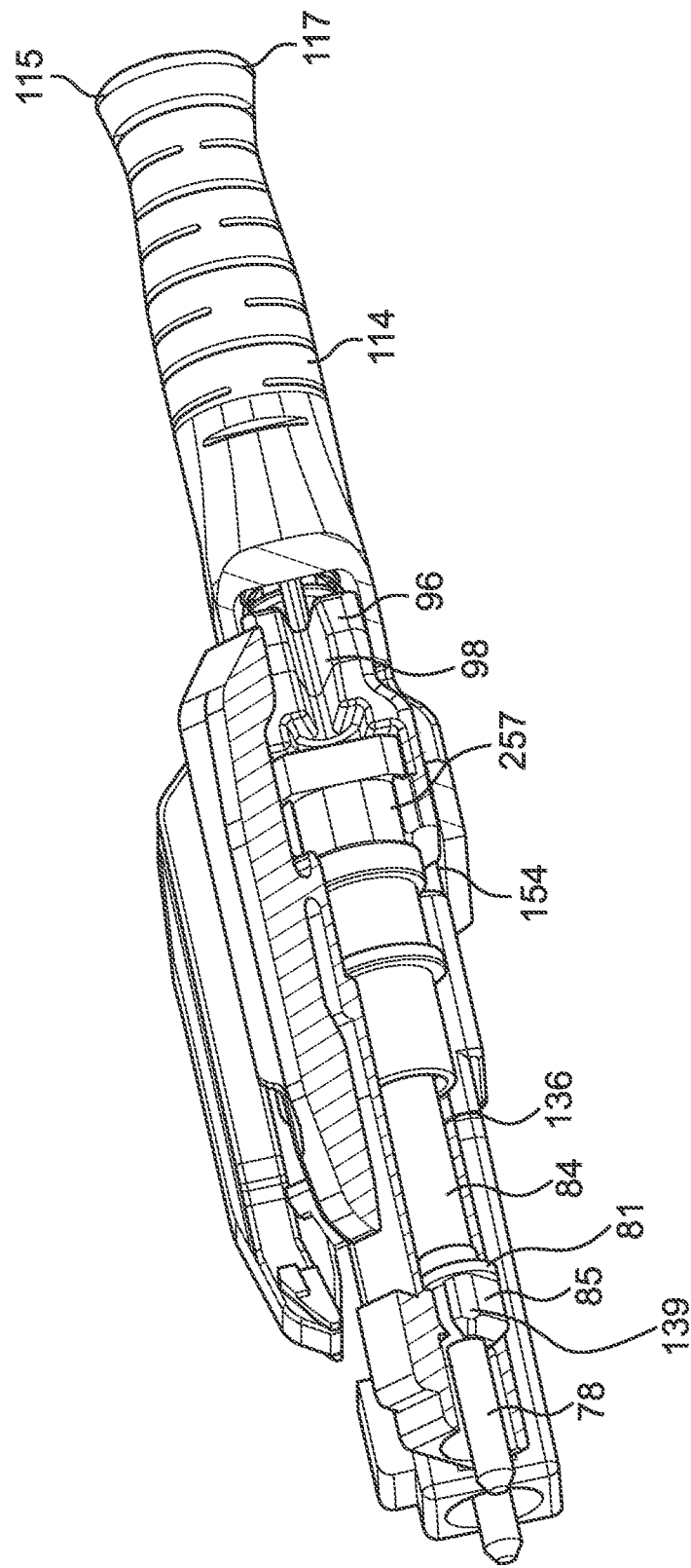
FIG. 14 illustrates the fiber optic connector of FIG. 13 with one of the front housings of a connector portion being rotated to reverse the polarity of that connector portion.

As shown in the internal details of the connector 110 in FIGS. 13 and 14, an internal tube 84 may be provided extending from the ferrule hub 80. Tube 84 may be configured to prevent epoxy from interfering with the movement of the ferrule 78, the hub 80, and the spring 82.

As will be discussed in further detail below, both of the rear housings 90 of the two connector portions 112 that are positioned in a side-by-side arrangement are received by a yoke 96 through side slots 98 defined by the yoke 96. The yoke is illustrated in isolation in FIG. 15.

The rear housings 90 are rotationally fixed with respect to the yoke 96 once laterally received therein. As will be discussed in further detail below, it is the front housings 132 of the connector portions 112 that are rotatable relative to the rear housings 90 and the yoke 96 to change the polarity of the overall connector 110, as illustrated in FIGS. 13-14.

Figure 15:
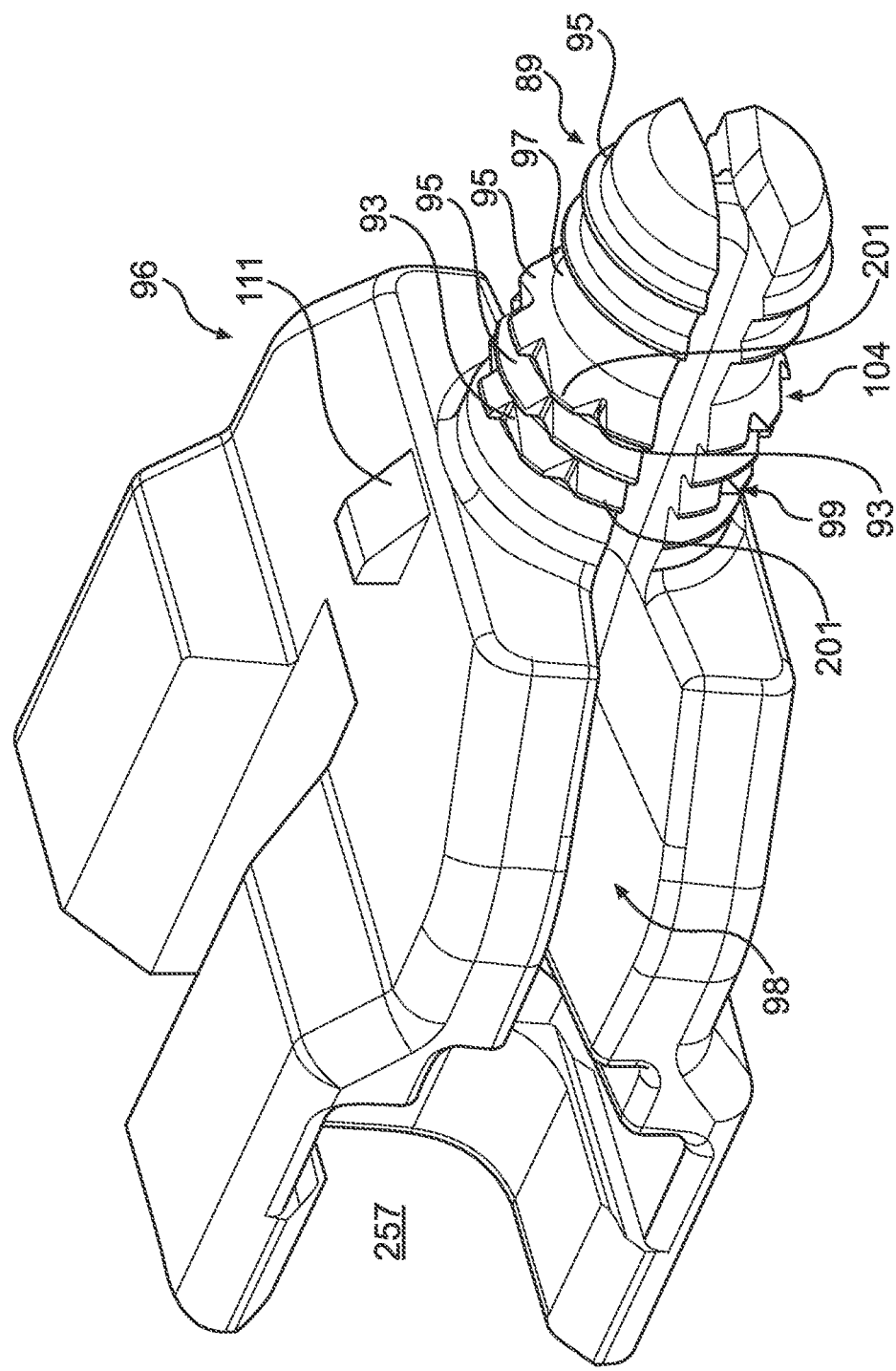
FIG. 15 is a rear perspective view of the yoke of the fiber optic connector of FIGS. 6-8 shown in isolation.
Figure 19:
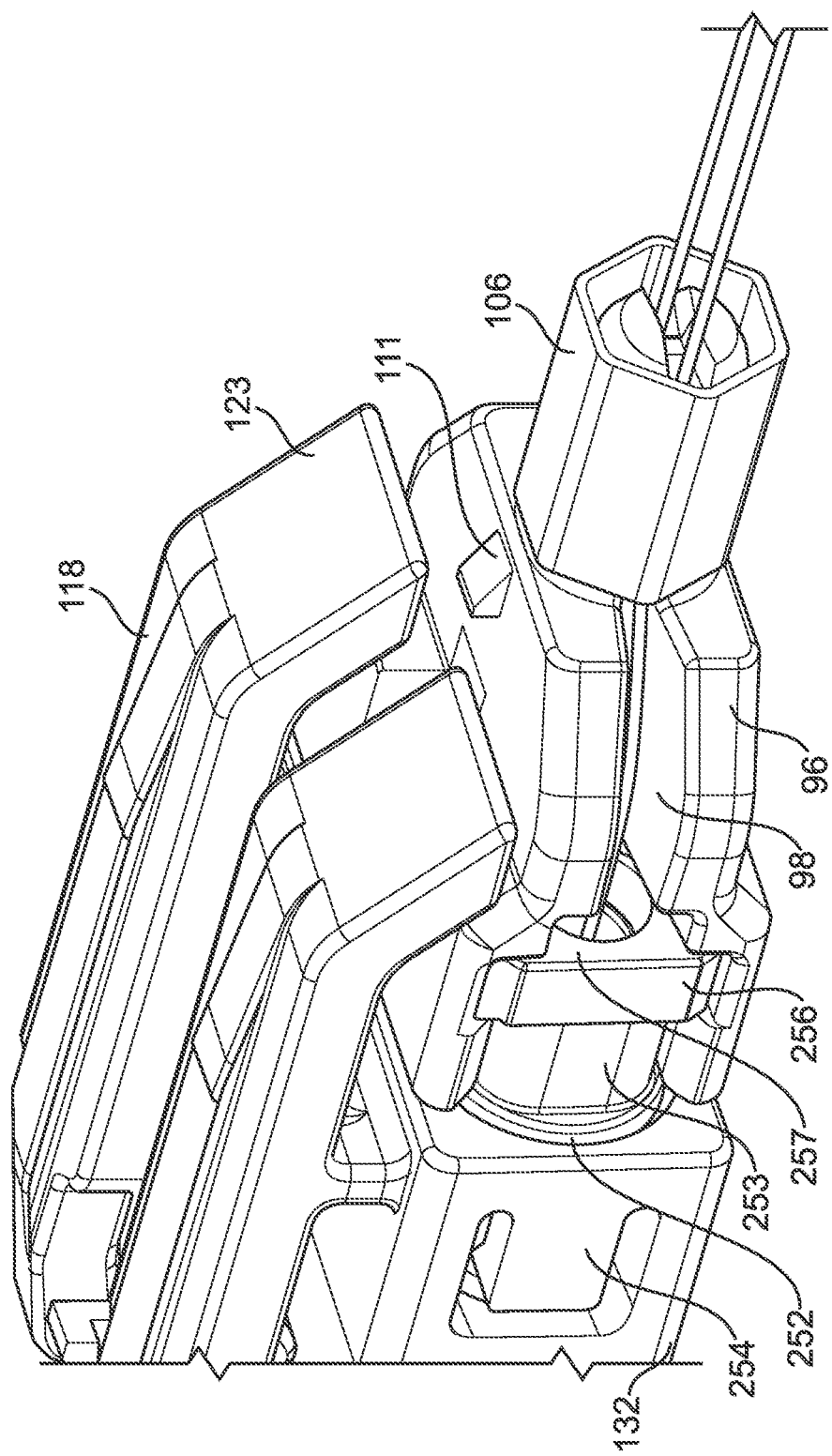
FIG. 19 illustrates the connector portions coupled to the yoke of the fiber optic connector of FIGS. 6-8 with a crimp sleeve placed on the crimp region of the yoke.

The yoke 96 defines a rear crimp region 104 for allowing crimping portions of a fiber optic cable via a crimp sleeve 106, as shown in FIGS. 15 and 19.

In an example embodiment, a fiber optic cable may include an outer jacket, strength members, typically in the form of aramid yarns, and two fibers 156, 158 as illustrated in the present disclosure. Each fiber 156, 158 is to be terminated to one of the two connector portions 112 of the connector 110. Each fiber 156, 158 may typically include an outer coating and a bare fiber. Typically, the coating is removed, and the bare fiber is inserted into the ferrule 78, and affixed, such as with epoxy. The aramid yarns are crimped to the crimp region 104 of the yoke 96 as will be discussed in further detail below.

Figure 2:
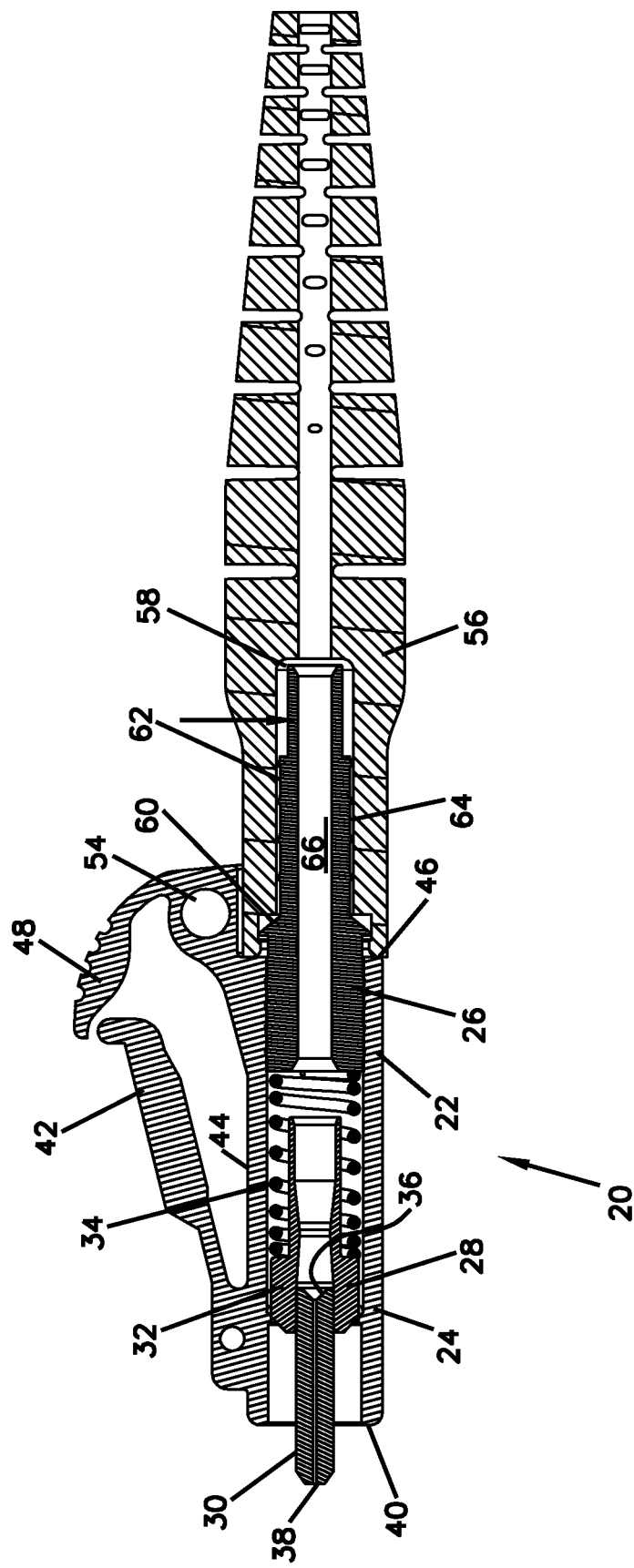
FIG. 2 is a cross-sectional view that longitudinally bisects the fiber optic connector of FIG. 1.
Figure 3:
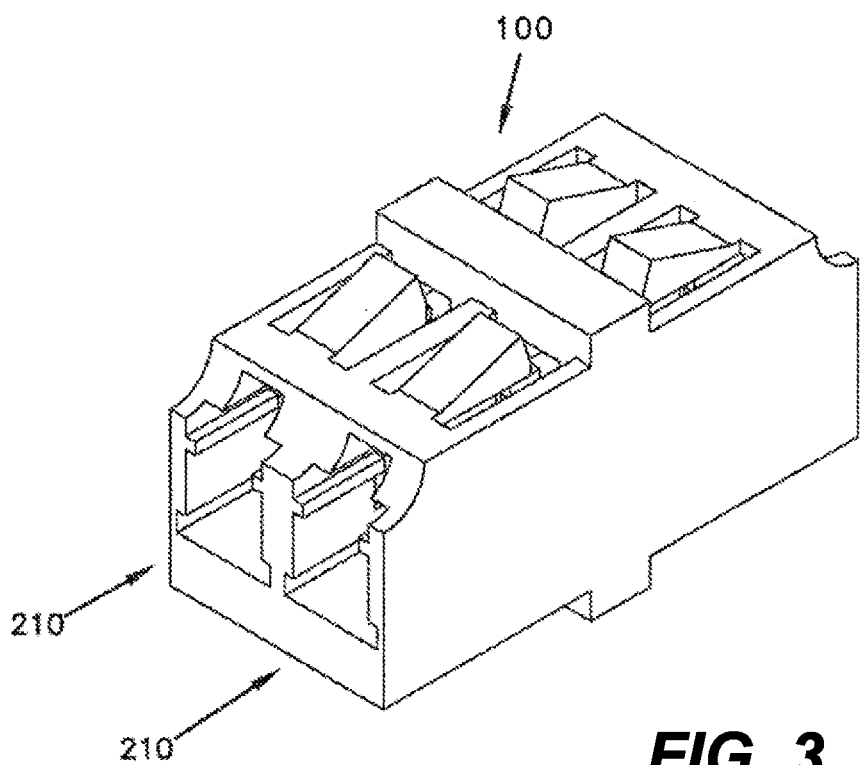
FIGS. 3-4 are two perspective views of a conventional duplex adapter for mating with the fiber optic connector of the present disclosure.
Figure 4:
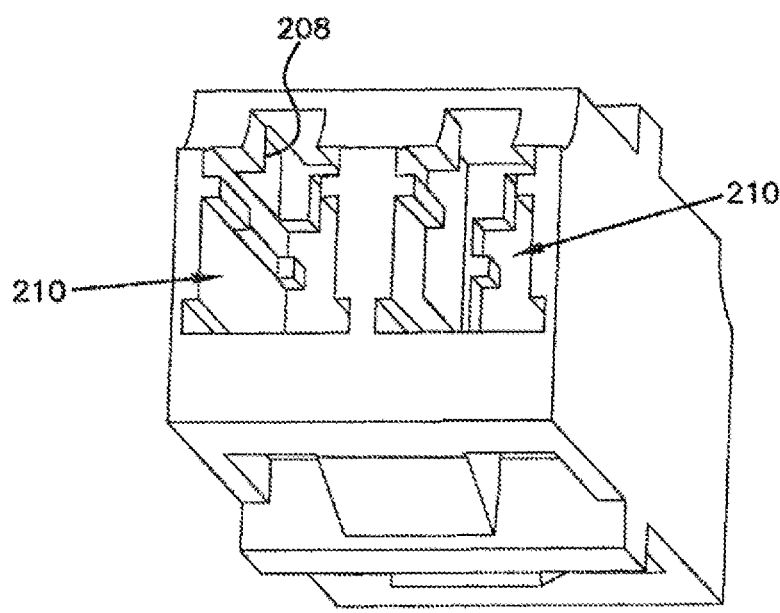
Figure 5:
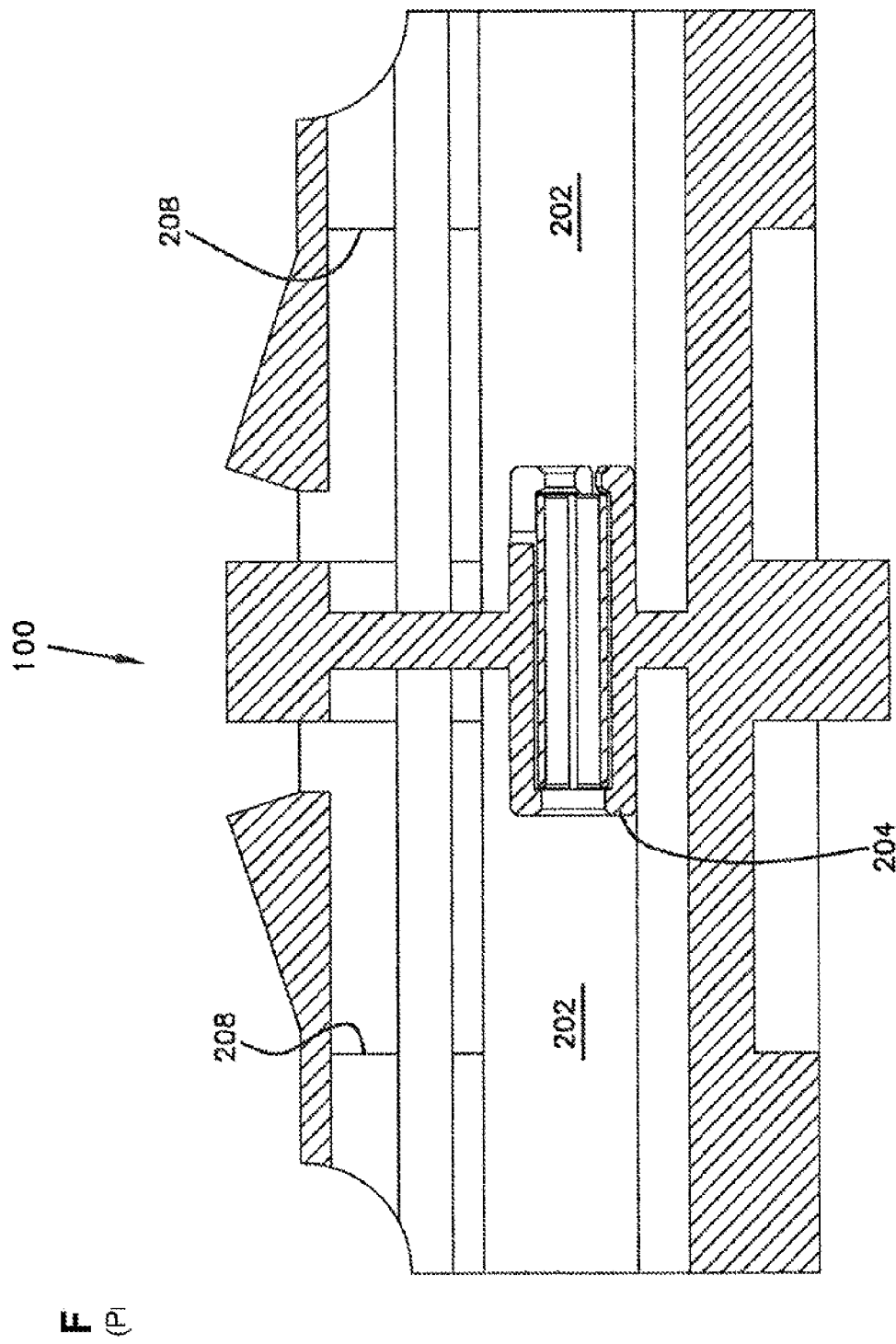
FIG. 5 is a cross-sectional view of the duplex adapter of FIGS. 3-4.
Figure 7:
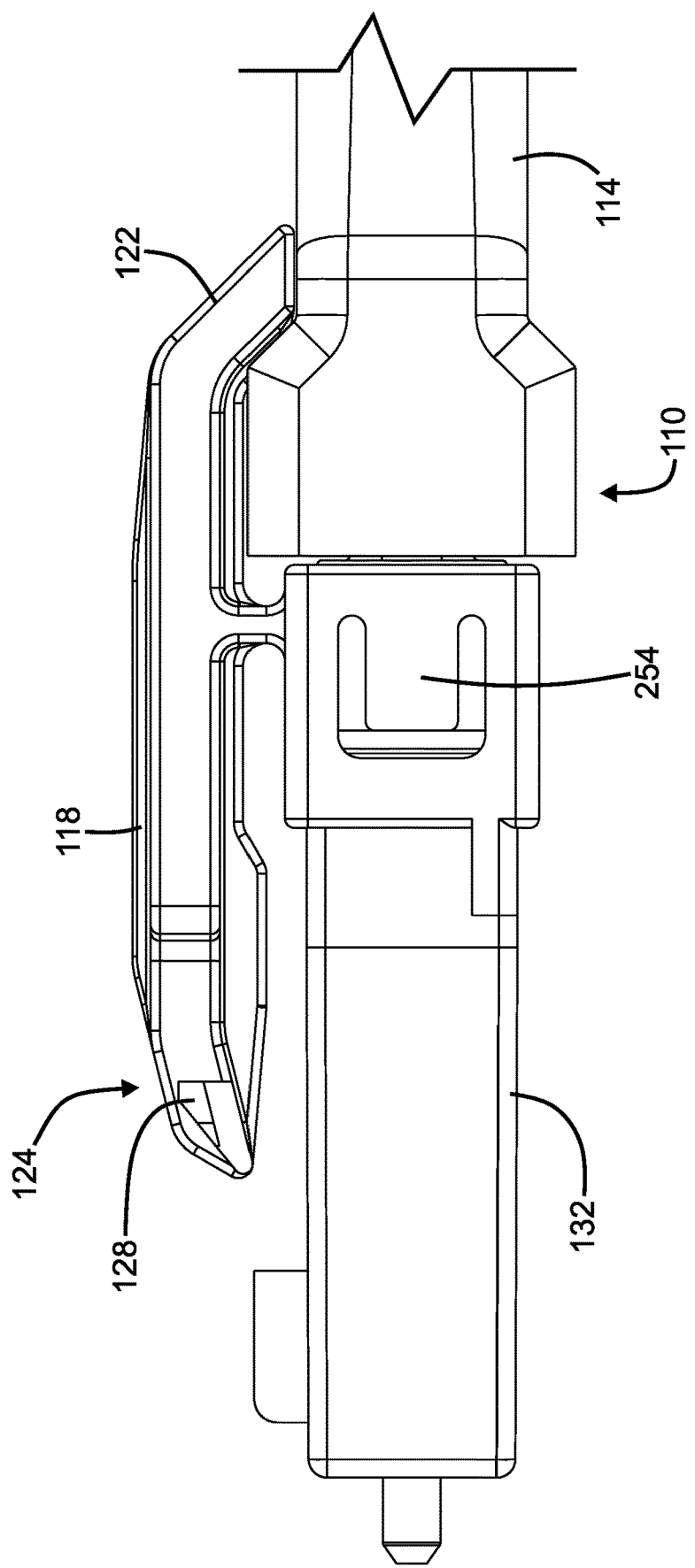
FIG. 7 is a side view of the fiber optic connector of FIG. 6, shown in the neutral position.
Figure 8:
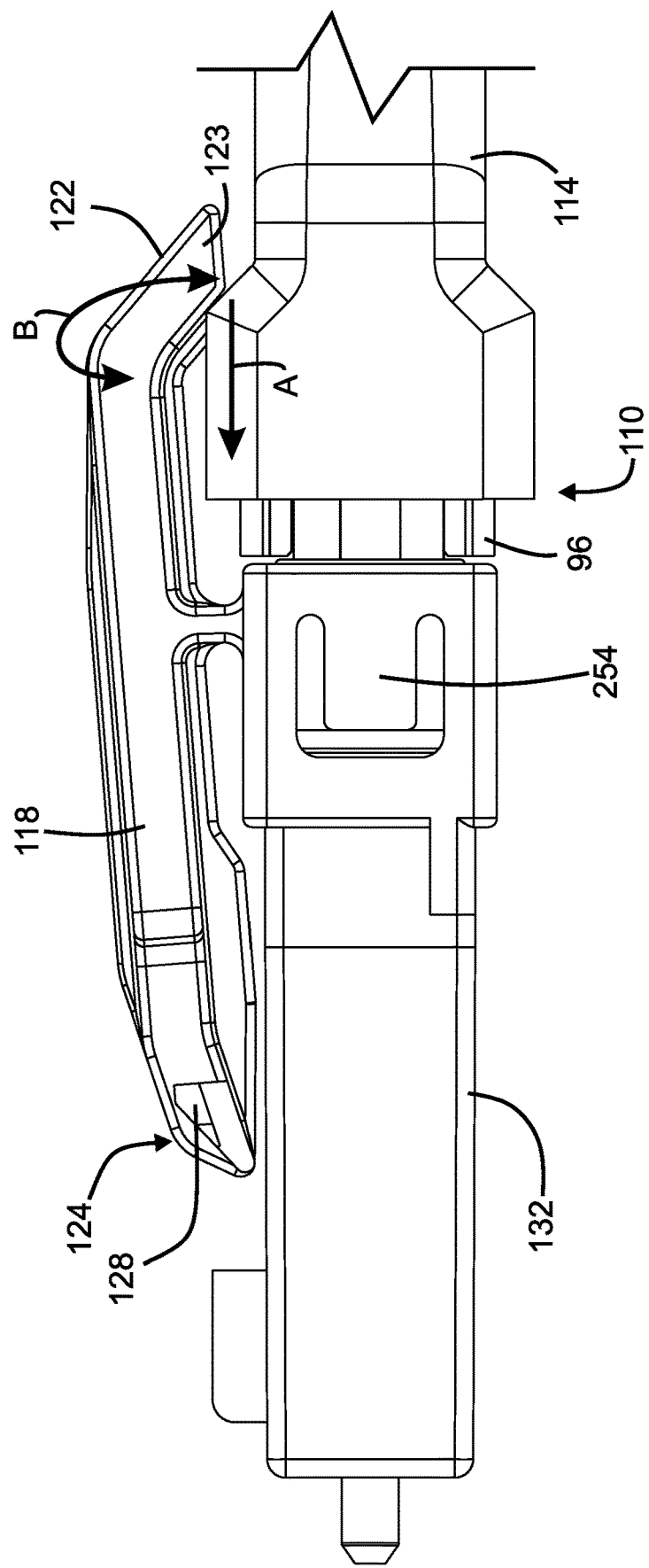
FIG. 8 is a side view of the fiber optic connector of FIG. 6, shown in an unlatched configuration.
Figure 9:
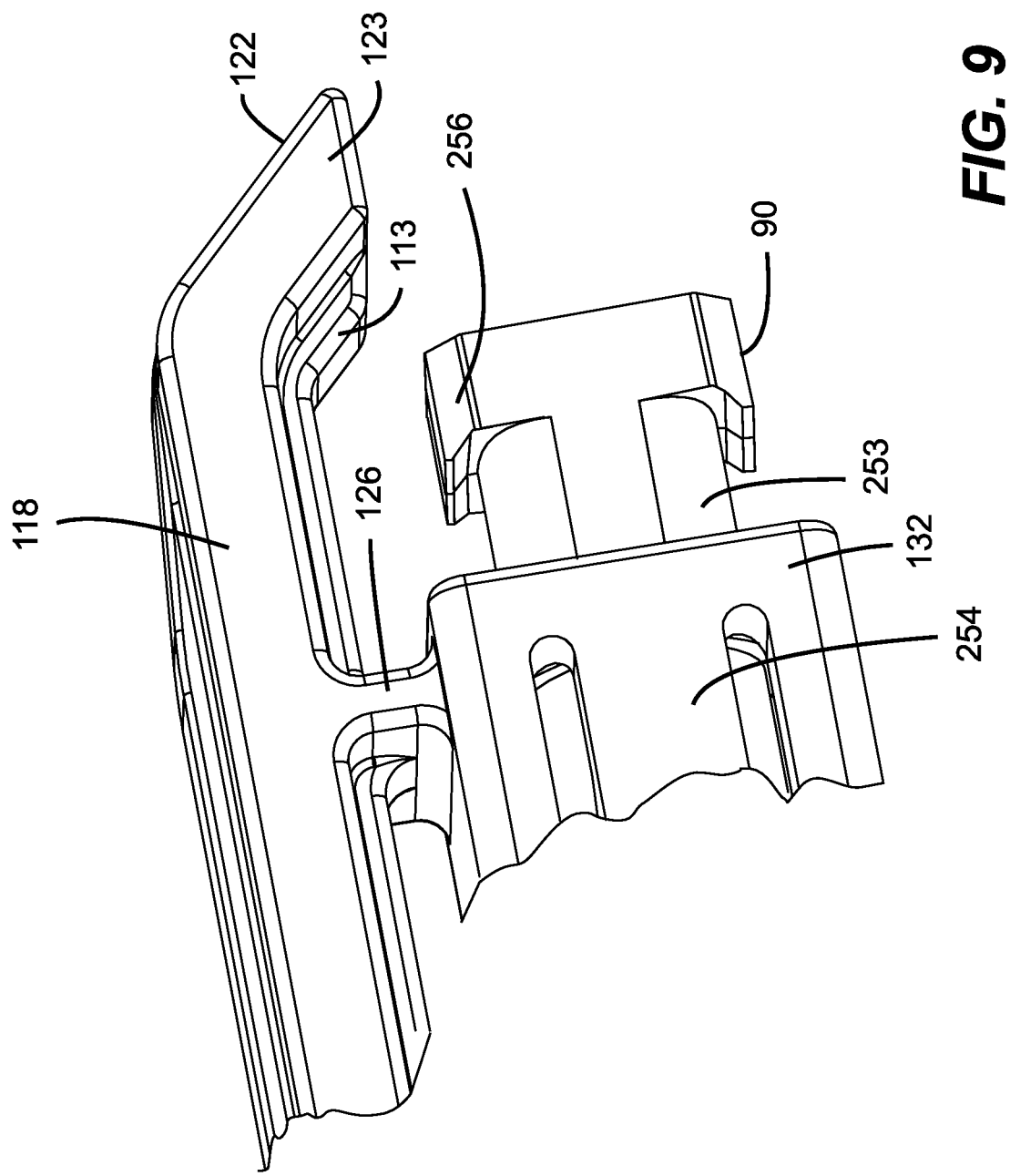
FIG. 9 illustrates the rear end regions of the latches of the fiber optic connector of FIGS. 6-8.

Referring now to FIGS. 7-9, each front housing 132 of the connector portions 112 defines a latch 118 with a front end 124 and a rear end 122. Latch 118 is designed with a certain amount of elastic flexibility to pivot around a connection point 126 during latching and unlatching of latch 118 from an adapter such as adapter 100. Latch 118 is the portion of the connector 110 that is designed to secure connector 110 to adapter 100. The latch 118 functions similar to that of a conventional LC connector as shown in FIGS. 1-2 in coupling the connector 110 to the adapter 100. The latch 118 includes a pair of shoulders 128 at the front end 124 (as shown in FIG. 6) that mate with latching shoulders 208 of adapter 100 to secure the connector 110 to the adapter 100 (as shown in FIGS. 3-5). As noted, in the illustrated embodiment, each connector portion 112 defines an LC profile, meaning that the connector portion 112 can mate with an LC format adapter. The rear end 122 of each latch includes an angled-down portion 123 that is configured to interact with a strain relief boot of the connector 110 as will be discussed in further detail below.

Illustrated in further detail in FIGS. 13, 14, and 16-18, each front housing 132 includes an inner passage 136 for receiving the ferrule assembly 76. The inner passage 136 includes a hub mount 137 toward the font of the front housing 132 that defines a keyed configuration for receiving the ferrule hub 80 in a predetermined keyed orientation. The exterior surface of the ferrule hub 80 is designed with a plurality of flats 85 for rotationally tuning the ferrule hub 80 and axially inserting the ferrule hub 80 within the hub mount 137 in a certain keyed orientation. The flats 85 defined on the surface of the ferrule hub 80 and mating surfaces of the hub mount 137 rotationally fix the ferrule hub 80 with respect to the front housing 132. In this manner, when the front housing is rotated, the ferrule hub 80 rotates therewith.

The hub mount 137 defines a tapered front shoulder 139 for contacting the front of the ferrule hub 80 and limiting further forward movement of the ferrule hub 80. As noted above, when the front housing 132 rotates, the ferrule hub 80 and the epoxied ferrule 78, including the optical fiber 156/158 terminated thereto, rotates with the front housing 132, all relative to the rear housing 90, as shown in FIG. 14.

The front housings 132 are inserted into, for mating with similar format connectors, inner passages 202 of adapter 100. The adapter 100 includes two side-by-side passages 202 and two ferrule alignment sleeves 204 therewithin. Each alignment sleeve 204 is configured to axially align the ferrules 78 for mating two similar connectors.

The front housings 132 can be unitarily molded with the latches 118 as a one-piece element. In the depicted example, the front housings 132 define an LC profile for mating with ports 210 of adapter 100. While the example connector 110 is depicted as a duplex connector that includes two fiber optic connector portions 112, it is to be appreciated that the inventive features discussed herein are fully applicable to a connector 110 that may include a single connector portion 112.

As mentioned above, the connector 110 of the present disclosure is designed such that a strain relief boot 114 that is mounted to and slidable with respect to the yoke portion 96 of the connector allows the latching/unlatching functionality of the connector 110. The strain relief boot is illustrated in further detail in FIGS. 10, 11, 13, 14, and 20.

Referring to FIGS. 10, 13, 14, and 20, the boot 114 defines a throughhole 149. The throughhole 149 forms a front opening 154 for receiving the yoke 96. Boot 114 includes a flexible rear portion 159 to act as strain relief for the optical fibers 156, 158 that pass through the boot 114. The boot 114 is designed to be movable away from connector portions 112, also relative to the yoke 96, in a longitudinal direction (Direction A in FIG. 8) causing pivoting movement of latch 118 about connection point 126 (Direction B in FIG. 8). Such pivoting movement allows for unlatching of connector portions 112 from adapter 100. Boot 114 simultaneously moves both latches 118 to allow for connector 110 to be unlatched from a duplex adapter or adapters 100 with side-by-side ports 210.

Figure 20:
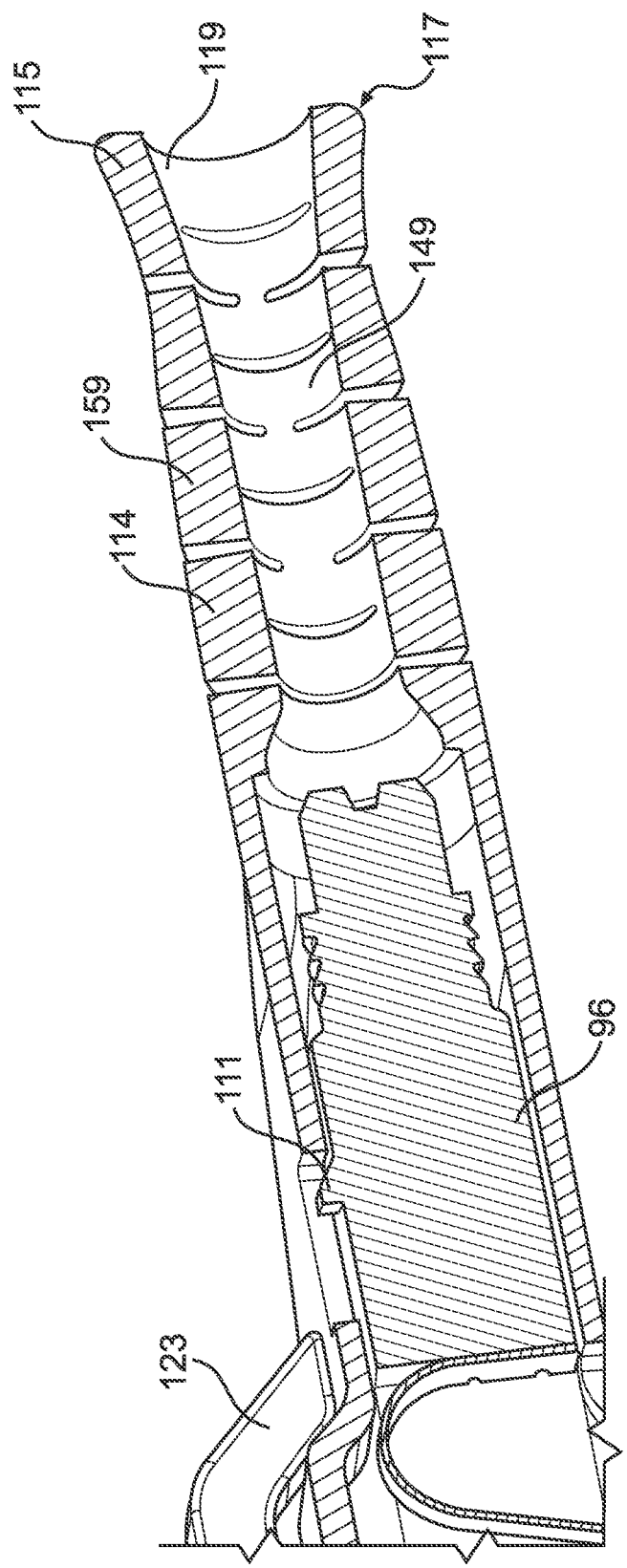
FIG. 20 illustrates a cross-sectional view of a rear end of the strain relief boot to illustrate the external flared portion and the enlarged inner radius thereof.

Referring now to FIG. 20, a flared exterior portion 115 at a rear end 117 of the flexible rear portion 159 of the boot 114 acts as a grip portion to facilitate pulling of the boot 114 rearward for unlatching the connector 110. As illustrated in FIG. 20, the rear end of the opening or throughhole 149 of the boot 114 also follows the general shape of the flared exterior portion 115 to provide a flared interior surface 119. The flared, enlarged, interior surface 119 defines an inside radius that limits sharp cable bends when load is applied to the cable, to decrease bending loss.

Still referring to the boot 114 as shown in FIGS. 7-10, 13, 14, and 20, boot 114 defines a sloped exterior surface 151 adjacent the front end that is configured to interact with the angled portions 123 of the rear ends 122 of the latches 118 during slidable movement of the boot 114. A lifting motion results for the rear ends 122, which results in a downward movement of front ends 124 of latch 118, when boot 114 is pulled longitudinally away from a remainder of connector 110. Compare FIGS. 7 and 8. A user can pull on boot 114 in a longitudinal direction away from the ferrules 78, and remove the connector 110 from the adapter 100, without directly engaging the latches 118.

Figure 10:
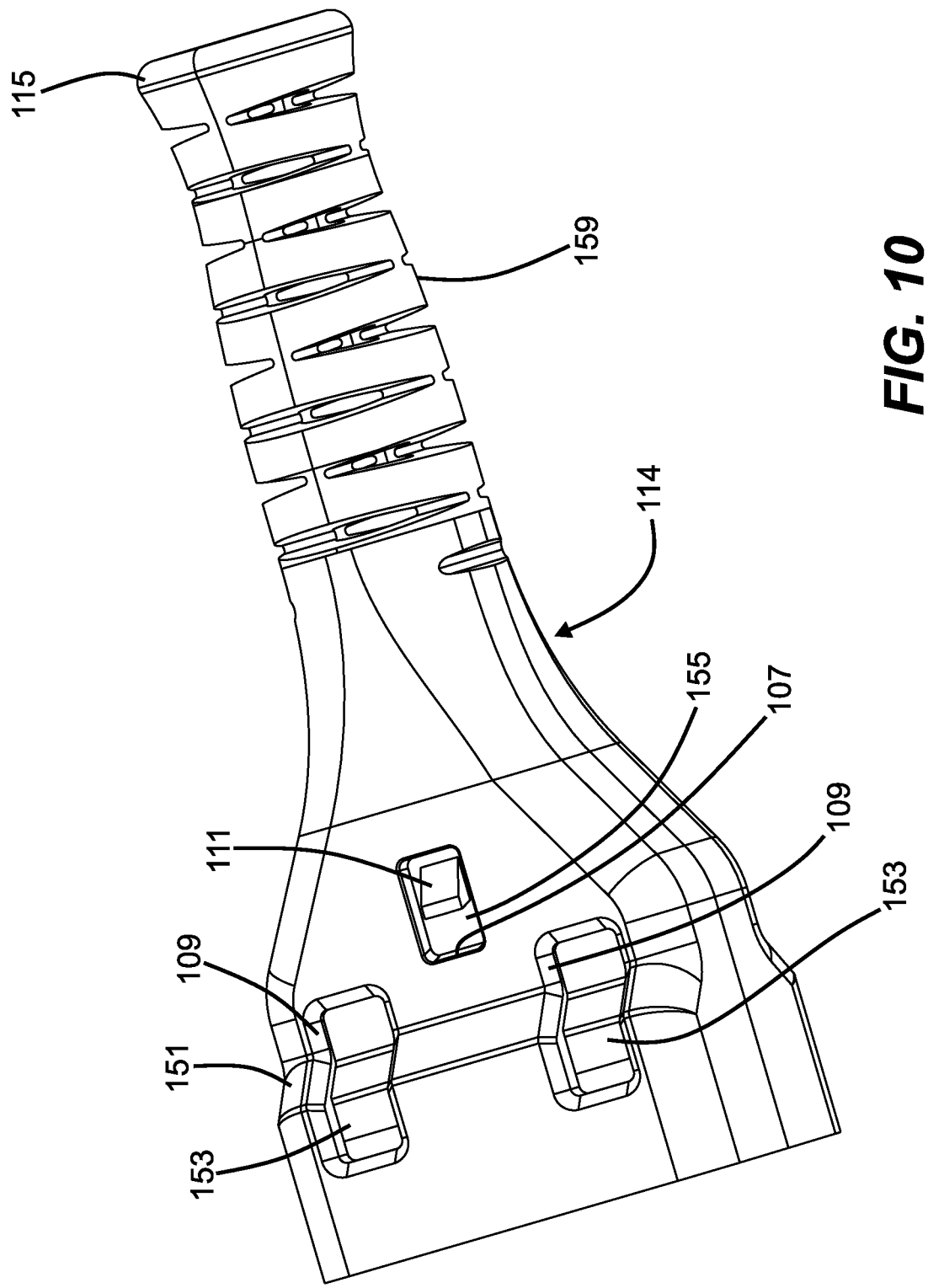
FIG. 10 illustrates the strain relief boot portion of the fiber optic connector of FIGS. 6-8.
Figure 11:
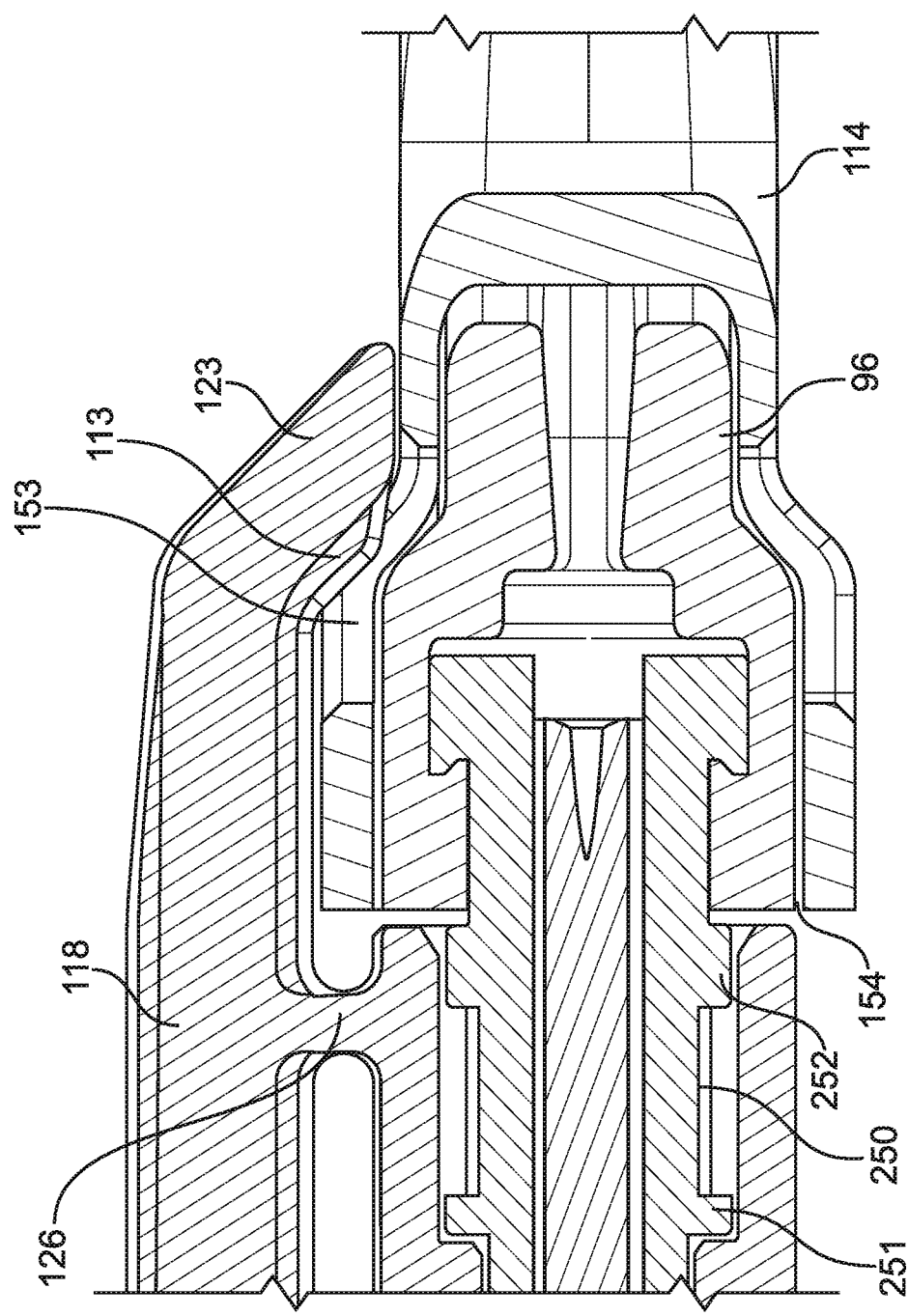
FIG. 11 is a cross-sectional view illustrating the interaction between the rear end of the latch of the fiber optic connector of FIG. 9 and the boot of FIG. 10.

As shown in detail in FIGS. 9-11, the boot 114 also includes a pair of side-by-side slots or recesses 153 which receive latch protrusions 113 defined underneath the angled portions 123 of the rear ends 122 of latches 118. The protrusions 113 and the recesses 153 interact as stops during polarity reversal of the connector portions 112 such that the front housings 132 end up in the correct position with respect to the rear housings 90 after rotation. The exiting sides of the recesses 153 include a bevel 109 to facilitate rotation of the latch 118 out of a given recess 153 with little force. The bevels 109 help with starting rotation of the front housings 132 for polarity reversal.

The boot 114 includes similar slots 153 on an opposing side of the boot 114. Thus, the boot 114 stays stationary during rotation of the front housings 132 for polarity reversal.

For the latching and unlatching functionality, a tab 111 defined on the yoke 96 (as shown in FIGS. 11 and 15) mates with an aperture 155 defined on the boot 114 to allow longitudinal movement of boot 114 relative to yoke 96. The tab 111, however, is configured to abut a front end 107 of the aperture 155 to act as a stop for the slidable boot 114.

Figure 16:
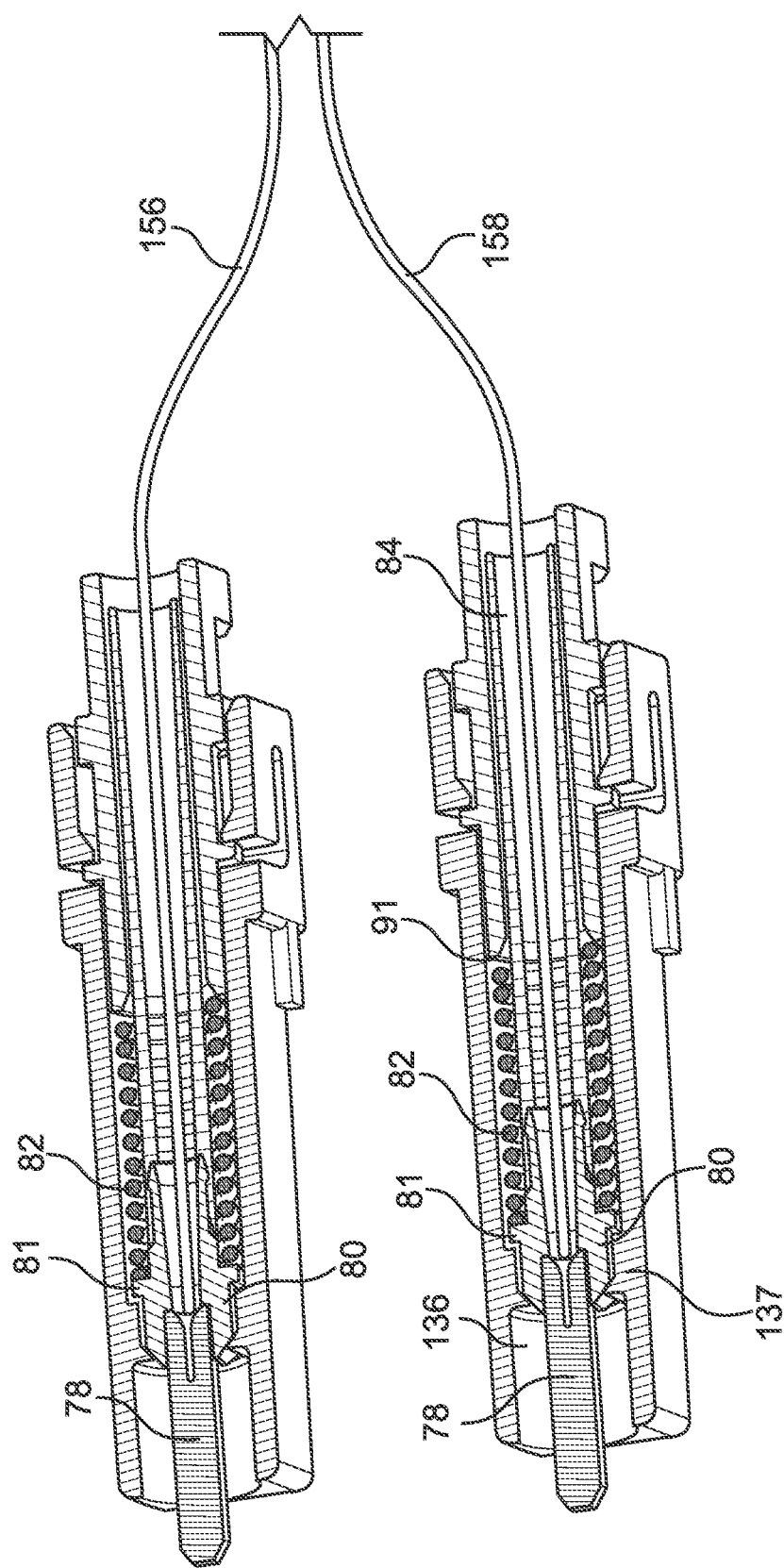
FIG. 16 is a partial assembly view of the fiber optic connector of FIGS. 6-8 illustrating cross-sectional views bisecting the front and rear housings of the connector portions.
Figure 17:
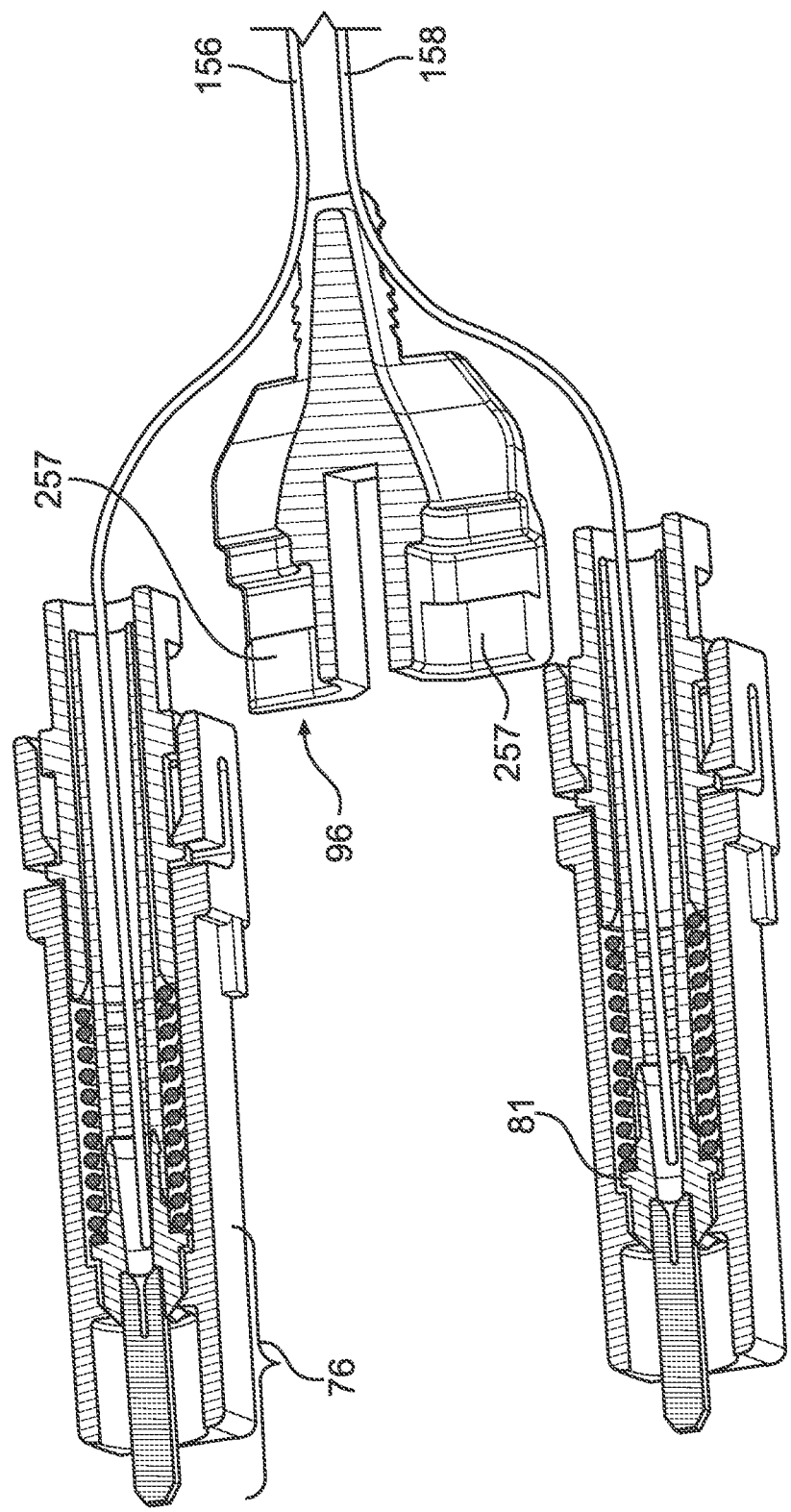
Figure 18:
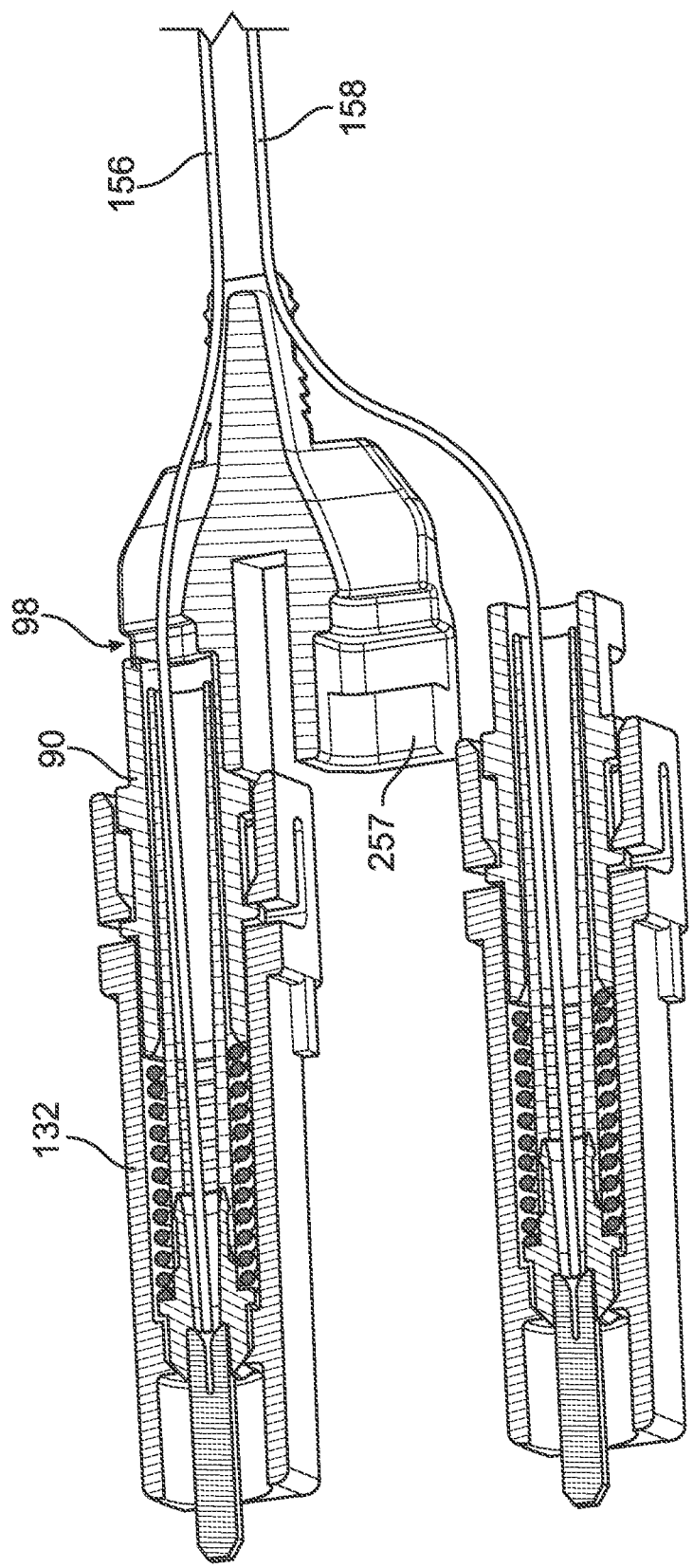
FIG. 18 illustrates the partial assembly view of the fiber optic connector of FIG. 17 with one of the connector portions coupled to the yoke.

Now referring generally to FIGS. 16-19, to assemble the connector 110, the fiber optic cable is initially inserted through boot 114 and the crimp sleeve 106. The fibers 156, 158 are inserted through the rear housings 90 and the tubes 84 and affixed to the ferrules 78 of the ferrule assemblies 76. The ferrule assemblies 76 are keyed as discussed above and placed within the front housings 132. As shown in FIGS. 16-18, the rear housings 90 are axially inserted and snapped into the front housings 132 with springs 82 positioned between the ferrule hubs 80 and the rear housings 90. The tubes 84 extend rearward from the ferrule hubs 80 and are partially positioned within both the front housings 132 and the rear housings 90.

As noted above, the rear housings 90 and the optical fibers 156, 158 are inserted in a lateral direction through the side slots 98 of the yoke 96, as shown in FIGS. 17-19. The side slots 98 of the yoke 96 enable the fibers 156, 158 to come in from the sides of the yoke 96 and allow the connector portions 112 to be epoxied and polished before the cable has to be crimped to the overall connector 110. It should be noted that the boot 114 may define internal ribs that are configured to protrude into the side slots 98 of the yoke 96 for the purposes of constraining the fibers 156, 158 within the side slots 98 and limit deflection of the fibers.

Once the connector portions 112 have been placed on the yoke 96 with rear housings 90 having been inserted laterally into the yoke 96, the cable jacket and strength members in the form of aramid yarns may be crimped to the crimp region 104 of the yoke 96 via the crimp sleeve 106, as shown in FIG. 19. As shown, the crimp region 104 is provided as a rear projection 99 that extends from the yoke 96.

Referring generally to FIGS. 15 and 19, an exterior surface 97 of the rear projection 99 that defines the crimp region 104 can be textured (e.g., knurled, ridged, provided with small projections, etc.) to assist in retaining the strength members (e.g., aramid yarns) on the yoke 96. In the depicted example, the exterior surface 97 defines a series of parallel rings or ridges 95 extending in a direction from the rear end of the rear projection 99 toward the main body of the yoke 96. As shown, each of the rings 95 define discretely spaced scalloped portions 93 that are positioned peripherally around the rings 95. The scalloped portions 93 define teeth 201 thereinbetween. As illustrated, the scalloped portions 93 (and the teeth 201) are provided in an offset or staggered relationship between adjacent rings 95 as the rings 95 extend front to back. In this manner, when the strength members are pressed underneath the crimp sleeve 106 against the exterior surface 97 of the rear projection 99, the strength members will tend to spread out and follow zig-zagging patterns as they are captured underneath the crimp sleeve 106, leading to increased yarn and jacket retention. The staggered design of the scallops 93 and the teeth 201 provided therebetween force the strength members laterally into the scallops 93 in a zig-zagging pattern, such that the strength members do not simply lay parallel to the rear projection 99 in a front-to-back direction, but make multiple lateral bends over multiple edges, to increase the amount of pull force needed to separate the cable from the connector 110.

As shown in FIG. 15, the rear projection 99 may include a step down portion 89 with full annular rings 95 that are smaller in diameter for engaging with the jacket of the cable and providing jacket retention.

Once the cable is crimped to the yoke 96, the boot 114 is pulled over the yoke 96 as the yoke enters the front opening 154 of the boot 114 until the rear ends 122 of the latches 118 are in the slots 153 of boot 114 and the tab 111 of the yoke 96 is within the aperture 155 defined on the boot 114 (as shown in FIGS. 9-11). As noted previously, the tab 111 is configured to abut a front end of the aperture 155 to act as a stop for the boot 114 when the boot 114 is slid rearwardly.

Figure 12:
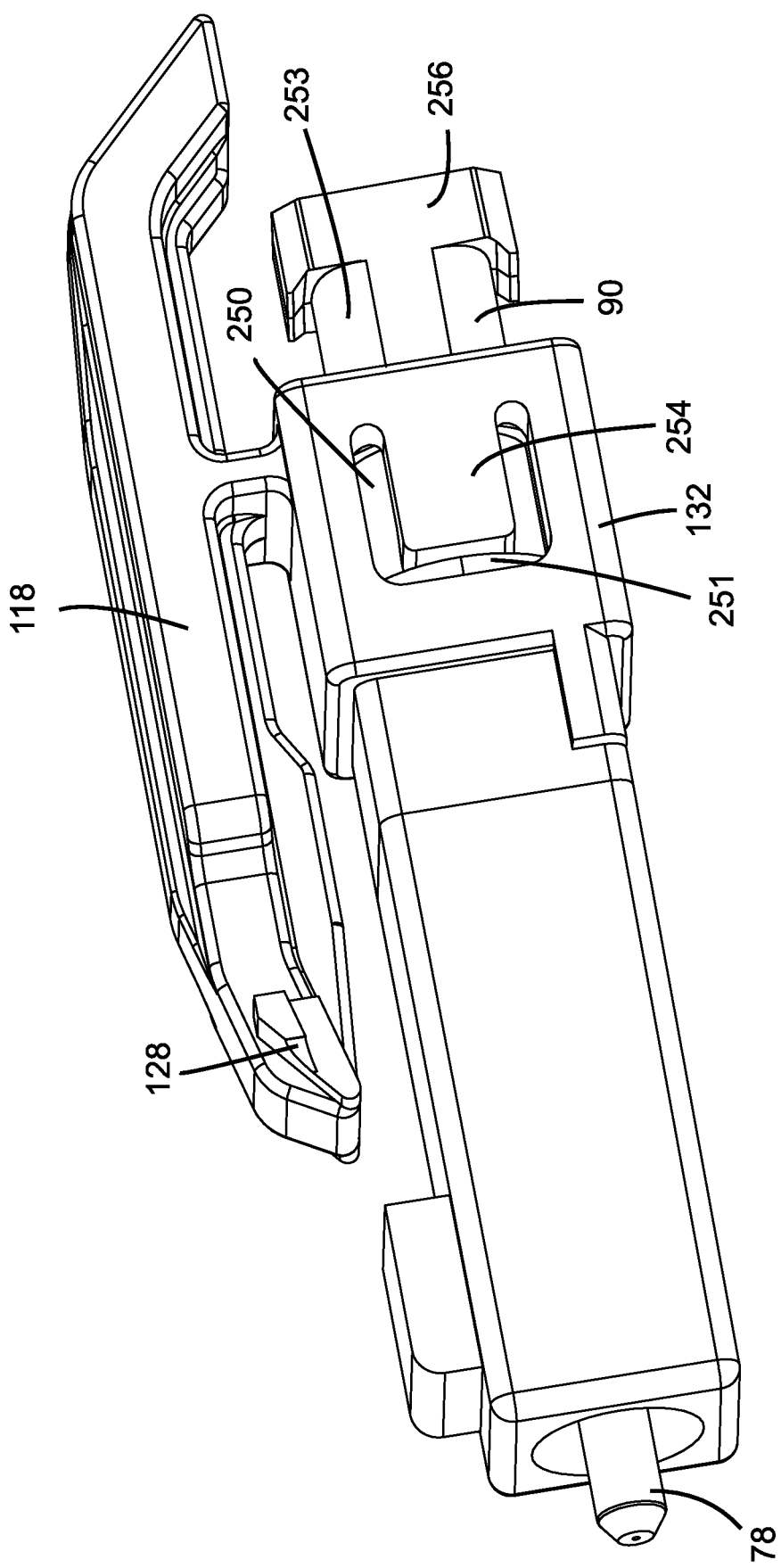
FIG. 12 illustrates the front and rear housings of the connector portions of the fiber optic connector of FIGS. 6-8 separated from the yoke and the boot of the fiber optic connector.

Now referring specifically to FIGS. 12-14, the polarity reversal functionality of the connector 110 will be discussed in further detail. As noted above, in the illustrated example of the connector 110, the front housing 132 includes the ferrule assembly 76 that includes the ferrule hub 80, which is keyed and rotationally fixed to the front housing 132 such that the ferrule hub 80 and thus, the ferrule 78 rotate with the front housing 132 during polarity reversal.

To switch polarity of connector portions 112, the front housings 132 are rotated in opposite directions so that the rear ends 122 of the latches 118 are moved from slots 153 on a first side of the boot 114 to slots 153 positioned on the opposite side of the boot 114. During polarity switching, boot 114 remains coupled to the yoke 96.

During the polarity switch, the front housing 132 slidably rotates over the rear housing 90 to change the polarity of the overall connector 110.

The rear housing 90 forms a front annular recess or notch 250 that is defined to between a front annular ring 251 and a center annular ring 252. As shown in FIG. 12, flexible portions 254 of the sidewalls of the front housing 132 fit within the annular recess 250 when the rear housing 90 is fitted within the front housing 132. In this manner, the front housing 132 is rotatable relative to the rear housing 90, but the front and rear housings are axially fixed with respect to each other.

The rear housing 90 also forms a rear annular recess or notch 253 positioned between the center annular ring 252 and a rear shoulder 256. Both the rear annular recess 253 and the rear shoulder 256 define a generally square cross-sectional profile.

The rear housings 90, as noted above, are received by the yoke 96 through the side slots 98 defined by the yoke 96. The side slots 98 define C-shaped front cut-outs 257 at the front of the yoke 96. The portion of the rear housing 90 that includes the square rear annular recess 253 and the rear shoulder 256 are laterally and slidably positioned within the C-shaped cut-outs 257.

The internal configuration of the slide slots 98, including the C-shaped cut-outs 257, of the yoke 96 and the rear annular recess 253 defined by the rear housing 90, including the rear shoulder 256, intermate to rotationally fix the rear housing 90 with respect to the yoke 96. Thus, when the front housing 132 is rotated with respect to the rear housing 90, the rear housing 90 and the yoke 96 (and the boot 114, which is rotationally fixed with respect to the yoke 96) stay stationary.

As noted above, the internal tube 84, which is configured to prevent excess epoxy from leaving the ferrule hub portion 80, is positioned within both the front housing 132 and the rear housing 90 and extends rearward from the ferrule hub 80. Since the ferrule hub 80 is rotationally fixed with respect to the front housing 132 and rotates with the front housing 132, the tube 84 may also rotate with the ferrule hub 80 depending upon the strength of the relative frictional engagement between the tube 84 and the ferrule hub 80.

Now referring to FIGS. 7-8 and 21-24, even though the latch 118 may be designed with a certain amount of elastic flexibility to pivot around a connection point 126, and the elasticity of the connection point 126 may provide the needed force to return the boot 114 back to a neutral position after the boot 114 has been pulled, in certain example embodiments, the boot 114 may include an additional biasing feature 300 for returning the boot 114.

Figure 21:
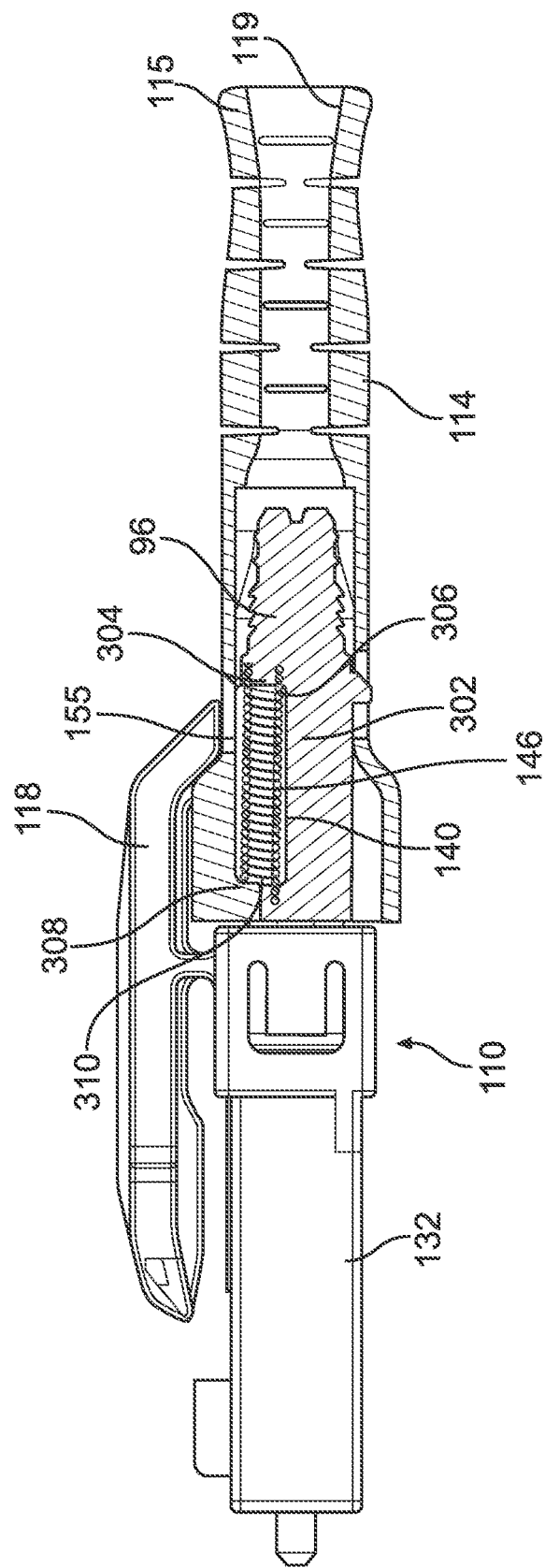
FIG. 21 illustrates one example embodiment of a biased boot-return feature that can be implemented on the fiber optic connector for returning the boot toward the forward position of FIG. 7.

In the example illustrated in FIG. 21, the biasing feature 300 includes a spring-based return feature 302. A pocket 140 defined within the yoke 96 may receive a return spring 146. The pocket 140 of the yoke 96 is configured to position the spring between the rear housings 90. A rear end 304 of the return spring 146 may be designed to abut a rear wall 306 of the pocket 140 within the yoke 96, and a front end 308 of the return spring 146 may abut an internal rear face 310 defined within the boot 114 to bias boot 114 toward the forward position of FIG. 7 when released by the user. When the user pulls boot 114 longitudinally away from the connector portions 112, the spring 146 is compressed. Spring 146 moves the boot 114 back to the rest position of FIG. 7 upon release by the user. The pocket 140 of the yoke 96 may be accessible through an opening such as the aperture 155 defined on the boot 114.

Figure 22:
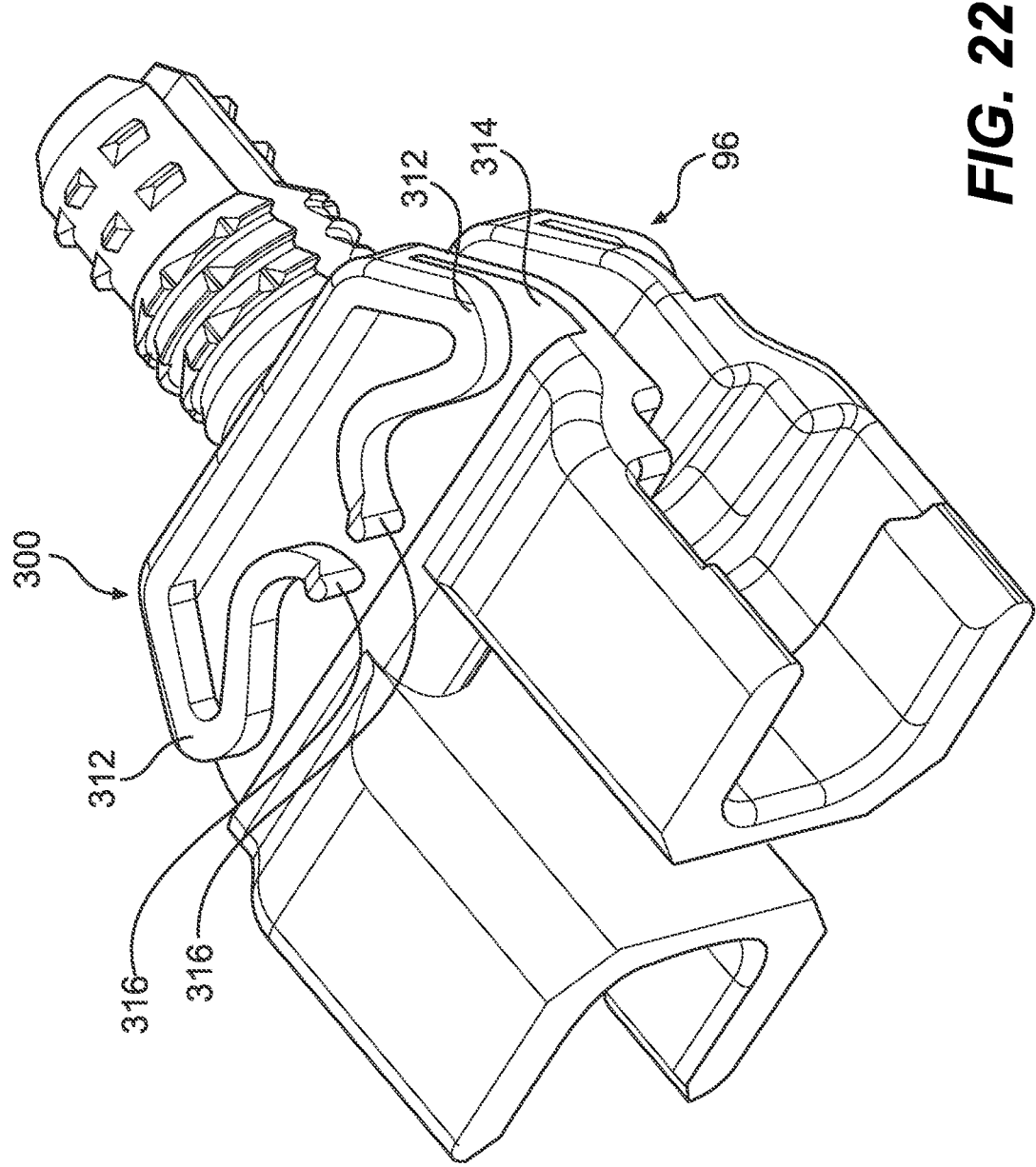
FIG. 22 illustrates another example embodiment of a biased boot-return feature that can be implemented on the fiber optic connector for returning the boot toward the forward position of FIG. 7.
Figure 23:
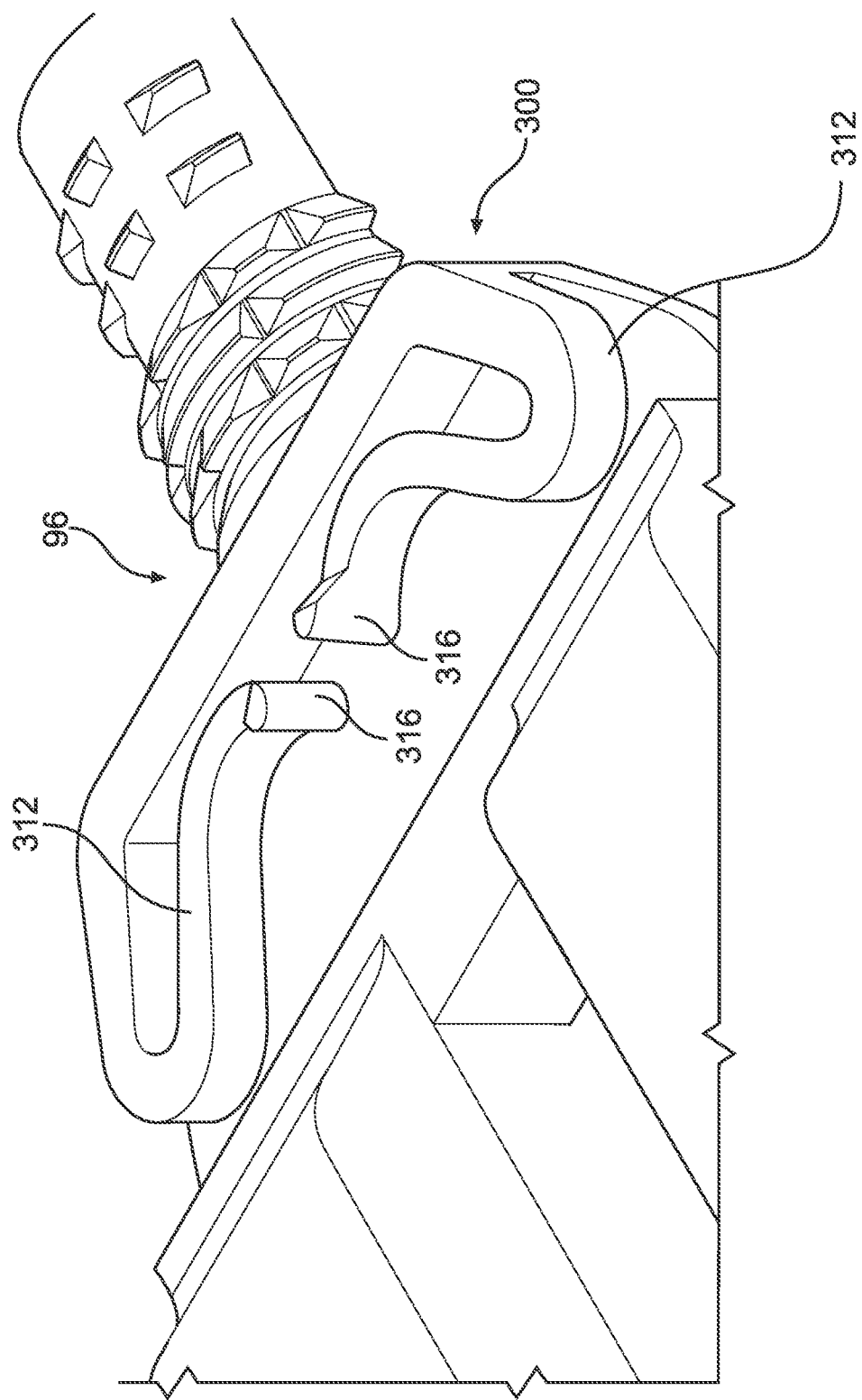
FIG. 23 illustrates the boot-return feature of FIG. 22 in a flexed position.

Referring now to FIGS. 22-23, another version of the biasing feature 300 may include integrally molded fingers 312 that are unitarily molded with the yoke 96 that are configured to interact with the boot 114 to return the boot 114 back to a neutral position. In the version of FIGS. 22-23, the flexible biasing fingers 312 are provided within a horizontal pocket 314 defined on the yoke 96. The fingers 312 define contact points 316 that can contact an internal rear face 310 defined within the boot 114 to bias the boot 114 toward the forward position. FIG. 23 illustrates the fingers 312 in a flexed position.

Figure 24:
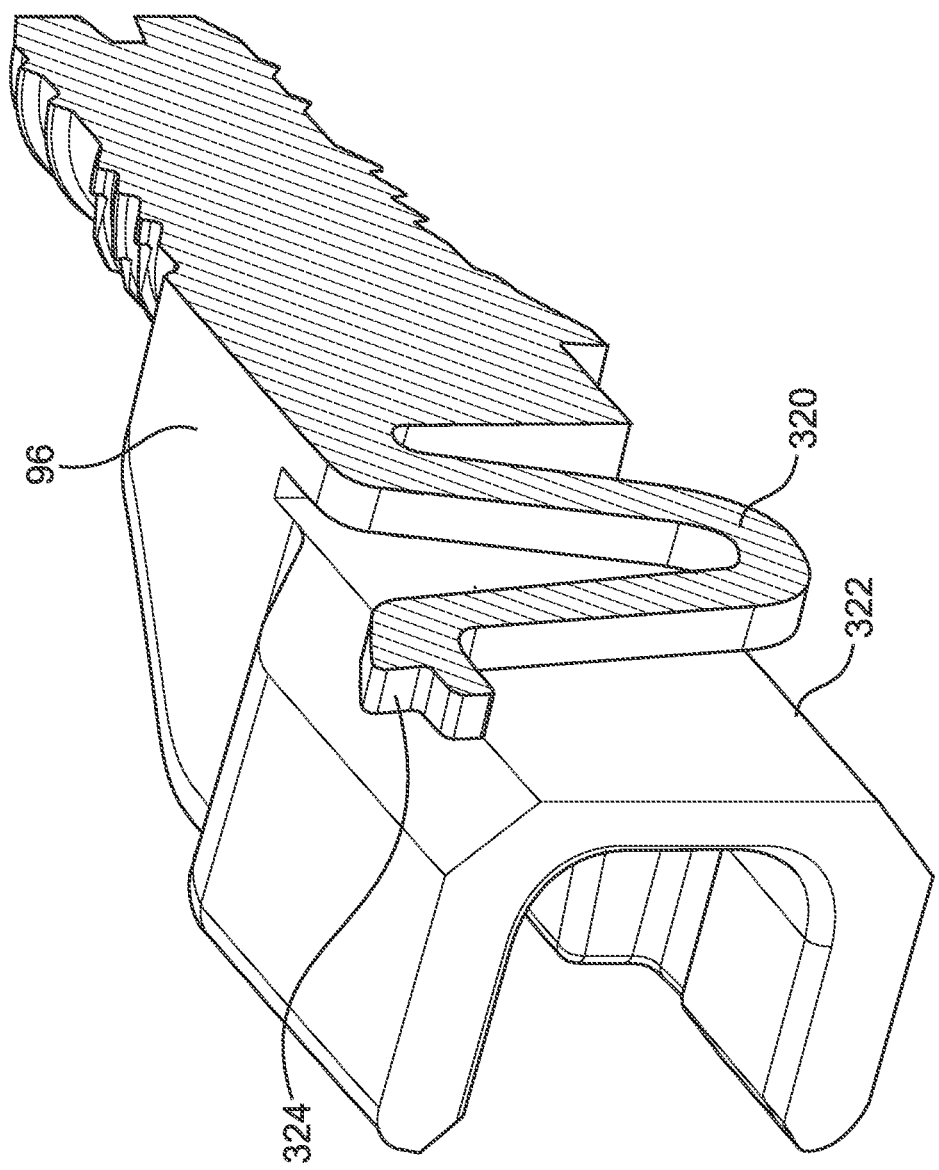
FIG. 24 illustrates yet another example embodiment of a biased boot-return feature that can be implemented on the fiber optic connector for returning the boot toward the forward position of FIG. 7.

FIG. 24 illustrates another example of flexible biasing fingers 320 that are integrally molded with the yoke 96. In the example illustrated in FIG. 24, the flexible fingers 320 are provided within a vertical pocket 322 positioned between the side slots 98 defined by the yoke 96. Similar to the example shown in FIGS. 22-23, the vertical flexible fingers 320 define contact points 324 that can contact the internal rear face 310 defined within the boot 114 to bias the boot 114 toward the forward position.

By providing the biasing features 300 such as the spring 146 in between the rear housings 90 or by eliminating a separate, removable biasing feature such as a spring and forming the biasing feature as an integral part of the yoke 96 via structures such as the flexible fingers 312, the overall length of the connector 110 can be reduced.

Figure 25:
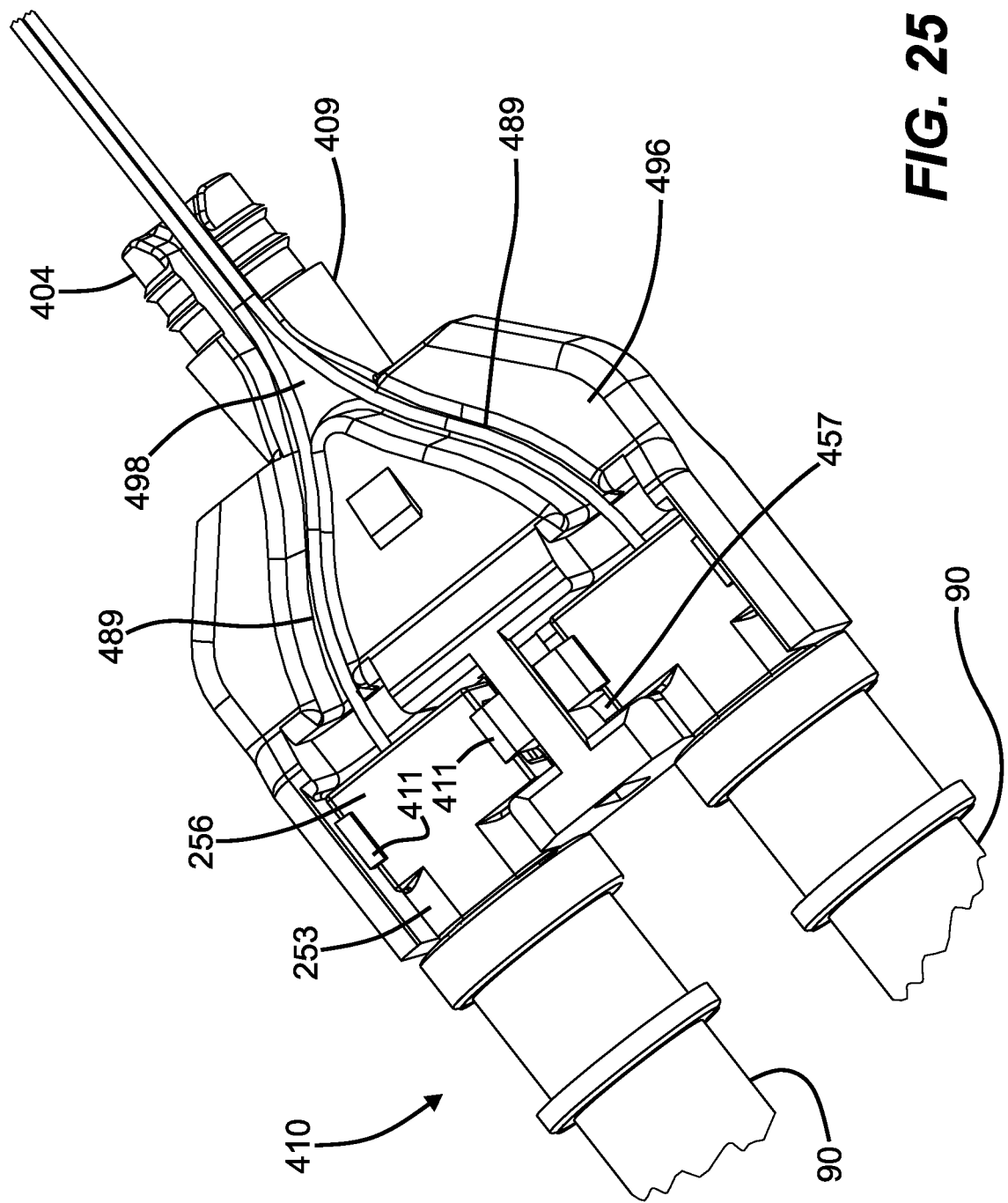
FIG. 25 illustrates a top perspective, cross-sectional view of a portion of another embodiment of a fiber optic connector having features that are examples of inventive aspects in accordance with the present disclosure.
Figure 26:
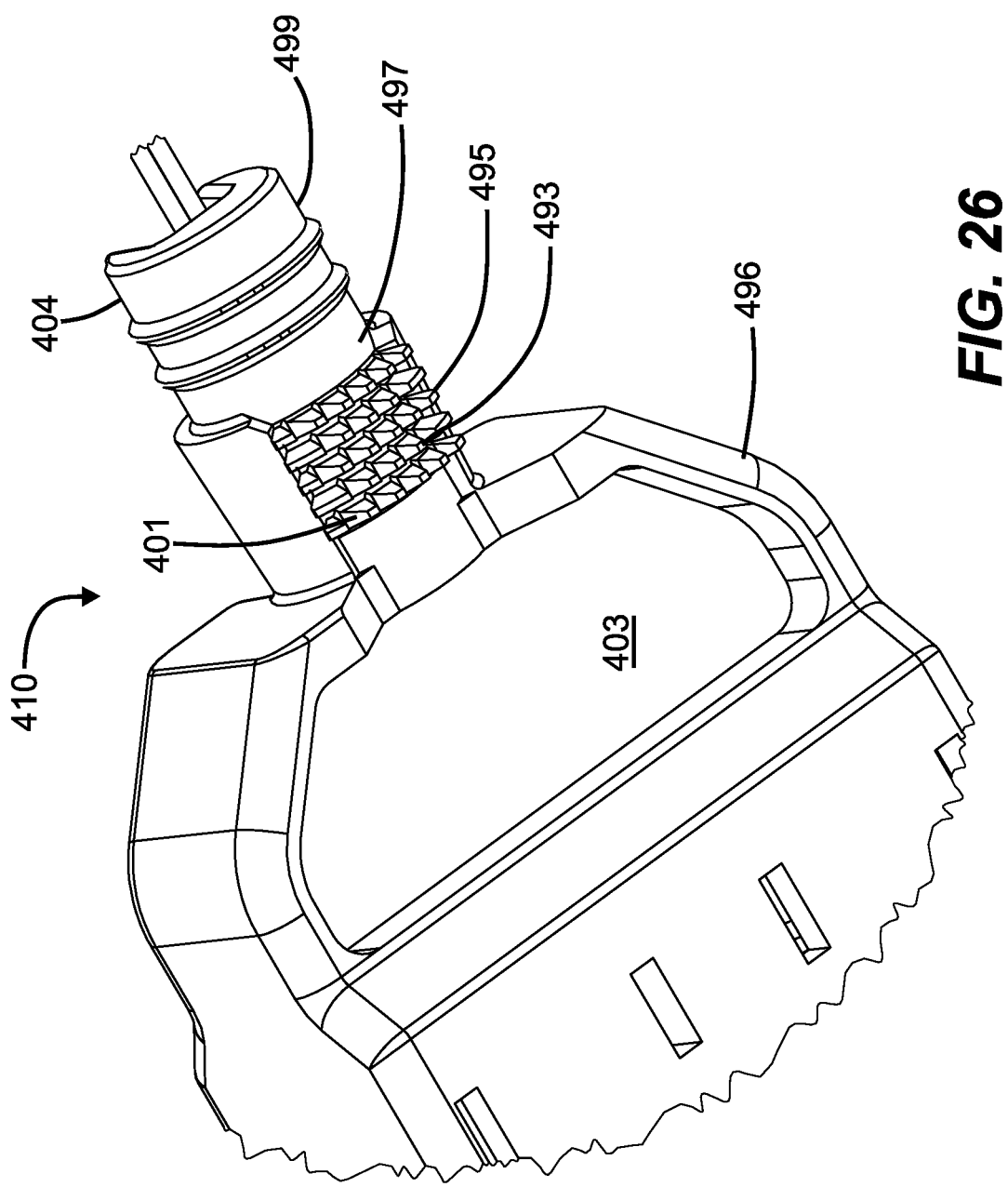
FIG. 26 illustrates a bottom perspective, cross-sectional view of a portion of the fiber optic connector of FIG. 25.

FIGS. 25-26 illustrate another example of a duplex connector 410 that has features similar to that of the connector 110 described above. In the example connector 410 shown in FIGS. 25-26, a yoke portion 496 of the connector 410 is designed for top loading the connector portions 112 instead of a side-loading design such as that illustrated for connector 110 described above.

As shown in FIG. 25, the yoke 496 defines side-by-side pockets 457 for receiving the portions of the rear housings 90 that include the square annular recess 253 and the rear shoulder 256 from thereabove. The yoke 496 further defines opposing flexible tabs 411 flanking each pocket 457 that are configured to capture the rear shoulder 256 of the rear housings 90 once the rear housings 90 have been inserted into the pockets 457. As shown, the internal configuration of the pockets 457 of the yoke 496 and the rear annular recess 253 defined by the rear housing 90, including the rear shoulder 256, intermate to rotationally fix the rear housing 90 with respect to the yoke 496. And, as noted above, the flexible tabs 411 retain the rear housings 90 within the pockets 457 in a vertical direction. Thus, similar to the embodiment of the connector 110 discussed previously, in the connector 410, when the front housing 132 is rotated with respect to the rear housing 90, the rear housing 90 and the yoke 496 (and the boot 114, which is rotationally fixed with respect to the yoke 496) stay stationary.

As further shown, a cable path 498 is defined within the yoke 496 for receiving the cables from the top of the yoke 496. The cable path 498 extends all the way from a crimp region 404 defined by the yoke 496 to the pockets 457, splitting into two separate sections 489 for leading to each of the pockets 457.

In the example of the connector 410 shown in FIGS. 25 and 26, the crimp region 404 of the yoke 496 is similar in configuration to that of the yoke 96 shown in FIG. 15 in that the crimp region 404 is provided as a rear projection 499 that is integrally formed with and extends from the yoke 496. Similar to the crimp region 104, the crimp region 404 defines an exterior surface 497 that is textured (e.g., knurled, ridged, provided with small projections, etc.) to assist in retaining the strength members (e.g., aramid yarns) on the yoke 496. Similar to the crimp region 104 discussed above, in the depicted example of the crimp region 404, the exterior surface 497 defines a series of parallel rings or ridges 495 extending in a direction from the rear end of the rear projection 499 toward the main body of the yoke 496. As shown, some of the rings 495 may define discretely spaced scalloped portions 493 that are positioned peripherally around the rings 495. The scalloped portions 493 define teeth 401 thereinbetween. As noted in the previous examples, the scalloped portions 493 (and the teeth 401) may be provided in an offset or staggered relationship between adjacent rings 495 as the rings 495 extend front to back. In this manner, when the strength members are pressed underneath a crimp sleeve 106 against the exterior surface 497 of the rear projection 499, the strength members will tend to spread out and follow zig-zagging patterns as they are captured underneath the crimp sleeve 106, leading to increased yarn and jacket retention. It is also contemplated that the teeth 401 may be configured such that they are deformed or smashed against the strength members to provide further retention.

As shown in the bottom perspective view of the yoke 496 in FIG. 26, a pocket 403 may be defined by the main body portion of the yoke 496 for accommodating any excess strength members after the strength members have been crimped at the crimp region 404.

Figure 27:
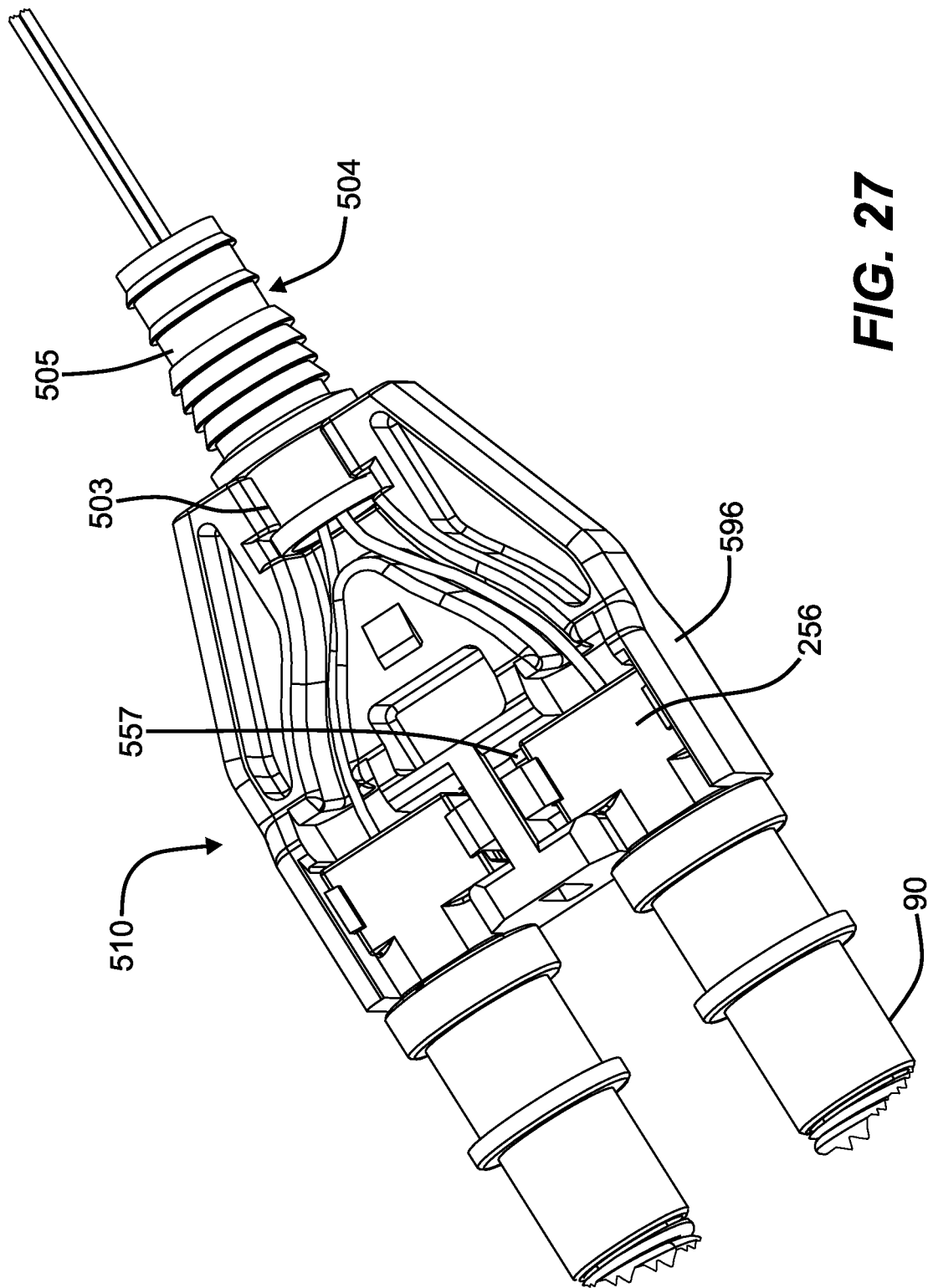
FIG. 27 illustrates a top perspective, cross-sectional view of a portion of another embodiment of a fiber optic connector having features that are examples of inventive aspects in accordance with the present disclosure.

Referring now to FIG. 27, another version of a connector 510 that has features similar to connectors 110 and 410 discussed above is illustrated. The version of the connector 510 shown in FIG. 27 has a top-load design similar to the connector 410 shown in FIGS. 25-26. However, in the connector 510, the crimp region 504 is provided as a separate crimp body 505 that is removably mounted to a yoke 596 of the connector 510 instead of being integrally formed with the yoke as a rear extension. With the design illustrated in FIG. 27, the crimp body 505 can be used to crimp the strength members of the cables before the cables are terminated to the connector portions 112. Once cables have been crimped and terminated to the connector portions 112, the crimp body 505 can be slidably inserted into a complementary slot 503 defined on the yoke 596, while the rear shoulders 256 of the rear housings 90 are inserted into pockets 557 defined within the yoke 596.

Figure 28:
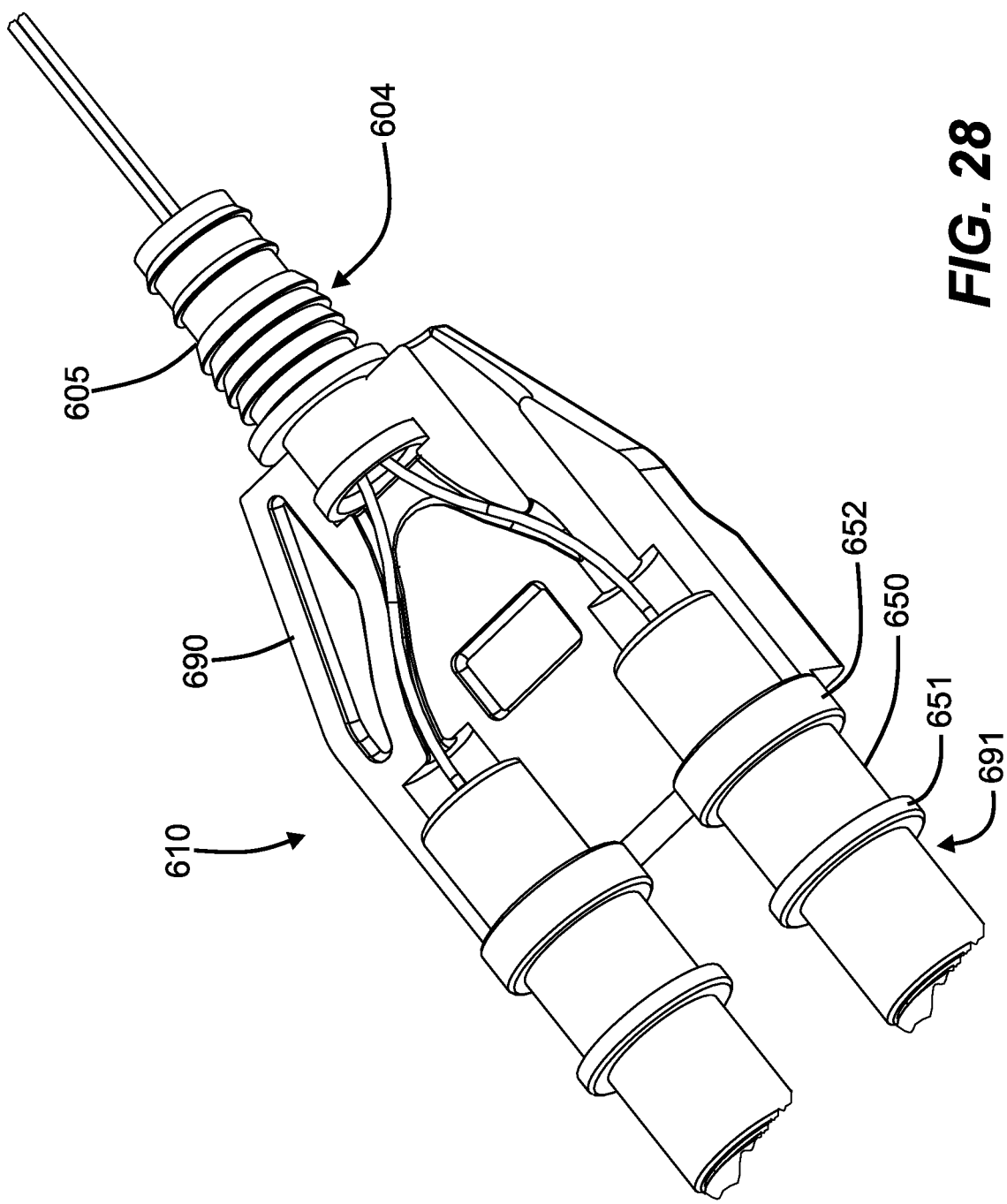
FIG. 28 illustrates atop perspective, cross-sectional view of a portion of yet another embodiment of a fiber optic connector having features that are examples of inventive aspects in accordance with the present disclosure.

Now referring to FIG. 28, another example of a connector 610 that has features similar to those of connectors 110, 410, and 510 is illustrated. However, in the connector 610 shown in FIG. 28, the rear housings and the yoke are combined into a single integral structure 690 forming the rear portion of the connector 610. Similar to connectors 110, 410, and 510 discussed above, the structure 690 defines a front extension 691 that has a front annular ring 651 and a rear annular ring 652 with an annular recess 650 therebetween. As described with respect to the connector 110 discussed above, flexible portions 254 of the sidewalls of the front housings 132 can fit within the annular recess 650 defined by the front extension 691 when each front housing 132 is coupled to the structure 690 of the connector 610. In this manner, the front housings 132 are rotatable relative to the structure 690 for polarity reversal, but the front housings 132 are axially fixed with respect to structure 690.

It should be noted that although the connector 610 is illustrated with a crimp region 604 that is provided as a separate crimp body 605 that is removably mounted to the structure 690, in other examples, the crimp region can be integrally formed with the structure 690 as a rear extension as discussed for other above examples shown, for example, in FIGS. 15, 17-19, 25, and 26.

Figure 29:
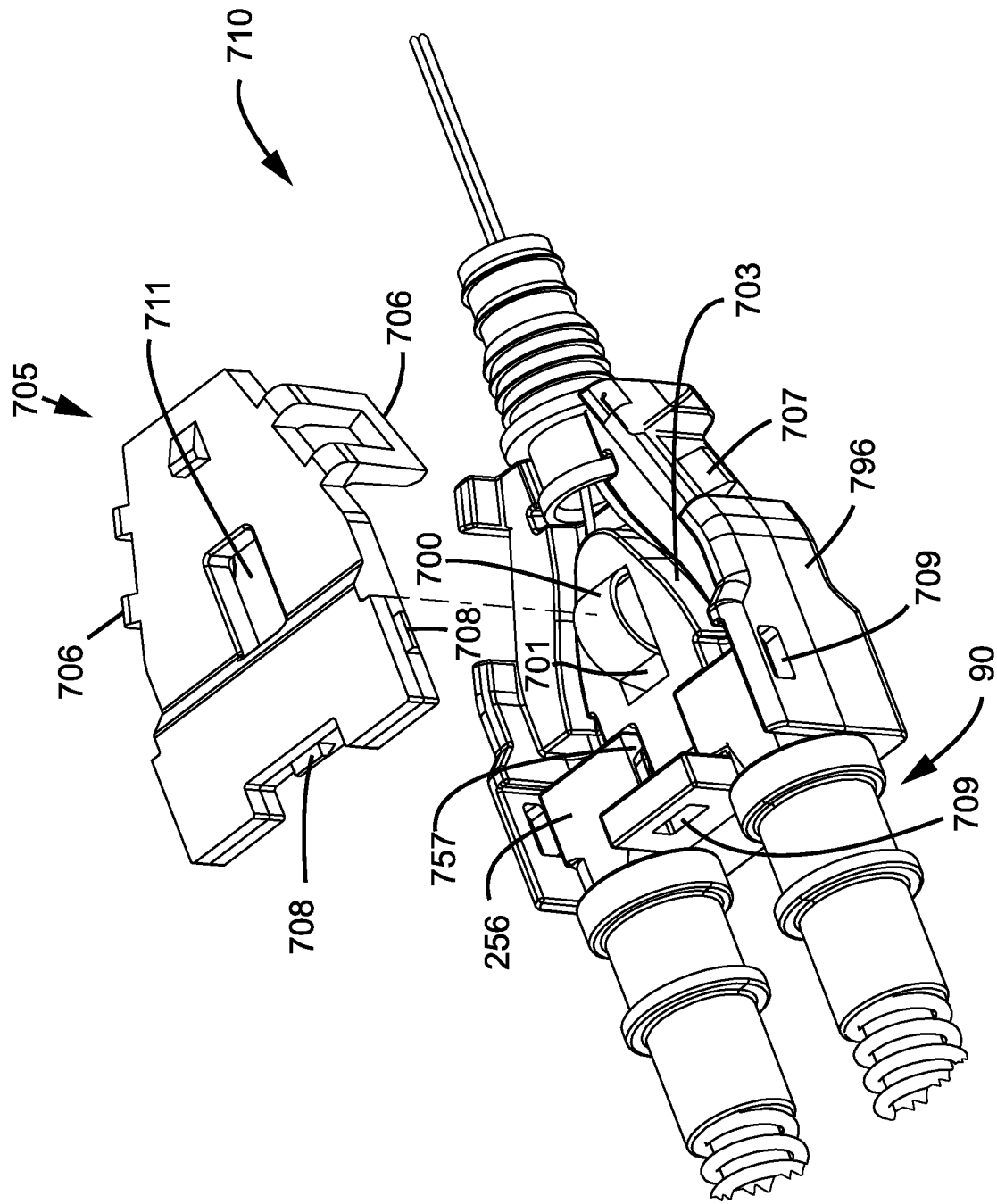
FIG. 29 illustrates a top perspective view of a portion of yet another embodiment of a fiber optic connector having features that are examples of inventive aspects in accordance with the present disclosure.

Referring now to FIG. 29, another version of a connector 710 that has features similar to connectors 410, 510, and 610 discussed above is illustrated. The version of the connector 710 shown in FIG. 29 has a top-load design similar to the connectors 410 and 510 shown in FIGS. 25-27. However, in the connector 710, a yoke 796 does not define flexible tabs/latches for retaining the rear shoulders 256 of the rear housings 90 within pockets 757 when the rear housings 90 are inserted into the yoke 796 from above. The rear housings 90 are simply captured against the yoke 796 with a snap-fit cover 705 as shown in FIG. 29. The cover 705 defines downwardly extending snaps 706 on each of its right and left sides that are configured to be coupled to hooks 707 defined on each side of the yoke 796. The cover 705 also defines a plurality of tabs 708 adjacent a front end of the cover 705 that fit into snaps 709 defined adjacent the front of the yoke 796 to retain the cover on the yoke 796.

As shown, the cover 705 captures against the yoke 796 a biasing member in the form of a spring 700 that is positioned within a center pocket 701 defined on the yoke 796. The cover 705 defines an aperture 711 for accommodating a portion of the spring 700. As discussed above, the spring 700 is configured to contact the boot 114 and provide a force to return the boot 114 back to a neutral position after the boot 114 has been pulled.

It should be noted that the cover 705 may also define protrusions at a bottom side thereof that are configured to keep and constrain the fibers 156, 158 within fiber pockets 703 defined in the yoke 796 and to limit deflection of the fibers.

Figure 30:
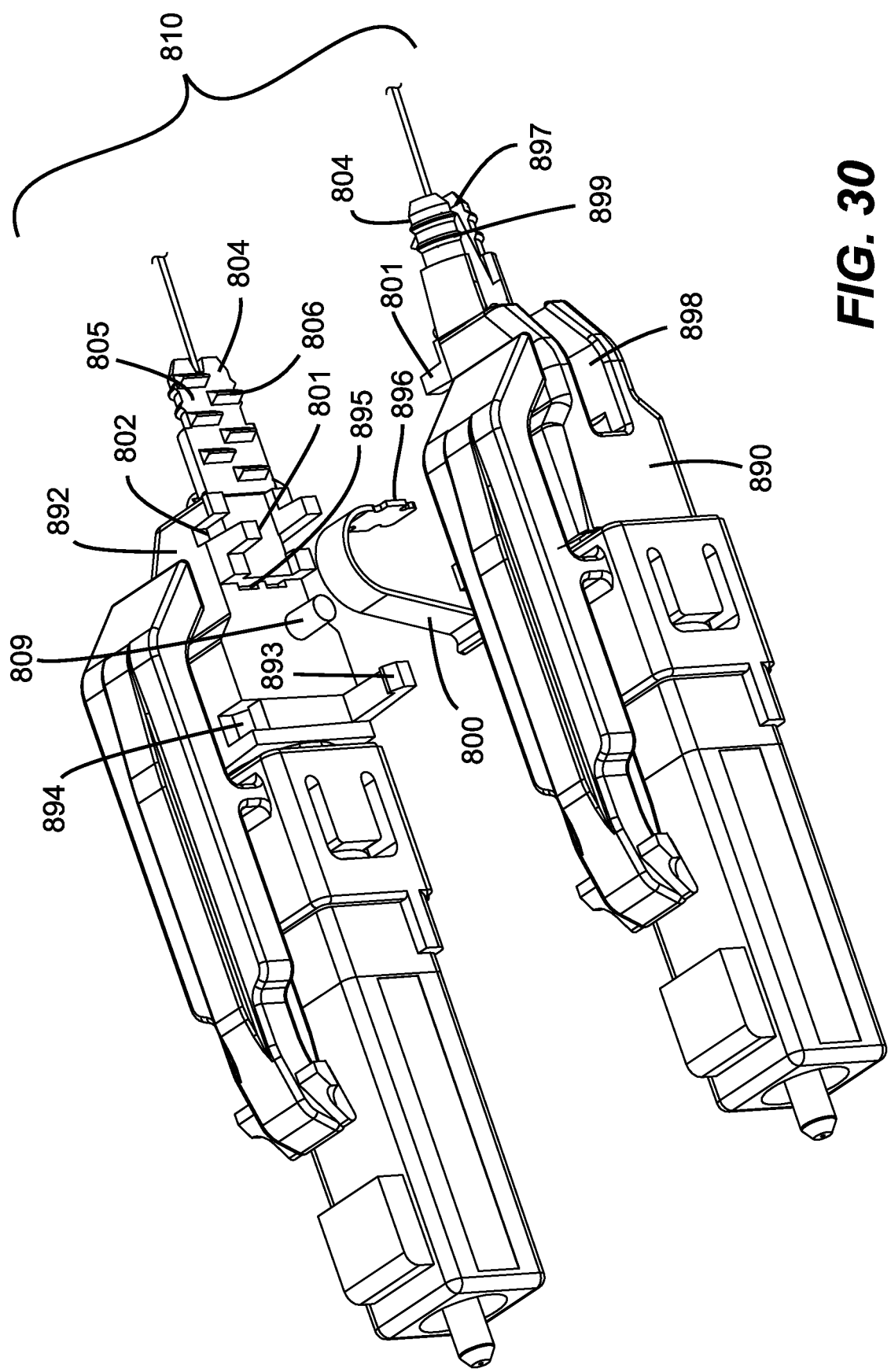
FIG. 30 illustrates a top perspective exploded view of a portion of yet another embodiment of a fiber optic connector having features that are examples of inventive aspects in accordance with the present disclosure.
Figure 31:
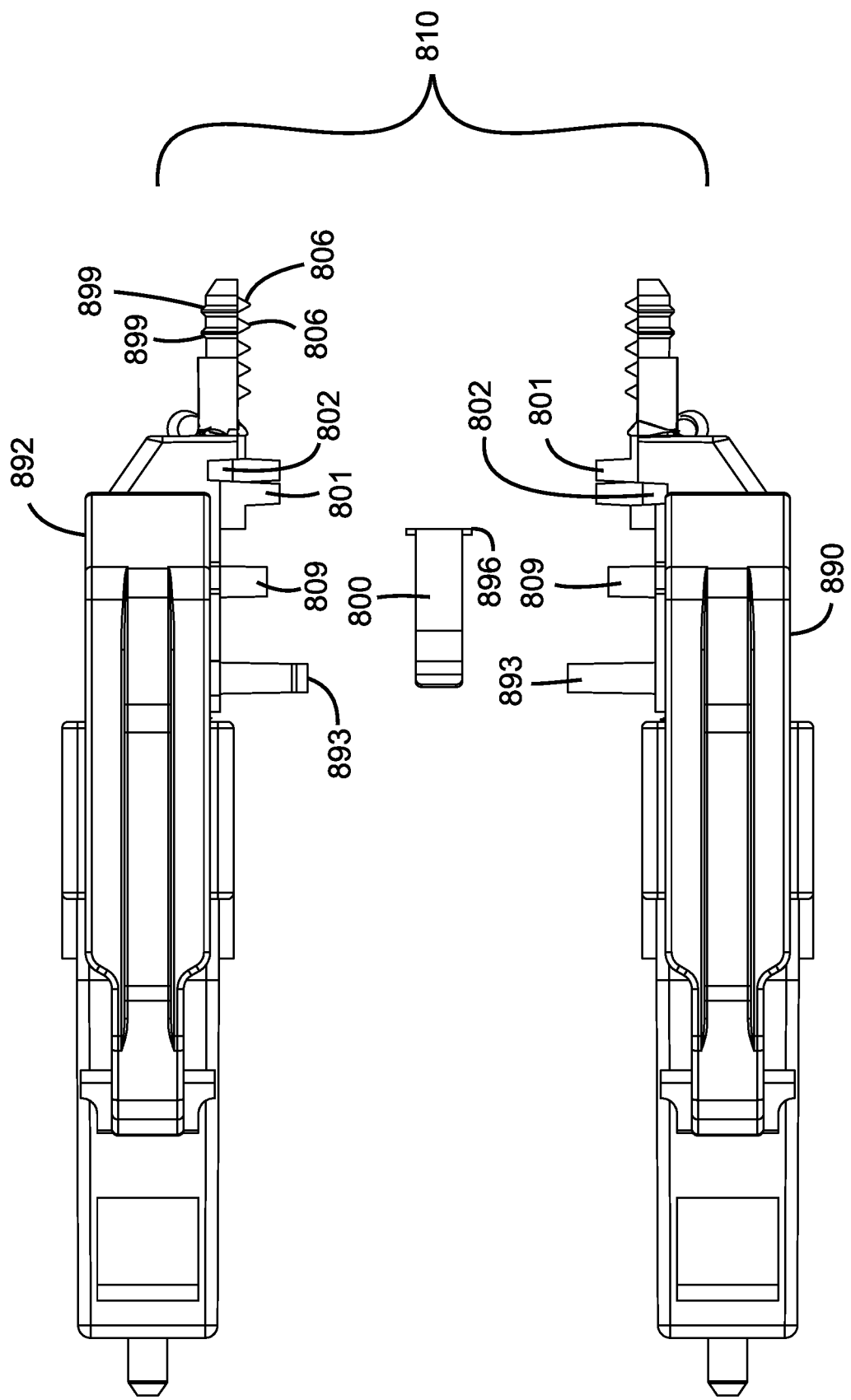
FIG. 31 illustrates a top view of the fiber optic connector of FIG. 30.
Figure 32:
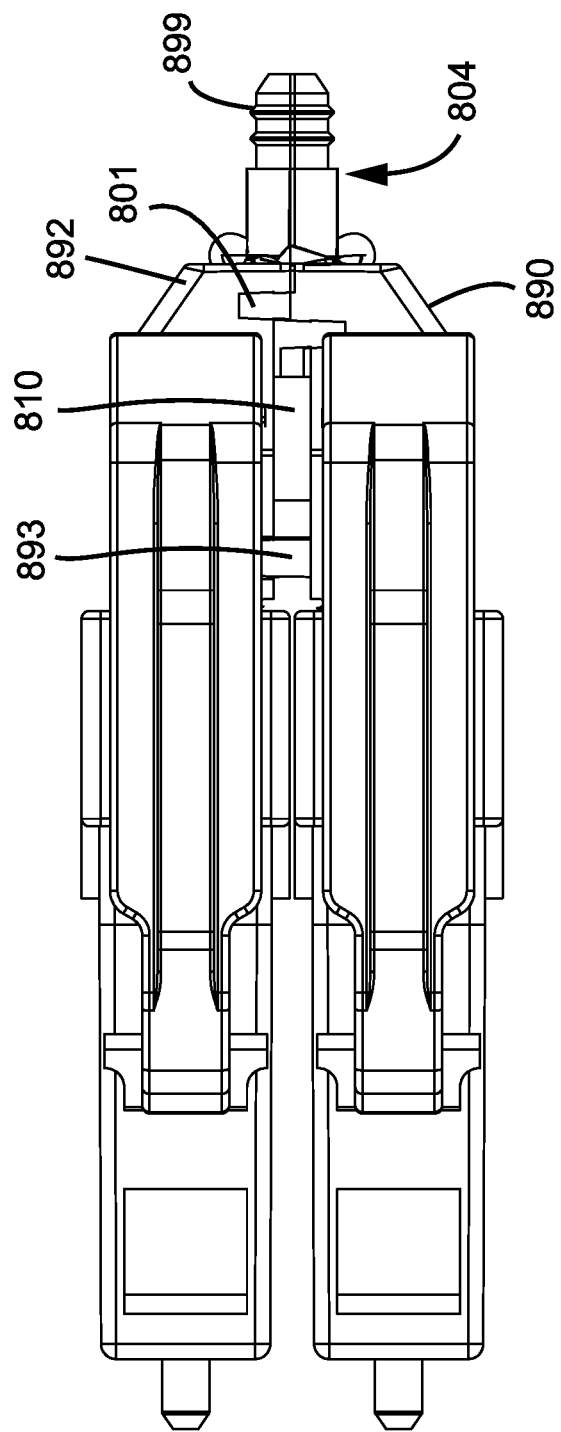
FIG. 32 illustrates a top view of the connector of FIGS. 30 and 31 in an assembled configuration.

Now referring to FIGS. 30-32, another example of a connector 810 having features that are examples of inventive aspects in accordance with the present disclosure is illustrated. The connector 810 is similar to the connector 610 shown in FIG. 28 in the sense that the rear housings and the yoke are molded integrally. However, the combined integral structure is formed from two halves 890, 892 that are configured to be coupled together in a side-by-side relationship. As will be discussed in further detail below, when the two halves 890, 892 are brought together, the two halves 890, 892 capture in between both a biasing member in the form of a spring 800 and strength members of the fiber optic cable that is terminated to the connector 810.

As shown in FIGS. 30-32, the two halves 890, 892 each include intermating hook 893 and snap 894 structures for snap-fitting the two halves 890, 892 together.

Slots 895 are provided on each of the halves 890, 892 to capture rear protrusions 896 of the biasing spring 800 in between the two halves 890, 892 when the halves are latched together.

Rear portions of the two halves 890, 892 are designed such that they capture the strength members of the fiber optic cable in the center, whereas the fibers from the cable are lead around the outside within side slots 898, similar to the embodiments discussed above.

In addition to the intermating hook 893 and snap 894 structures, the two halves 890, 892 also each include inter-fitting posts 801 and notches 802 for coupling the two halves 890, 892 together in a side by side relationship.

Still referring to FIGS. 30-32, as noted above, the rear ends of the two halves 890, 892 cooperatively define a crimp region 804 of the connector 810. As shown, similar to the designs discussed above, the crimp region 804, when formed, may define full annular rings 899 on an exterior surface 897. However, in contrast to the above-described designs, the crimp region 804 may be designed to capture the strength members in between the two halves 890, 892 when the halves are brought together. For this purpose, as shown, the two halves each may define an internal textured surface 805 (e.g., knurled, ridged, provided with small projections, teeth, etc.) to assist in retaining the strength members (e.g., aramid yarns) in between the halves. In the depicted embodiment, the two halves 890, 892 are shown to have inter-fitting teeth 806 that are provided in a relatively offset relationship so as to inter-fit together and capture the strength members of the fiber optic cable in between the two halves 890, 892.

Furthermore, as shown, the halves 890, 892 may also define a post 809 provided thereinbetween, in front of the crimp region 804, for wrapping the strength members around and leading them back toward the inter-fitting teeth 806 to provide further strain relief.

FIG. 32 illustrates the two halves 890, 892 in an assembled configuration showing the intermating of the various parts.

Figure 33:
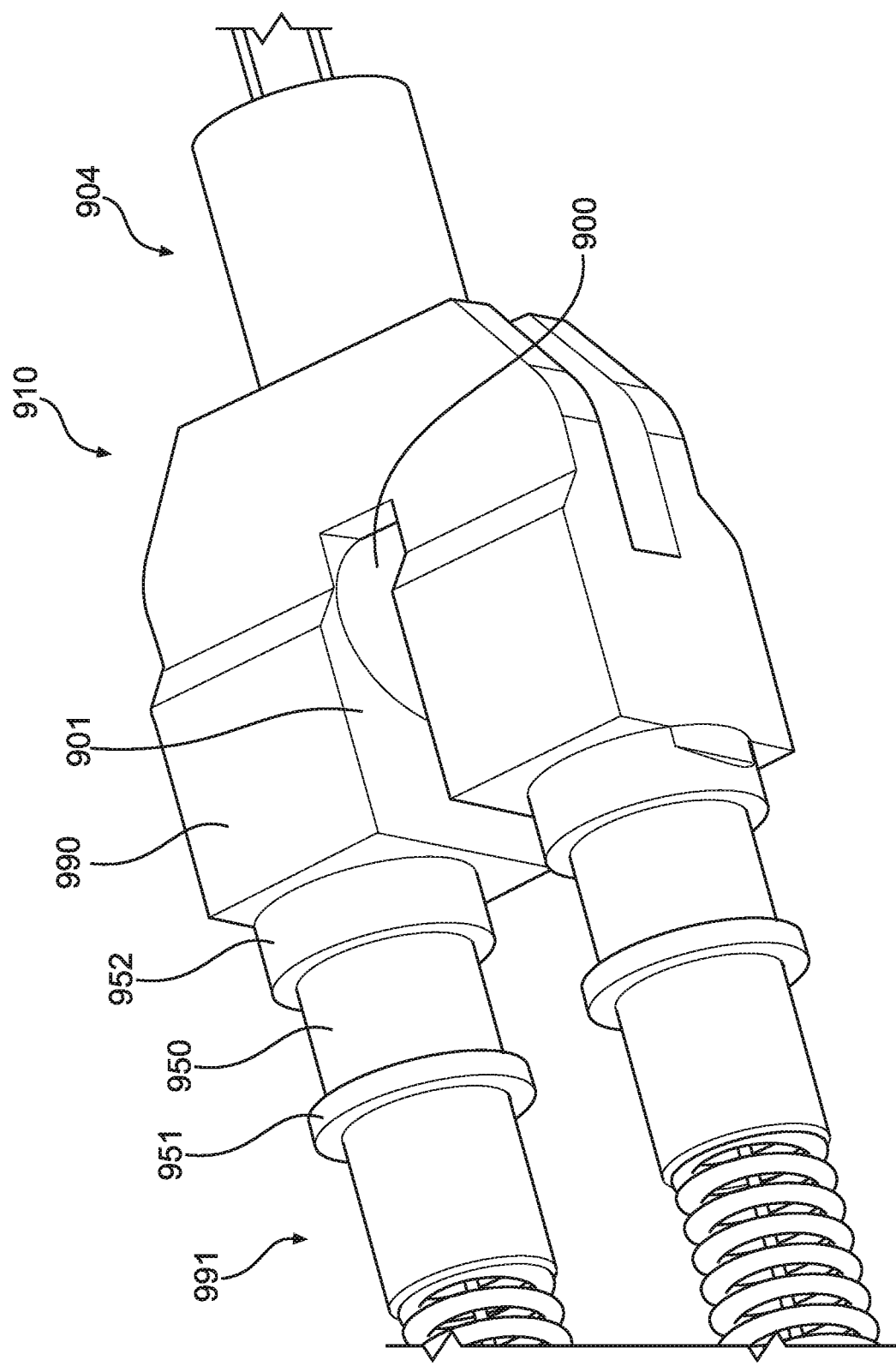
FIG. 33 illustrates a top perspective view of a portion of yet another embodiment of a fiber optic connector having features that are examples of inventive aspects in accordance with the present disclosure, the fiber optic connector having features similar to the connector of FIG. 28.

FIG. 33 illustrates a top perspective view of a portion of yet another embodiment of a fiber optic connector 910 having features that are examples of inventive aspects in accordance with the present disclosure. The fiber optic connector 910 has features similar to the connector 610 of FIG. 28.

As shown, similar to the connector 610, in the connector 910, the rear housings and the yoke are combined into a single integral structure 990 forming the rear portion of the connector 910. Similar to connectors 110, 410, 510, and 610 discussed above, the structure 990 defines a front extension 991 that has a front annular ring 951 and a rear annular ring 952 with an annular recess 950 therebetween. As described with respect to the connector 110 discussed above, flexible portions 254 of the sidewalls of the front housings 132 can fit within the annular recess 950 defined by the front extension 991 when each front housing 132 is coupled to the structure 990 of the connector 910. In this manner, the front housings 132 are rotatable relative to the structure 990 for polarity reversal, but the front housings 132 are axially fixed with respect to structure 990.

It should be noted that the connector 910 may define a crimp region 904 that is provided as a separate crimp body that is removably mounted to the structure 990 (such as that shown in FIG. 28), or may define a crimp region that is also integrally formed with the structure 990 as a rear extension as discussed for other above examples shown, for example, in FIGS. 15, 17-19, 25, and 26.

The version of the connector 910 requires pre-insertion of the fibers into the structure 990 prior to termination of the fibers to the front housings 132. And, as shown, a biasing member in the form of a spring 900 is positioned within a center pocket 901 defined by the structure 990, where the spring 900 is configured to contact the boot 114 and provide a force to return the boot 114 back to a neutral position after the boot 114 has been pulled, as discussed for previous embodiments. The version of the connector 910, similar to the connector 610, also requires duplex polishing during termination.

In the present disclosure, the duplex connectors 110, 410, 510, 610, 710, 810, and 910 are depicted and described as polarity-switching type connectors. Even though the depicted duplex connectors 110, 410, 510, 610, 710, 810, and 910 may include polarity-switching features, as noted above, the inventive latching and unlatching features and other inventive features such as the above-described crimp regions with staggered, scalloped ridges may be used on any duplex or simplex connector, with or without polarity-switching features.

FIGS. 34-66 generally illustrate various alternative configurations or designs that can be incorporated into connectors such as connectors 110, 410, 510, 610, 710, 810, and 910 discussed above for providing the latching/unlatching functionality of such connectors relative to a fiber optic adapter such as adapter 100.

It should be noted that the various alternative latching/unlatching features will be presented below as part of new connector embodiments including such features. However, it should be understood that the connector embodiments presented that utilize the alternative latching features are similar in design and functionality in other aspects to the connectors 110, 410, 510, 610, 710, 810, and 910 discussed above.

For example, the new connector embodiments presented for the purpose of illustrating the alternative latching/unlatching features may include connector portions housing a ferrule for terminating the optical fiber of a fiber optic cable. Each connector portion may include a front housing that is coupled to and maybe rotatable relative to a rear housing. A ferrule assembly may be positioned within the front housing, wherein that ferrule assembly includes the ferrule, a hub which holds the ferrule, and a spring which is positioned between the ferrule hub and a front end of the rear housing. As in the embodiments discussed above, the spring is generally configured to bias the hub and the ferrule forwardly during mating with similar connectors in a conventional fiber optic adapter such as adapter 100.

In the connector embodiments that will be presented which may be in the form of duplex connectors where the connector portions are positioned in a side-by-side arrangement, the rear housings of the two connector portions may be received by a common yoke. In such examples, the rear housings may be rotationally fixed with respect to the yoke. And, as discussed above, for certain examples of connectors that will be presented that have a polarity-changing functionality, the front housings of the connector portions may be rotatable relative to the rear housings and the yoke to change the polarity of the overall connector.

As also noted above, the yoke may define a rear crimp region for allowing crimping portions of a fiber optic cable via a crimp sleeve for fixing the strength members of a cable to the connector. And, furthermore, the embodiments of connectors that will be presented may include a strain relief boot that is mounted to the yoke for covering the crimp region of the yoke and providing strain relief to cables extending from the connectors that are exposed to lateral forces.

It should be noted that, although the various latching/unlatching features are presented in the form of new embodiments of connectors, any of the latching/unlatching features presented below may also be incorporated into the connectors 110, 410, 510, 610, 710, 810, and 910 discussed above.

As noted above and as will be presented in the below embodiments, the various latching/unlatching features are generally provided to allow the various embodiments of connectors to be latched to and unlatched from a conventional LC format fiber optic adapter such as the adapter 100 discussed above. As such and as will be seen in the provided embodiments, the various alternative designs will include features that are configured to move a latch that is provided on the front housing portion of the connector portions of the various connectors. As noted above, such latches are used on LC format connectors and are designed to secure the connectors to LC format adapters such as adapter 100. And, generally, such latches are movably mounted to the front housing portions of the connectors either via a flexible or a pivotal connection to allow the latch to move downward to free the connectors from the adapter 100. Generally, such latches will include a pair of shoulders at the front end that mate with latching shoulders 208 of adapter 100 to secure the connector to the adapter 100 (as shown in FIGS. 3-5).

The various connectors that will be described below include features that are designed to move such latches for unlatching the connectors from a conventional LC format adapter and also allowing the connectors to be latched to such conventional LC format adapters.

As will be discussed below, in certain examples of connectors that are presented for illustrating the alternative latching/unlatching designs, the strain relief boot of the connector may be utilized for moving the latch of the connector. In certain examples, as will be shown, the strain relief boot may be slidable with respect to a portion of the connector such as the yoke portion for allowing a user to manipulate the latch of the connector without directly accessing or contacting the latch to free the connector from a fiber optic adapter.

It should be noted that the various alternative latching/unlatching designs or features discussed below are fully applicable to duplex type LC format connectors that transition optical fibers from a single optical cable to two front fiber optic connector portions as illustrated in the above examples. Also, the various alternative latching/unlatching designs or features and the functionality of those features may be fully applicable to simplex LC connectors.

Now referring specifically to FIGS. 34 and 35, one example embodiment of a connector 1010 having latching/unlatching features that are examples of inventive aspects in accordance with the present disclosure is illustrated. FIG. 34 illustrates a side view of the fiber optic connector 1010, and FIG. 35 diagrammatically illustrates the bending path of a flexible trigger 1012 of the fiber optic connector 1010.

As illustrated, the connector 1010 defines the release trigger 1012 that is snap-mounted toward a rear end 1016 of a front housing portion 1018 of the connector 1010. The release trigger 1012 defines a front end 1020 that is configured to abut a latch 1022 of the connector 1010 and move the latch 1022 downward for releasing the connector 1010 from a fiber optic adapter. The release trigger 1012 also defines a rear extension 1024 that extends past the rear end 1016 of the front housing portion 1018. The rear extension 1024 is configured to cooperate with an angled slot 1026 (or slots for duplex connectors) defined in a strain relief boot 1028 of the connector 1010.

The release trigger 1012 defines a flexible pivot point 1030 at a location between a front end of the trigger 1012 and the rear extension 1024. When the strain relief boot 1028 is pulled away from the front housing portion 1018, the angled slot 1026 of the boot 1028 forces the rear extension 1024 of the trigger 1012 upwardly, causing a front portion of the release trigger 1012 downwardly as the entire release trigger 1012 elastically pivots about the pivot point 1030. Downward motion of the front end 1020 of the release trigger 1012 causes the trigger 1012 to abut and provide a downward force on the latch 1022, moving the latch 1022 and freeing the connector 1010 from the fiber optic adapter. The bending path of the flexible release trigger 1012 is illustrated diagrammatically in FIG. 35.

A release of the strain relief boot 1028 (under a spring bias, for example) allows the opposite motion for the release trigger 1012, allowing the front latch 1022 to move back upward to lock the connector 1010 within an adapter.

Again, for polarity reversal, the front housing portion 1018 can be rotated with respect to a rear housing portion 1034, a yoke of the connector 1010, and the boot 1028. Angled slots 1026 at the opposite side of the boot 1028 can be utilized after rotation for the latch release functionality.

Figure 36:
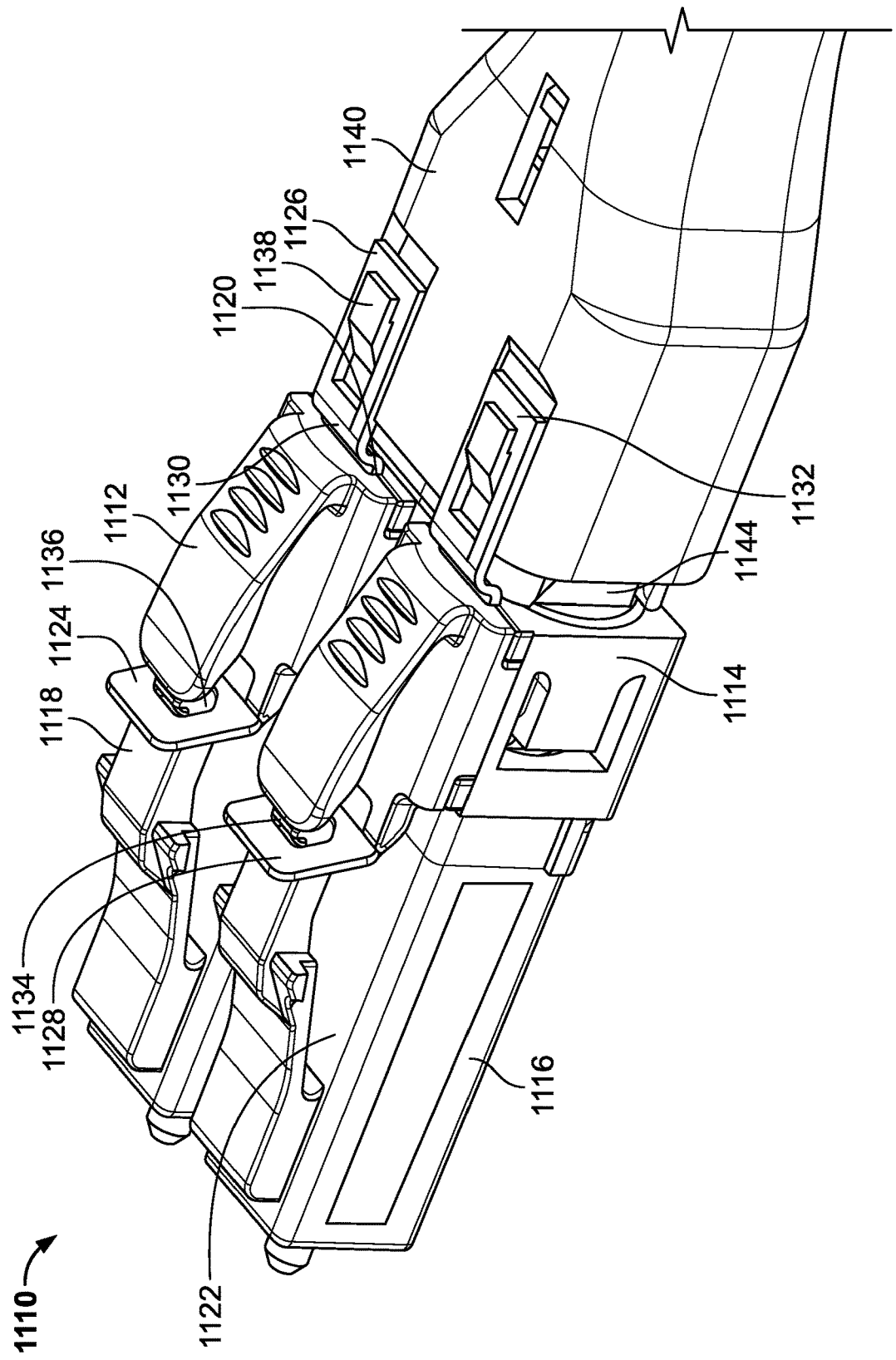
FIG. 36 illustrates a top rear perspective view of a portion of yet another embodiment of a fiber optic connector having features that are examples of inventive aspects in accordance with the present disclosure.

FIG. 36 illustrates a top rear perspective view of another embodiment of a fiber optic connector 1110 having features that are examples of inventive aspects in accordance with the present disclosure.

As shown in FIG. 36, the connector 1110 defines a latch trigger 1112 that is snap-mounted toward a rear end 1114 of the front housing portion 1116 of the connector 1110, similar to the connector 1010 shown in FIGS. 34 and 35. The latch trigger 1112 can be accessed by a user to directly contact a latch 1118 of the connector 1110 and release the latch 1118.

However, as shown, the latch trigger 1112 is designed to provide a channel or passthrough 1120 underneath the trigger 1112 that communicates with a slide surface provided on a top wall 1122 of the front housing portion 1116 for accommodating a second release trigger 1124 in the form of a slidable pull tab 1126 that fits between the latch trigger 1112 and the top wall 1122.

The pull tab 1126 is captured between the latch trigger 1112 and the top wall 1122 of the front housing portion 1116 when the trigger 1112 is snap-fit to the front housing to portion 1116. The pull tab 1126 is designed to be non-removable unless the latch trigger 1112 is first removed. The pull tab 1126, as shown, includes a front catch portion 1128, a middle portion 1130, and a rear catch portion 1132. The elongate middle portion 1130 is configured to fit between the latch trigger 1112 and the top wall 1122 of the front housing portion 1116 as shown so as to slide on the slide surface.

The front catch portion 1128 is configured to contact and interact with a lip 1134 defined at a rear end 1136 of the latch 1118 for transferring a linear motion of the pull tab 1126 to a downward movement of the rear end 1136 of the latch 1118 when the pull tab 1126 is slidably pulled.

The rear catch portion 1132 is designed to interact with hooks 1138 provided on a strain relief boot 1140 of the connector 1110. When the strain relief boot 1140 is pulled away from the front housing portion 1116, the pull tab 1126 slidably moves and acts on the flexible latch 1118 of the connector 1110 to move the latch 1118 downward. With the use of the pull tab 1126, direct access to the connector latch 1118 that is close to a front of the connector 1110 or the latch trigger 1112 is not required. The strain relief boot 1140, by acting via the pull tab 1126, provides accessibility at a distance from the rear end 1114 of the front connector housing portion 1116 for unlatching the connector 1110 from an adapter.

Again, for polarity reversal, the front housing portion 1116 can be rotated with respect to a rear housing portion 1144, the yoke of the connector 1110, and the boot 1140. Similar hooks or tabs 1138 at the opposite side of the boot 1140 can be utilized after rotation for acting on the pull tab 1126.

Figure 37:
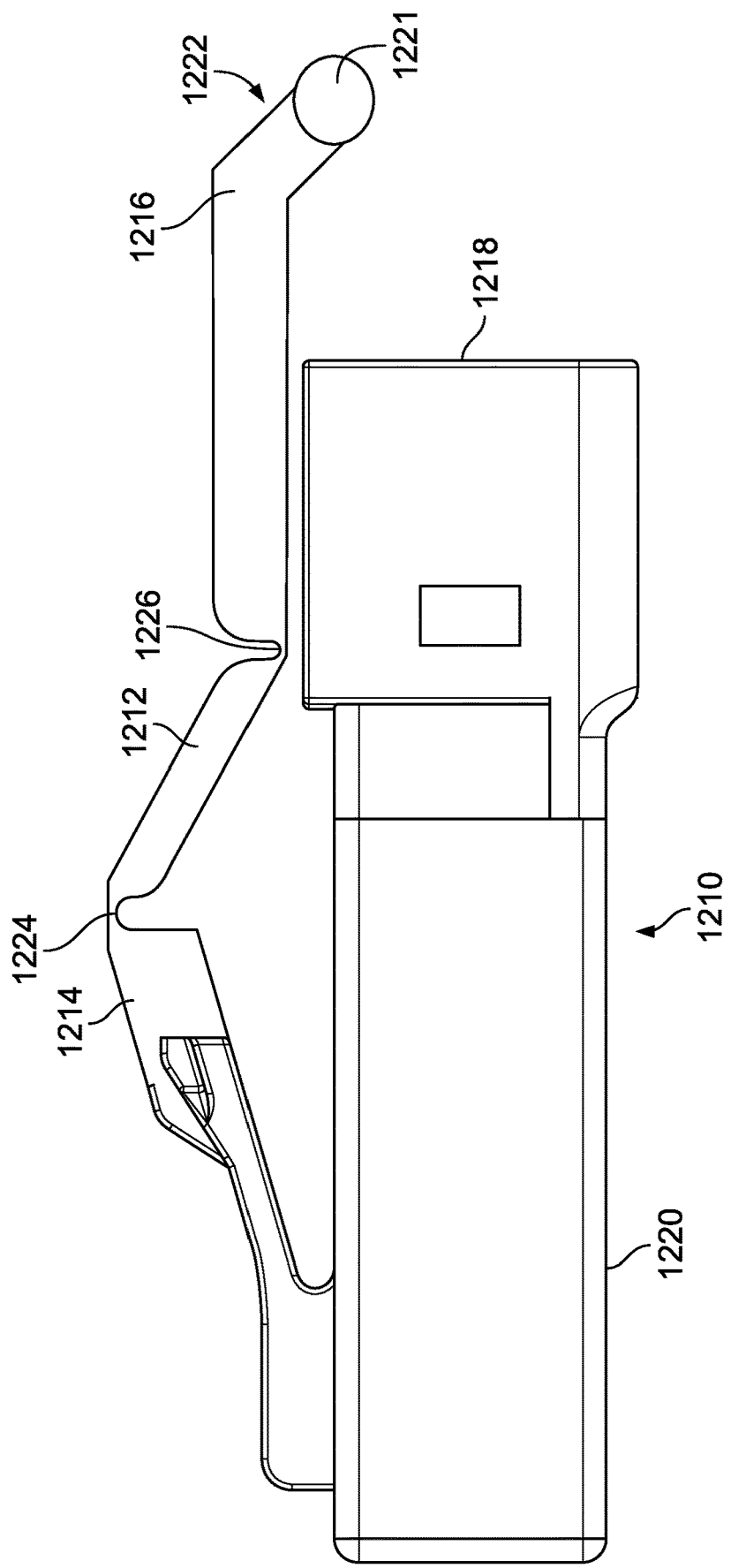
FIG. 37 illustrates a side view of a portion of yet another embodiment of a fiber optic connector having features that are examples of inventive aspects in accordance with the present disclosure.

FIG. 37 illustrates a side view of another embodiment of a fiber optic connector 1210 having features that are examples of inventive aspects in accordance with the present disclosure.

In the connector 1210 shown in FIG. 37, a release trigger 1212 is integrally molded with a flexible front latch 1214 of the connector 1210.

The release trigger 1212, thus, defines a rear extension 1216 that extends past a rear end 1218 of the front housing portion 1220 that is permanently attached to the flexible latch 1214. As shown, the rear extension 1216 may be pulled by a user directly or may include catches 1221 at a rear end 1222 that are configured to be acted on by a slidable strain relief boot of the connector 1210.

The permanent pivotal connections defined by a front living hinge 1224 and a rear living hinge 1226 between the latch 1214 of the connector 1210 and the rear extension 1216 of the release trigger 1212 act to transform a linear slidable motion of the rear extension 1216 into a downward motion of the front latch 1214, allowing release of the connector 1210 from an adapter.

Figure 38:
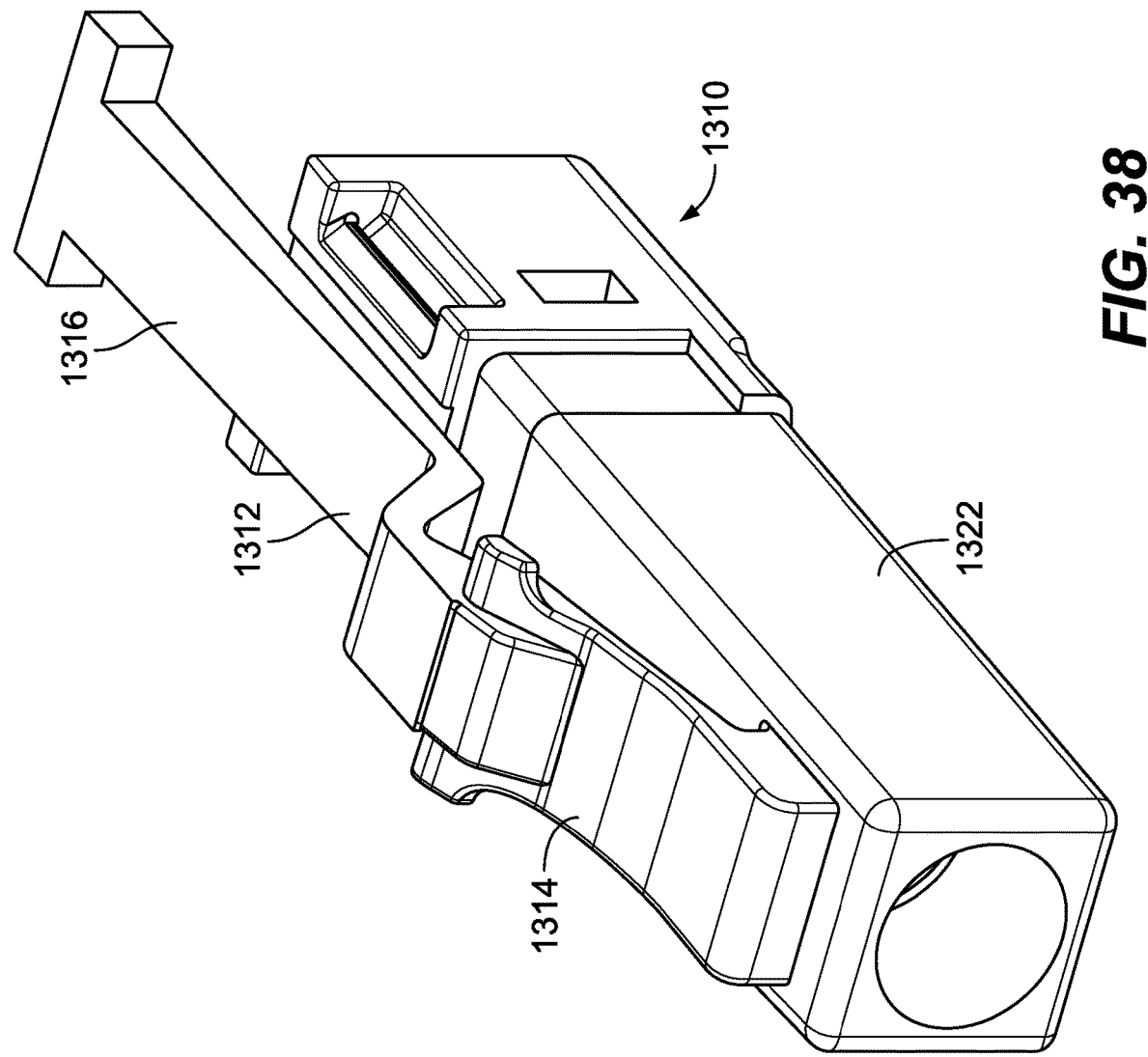
FIG. 38 illustrates a front perspective view of a portion of yet another embodiment of a fiber optic connector having features that are examples of inventive aspects in accordance with the present disclosure, the fiber optic connector having features similar to the connector of FIG. 37.
Figure 39:
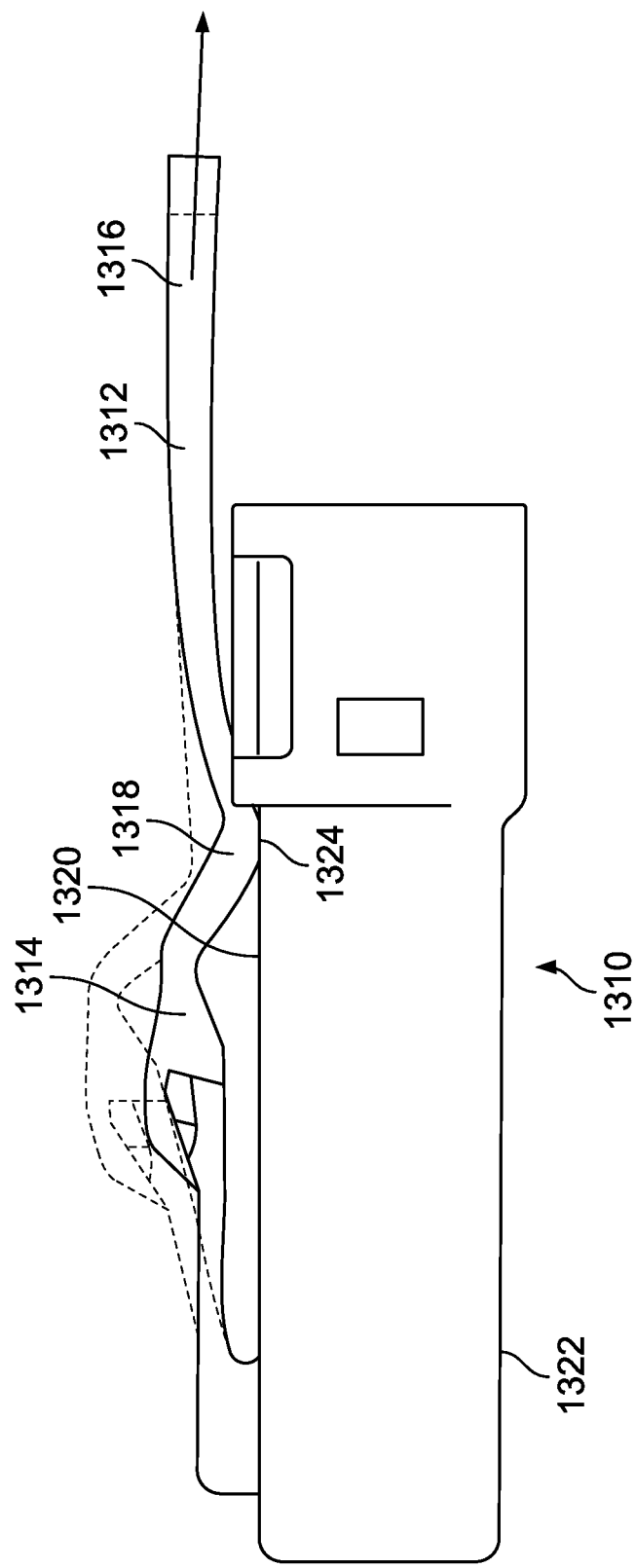
FIG. 39 is a side view of the fiber optic connector of FIG. 38, illustrating the bending path of the flexible latch of the fiber optic connector.

Referring now to FIGS. 38 and 39, another example of a fiber optic connector 1310 having latching/unlatching features that are examples of inventive aspects in accordance with the present disclosure is illustrated. The fiber optic connector 1310 includes features similar to the connector 1210 of FIG. 37 with a release trigger 1312 that is permanently attached to a front latch 1314 of the connector 1310. FIG. 38 is a front perspective view of the connector 1310, and FIG. 39 is a side view of the fiber optic connector 1310, also illustrating the bending path of the flexible latch 1314 of the fiber optic connector 1310.

In the connector 1310 of FIGS. 38 and 39, the release trigger 1312 defines a more rigid molded attachment to the front latch 1314 instead of utilizing living hinges.

A pulling force on a rear extension 1316 defined by the release trigger 1312 moves a middle portion 1318 of the release trigger 1312 downwardly to contact atop wall 1320 of a front housing portion 1322 of the connector 1310. Further application of the pulling force transforms the linear translation motion of the rear extension 1316 to a downward motion of the front latch 1314 as the release trigger 1312 uses a middle portion 1318 as a fulcrum point 1324 that abuts the top wall 1320 of the front housing portion 1322.

Figure 40:
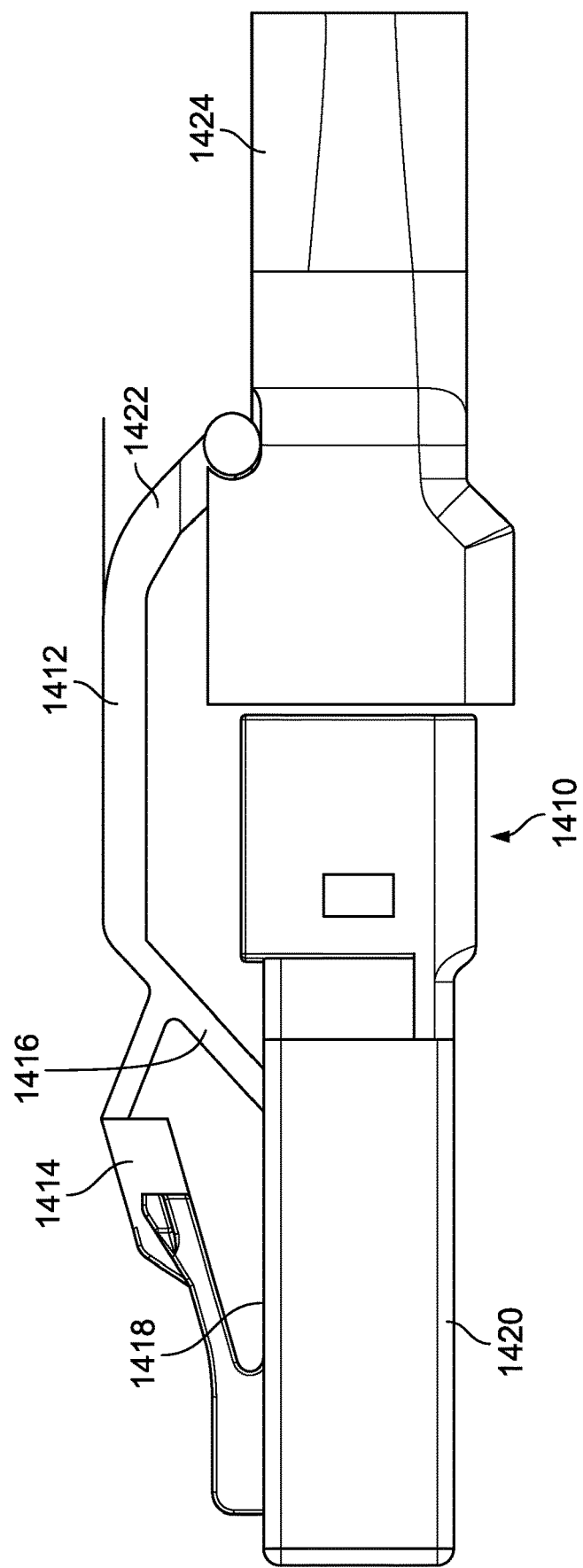
FIG. 40 illustrates a side view of a portion of yet another embodiment of a fiber optic connector having features that are examples of inventive aspects in accordance with the present disclosure, the fiber optic connector having features similar to the connectors of FIGS. 37-39.

FIG. 40 illustrates a side view of another embodiment of a fiber optic connector 1410 having features that are examples of inventive aspects in accordance with the present disclosure. The fiber optic connector 1410 includes features similar to the connectors 1210 and 1310 of FIGS. 37-39.

The fiber optic connector 1410 defines a similar release trigger design 1412 that is permanently attached to a front latch 1414 of the connector 1410. However, the release trigger 1412 defines an extension 1416 that rides along a top wall 1418 of a front housing portion 1420 to provide a more guided slidable movement of the release trigger 1412. As shown, with the extension 1416 that rides along the top wall 1418 of the front housing portion 1420 and the release trigger 1412 form a parallelogram shape with the front latch 1414. As a rear extension 1422 of the release trigger 1412 is pulled either directly via a user or via slidable pull of a boot 1424 of the connector 1410, the guided movement of the release trigger 1412 transforms a linear translation movement of the trigger 1412 to a downward movement of the latch 1414 to free the connector 1410 from an adapter.

Figure 41:
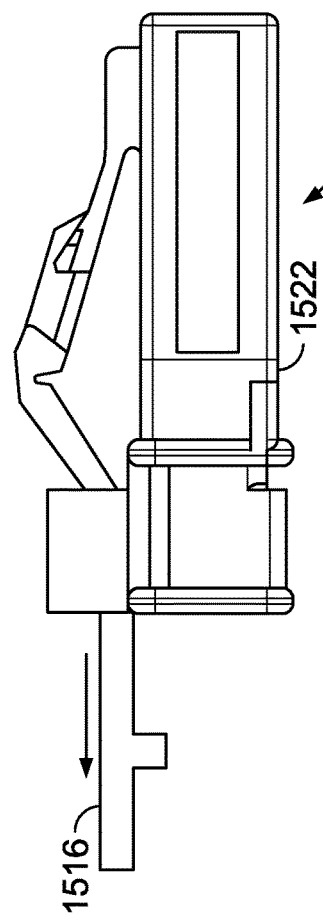
FIG. 41 illustrates a side view of a portion of yet another embodiment of a fiber optic connector having features that are examples of inventive aspects in accordance with the present disclosure, the fiber optic connector having features similar to the connectors of FIGS. 37-40.
Figure 42:
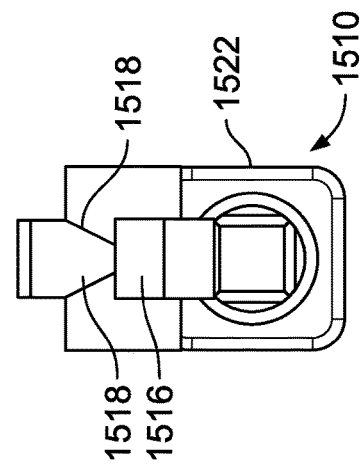
FIG. 42 is a rear view of the fiber optic connector of FIG. 41.

FIGS. 41-42 illustrate another embodiment of a fiber optic connector 1510 having features that are examples of inventive aspects in accordance with the present disclosure. The fiber optic connector 1510 has features similar to the connectors 1210, 1310, and 1410 of FIGS. 37-40 in that a release trigger 1512 of the connector 1510 is permanently molded with a front latch 1514 of the connector 1510. However, in the design of the connector 1510, a rear extension 1516 of the release trigger 1512 is guided for slidable movement via the use of flexible latch tabs 1518 that extend upwardly from both sides of a top wall 1520 of a front housing portion 1522.

After the connector 1510 has been molded with the permanently attached release trigger 1512, the rear extension 1516 of the release trigger 1512 is brought down and snap-fit under the flexible latch tabs 1518. The latch tabs 1518 keep the rear extension 1516 of the release trigger 1512 against the top wall 1520 of the front connector housing portion 1522 and provide a nested, guided design for the slidable movement of the release trigger 1512.

Figure 41A:
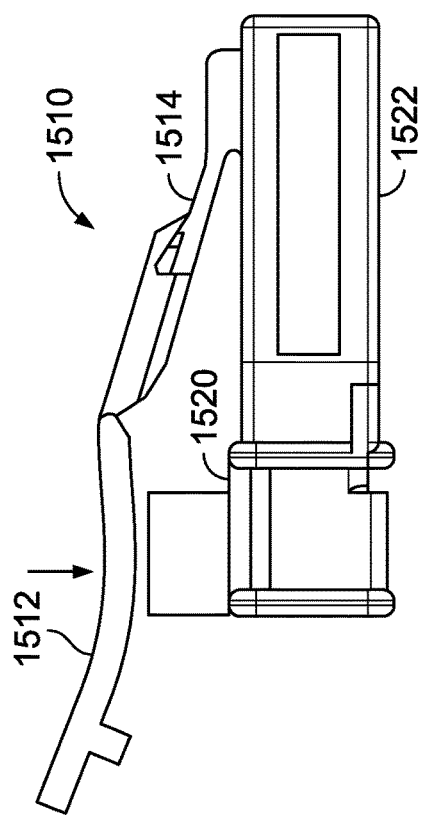
FIG. 41A illustrates the fiber optic connector of FIG. 41 with the latch in an assembled configuration, having been snap-fit under the flexible latch tabs of the front housing portion.
Figure 42A:
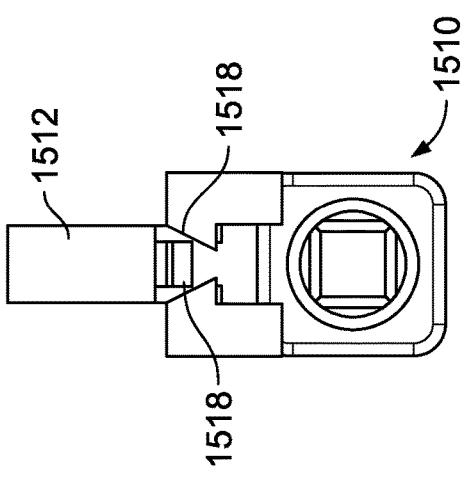
FIG. 42A illustrates the fiber optic connector of FIG. 42 with the latch in the assembled configuration, having been snap-fit under the flexible latch tabs of the front housing portion.

FIGS. 41 and 42 illustrate the connector 1510 after molding and before final assembly. FIG. 41A illustrates a side view of the fiber optic connector 1510 with the latch 1514 of the connector 1510 in an assembled configuration, having been snap-fit under the flexible latch tabs 1518 of the front housing portion 1522, and FIG. 42A illustrates a rear view of the fiber optic connector 1510 with the latch 1514 in the assembled configuration.

Figure 43:
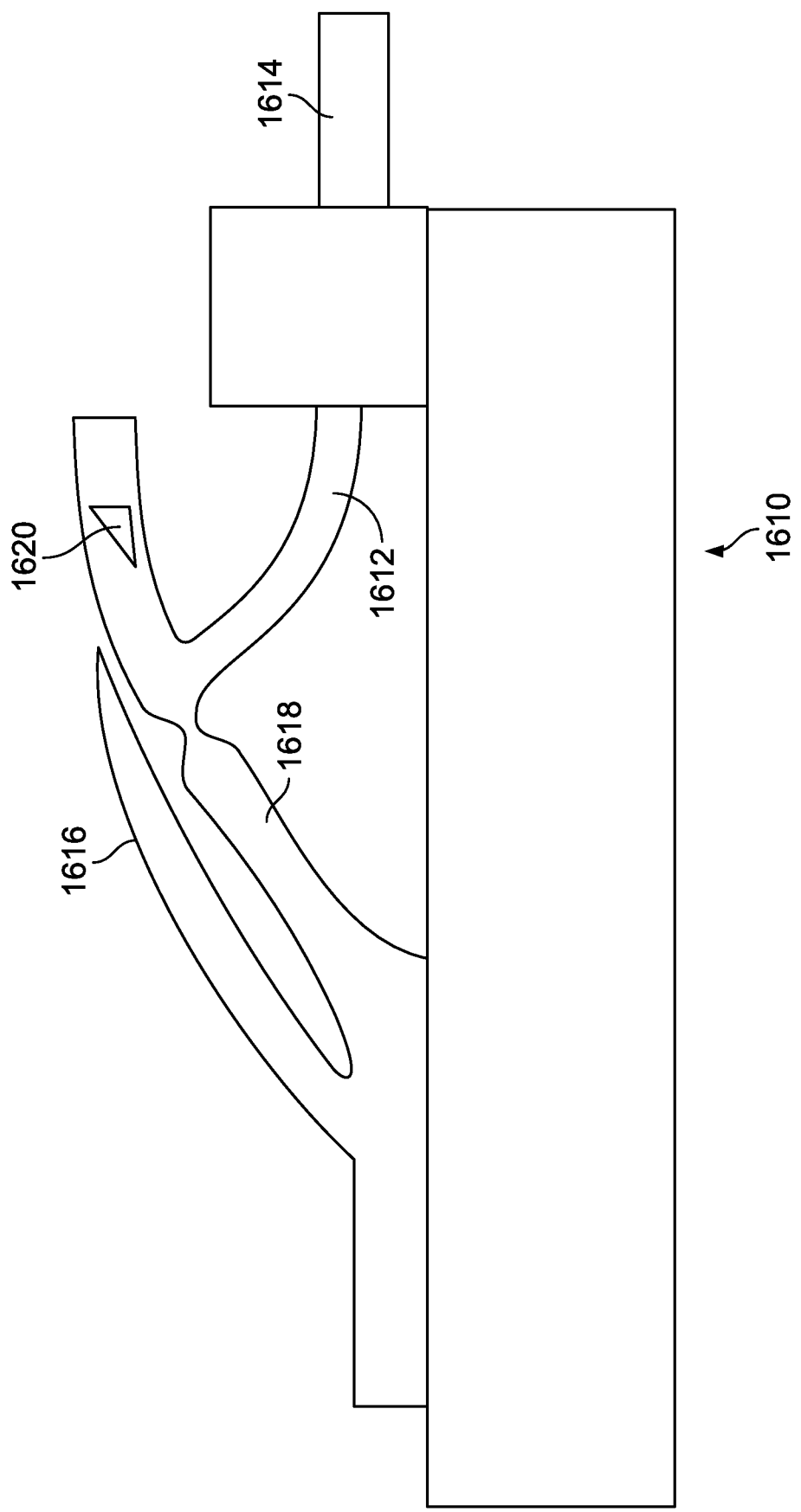
FIG. 43 illustrates a side view of a portion of yet another embodiment of a fiber optic connector having features that are examples of inventive aspects in accordance with the present disclosure, the fiber optic connector having features similar to the connectors of FIGS. 37-42.

FIG. 43 illustrates a side view of yet another embodiment of a fiber optic connector 1610 having features that are examples of inventive aspects in accordance with the present disclosure. The fiber optic connector 1610 includes features similar to the connectors of 1210, 1310, 1410, and 1510 of FIGS. 37–42, with certain differences as will be described below.

A release trigger 1612 of the connector 1610 includes a guided, nested design for a rear extension 1614 thereof similar to the connector 1510 shown in FIGS. 41 and 42. However, as shown, the connector 1610 is designed with an additional support structure 1616 that extends generally at a similar angle as a front latch 1618, but spaced therefrom. The upper support structure 1616 is configured to limit convex bowing of the latch 1618 in the event the connector 1610 is unintentionally subject to pulling forces that are not acting on the release trigger 1612 itself. If the pulling forces are applied intentionally to the rear extension 1614 of the release trigger 1612, the molded connection between the release trigger 1612 and the latch 1618 will cause the latch 1618 to move downwardly as the release trigger 1612 is slidably moved. However, if the connector 1610 is subject to pulling forces that are not applied to the release trigger 1612, shoulders 1620 of the latch 1618 that are within an adapter and that abut against the adapter can cause the latch 1618 to bend upwardly in a convex fashion, applying stress on the latch structure 1618. The upper support structure 1616 is designed to be positioned to limit such bending or bowing of the latch 1618 to reduce the amount of stress put on the latch 1618 to limit unintentional breaking of the latch 1618. Thus, the upper support structure 1616 counters the "folding up" motion of the latch 1618 if the connector 1610 is subject to a pulling force that is not applied via the release trigger 1612 itself.

Figure 44:
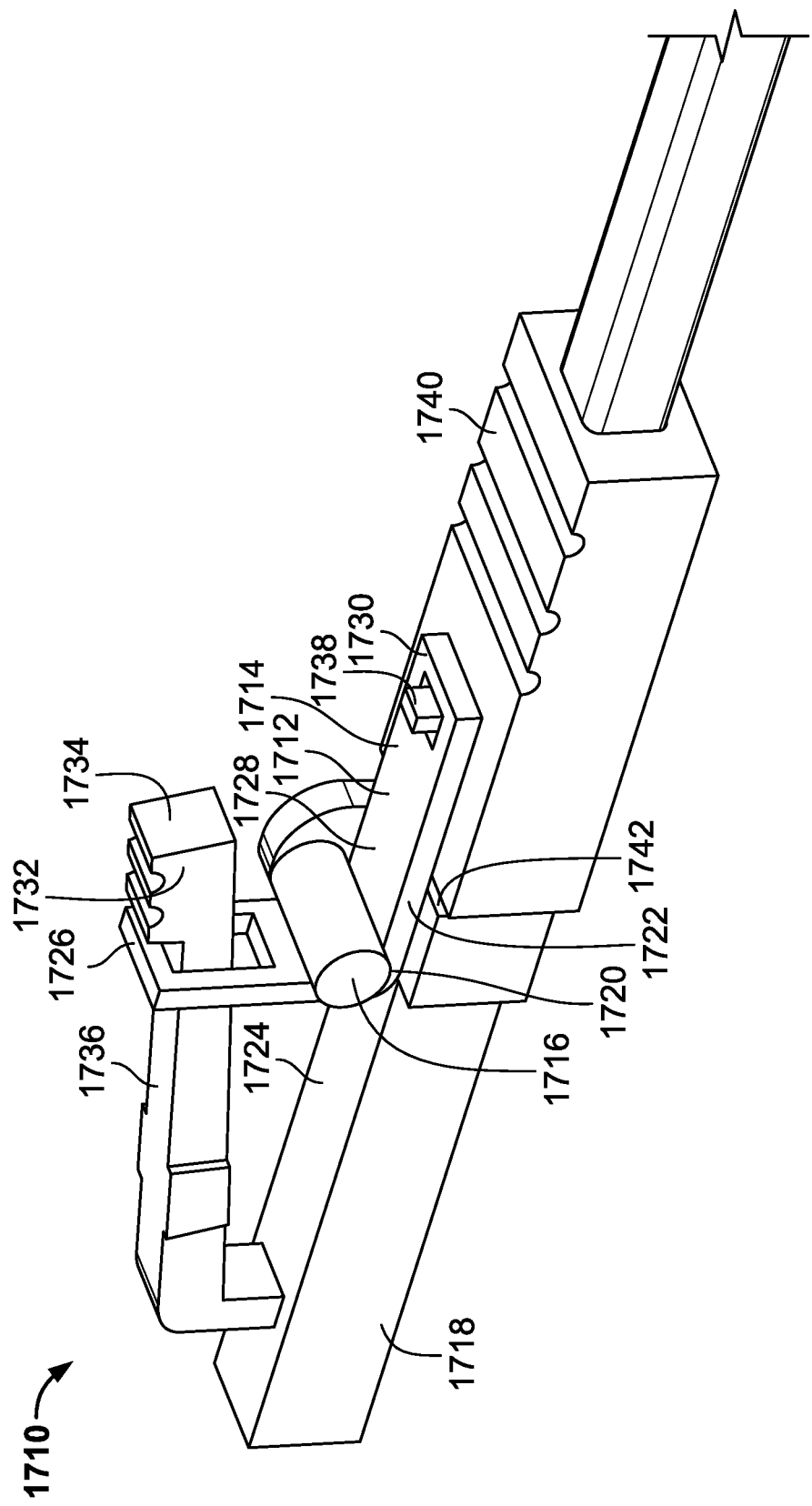
FIG. 44 illustrates a rear perspective view of a portion of yet another embodiment of a fiber optic connector having features that are examples of inventive aspects in accordance with the present disclosure, the fiber optic connector having features similar to the connector of FIG. 36.

FIG. 44 illustrates another embodiment of a fiber optic connector 1710 having features that are examples of inventive aspects in accordance with the present disclosure. The fiber optic connector 1710 includes features similar to the connector 1110 of FIG. 36 in that a release trigger 1712 in the form of a slidable pull tab 1714 is utilized.

In the version of the connector 1710, the pull tab 1714 is designed to have a curve and slide under an integral post 1716 of a connector front housing portion 1718 instead of being provided underneath a snap-fit latch trigger as in the connector 1110 of FIG. 36. Similar to the connector 1110, the integral post 1716 provides a channel or passthrough 1720 thereunder that communicates with a slide surface 1722 provided on a top wall 1724 of the front housing portion 1718 for the slidable pull tab 1714.

The pull tab 1714, as shown, includes a front catch portion 1726, a middle portion 1728, and a rear catch portion 1730. The elongate but curved middle portion 1728 is configured to fit underneath the integral post 1716 so as to slide on the slide surface 1722.

The front catch portion 1726 is configured to contact and interact with a lip 1732 defined at a rear end 1734 of a latch 1736 for transferring a linear motion of the pull tab 1714 to a downward movement of the rear end 1734 of the latch 1736 when the pull tab 1714 is slidably pulled.

The rear catch portion 1730 is again designed to interact with hooks or tabs 1738 provided on a strain relief boot 1740 of the connector 1710. When the strain relief boot 1740 is pulled away from the front housing portion 1718, the pull tab 1714 slidably moves and acts on the flexible latch 1736 of the connector 1710 to move the latch 1736 downward. With the use of the pull tab 1714, direct access to the connector latch 1736 that is close to the front of the connector 1710 is not required. The strain relief boot 1740, by acting via the pull tab 1714, provides accessibility at a distance from a rear end 1742 of the front connector housing portion 1718 for unlatching the connector 1710 from an adapter, similar to that discussed above for connector 1110.

Figure 45:
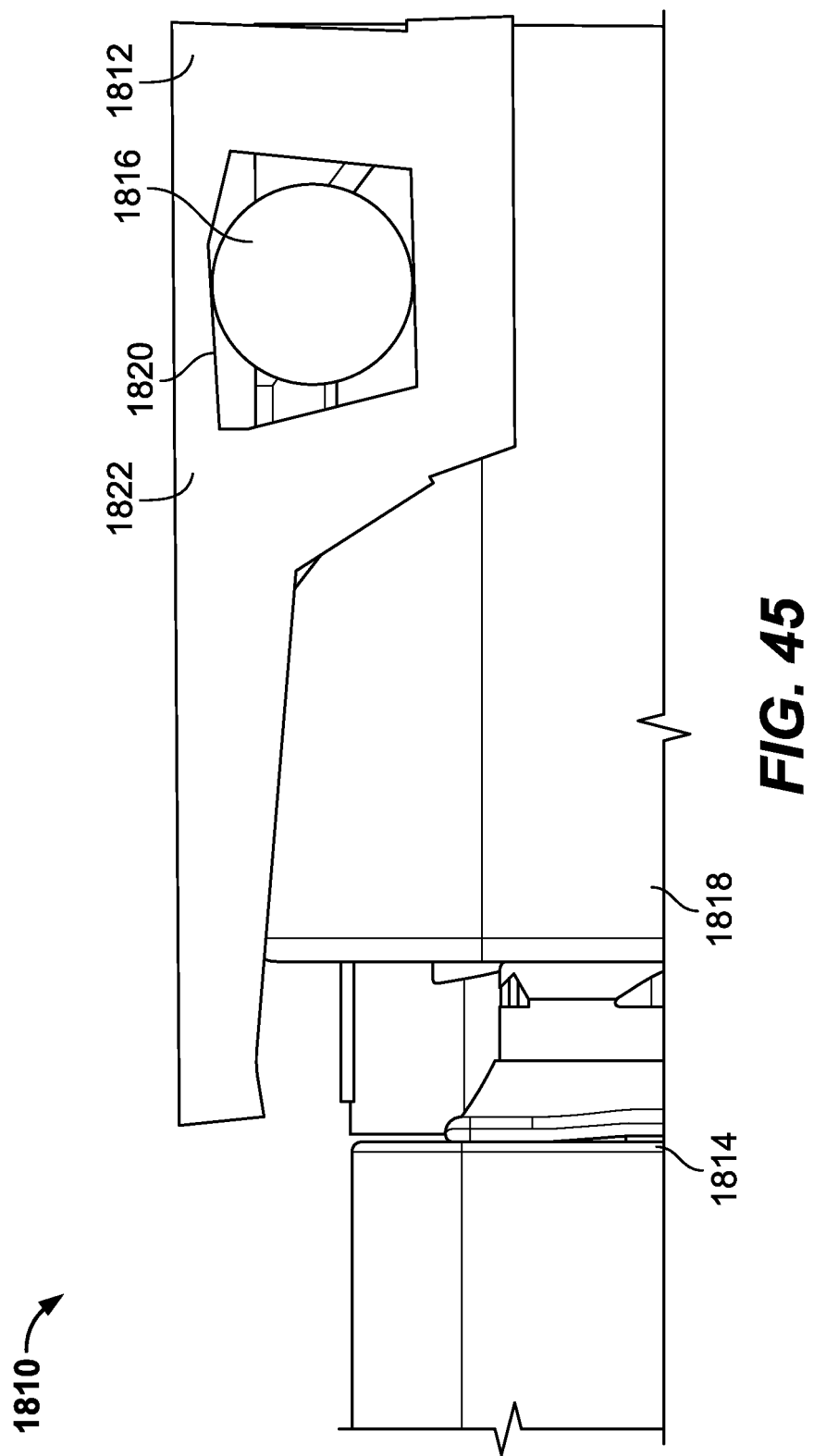
FIG. 45 illustrates a side view of a portion of yet another embodiment of a fiber optic connector having features that are examples of inventive aspects in accordance with the present disclosure, the fiber optic connector having features similar to the connectors of FIGS. 36 and 44.

FIG. 45 illustrates another embodiment of a fiber optic connector 1810 having features that are examples of inventive aspects in accordance with the present disclosure. The fiber optic connector 1810 includes features similar to the connectors 1110 and 1710 of FIGS. 36 and 44, respectively. However, the connector 1810 is designed to simplify the rotation of a front housing portion 1812 relative to a rear housing portion 1814 of the connector 1810 for polarity reversal. Whereas in the connector designs 1110 and 1710, the slidable boots have to be moved such that the rear catch portions of the pull tabs can be cleared from the strain relief boots prior to rotation, the connector 1810 is designed with side posts 1816 on a boot 1818 that can simply receive rear catch portions 1820 of pull tabs 1822 laterally when the connector front housings 1812 are rotated about their longitudinal axes relative to the rear housing portions 1814. With such a design, the boots 1818 do not have to be moved or manipulated for releasing the rear catches 1820 of the pull tabs 1822 prior to rotation, and polarity reversal can be facilitated.

Figure 46:
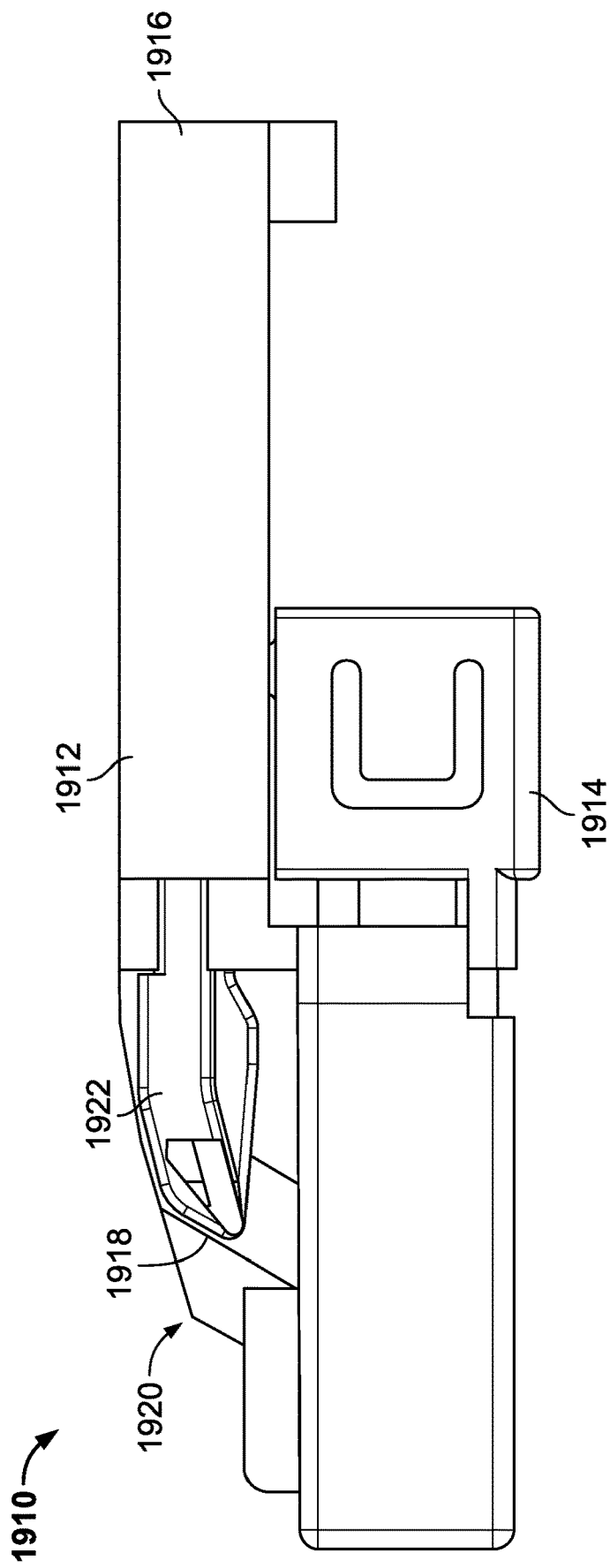
FIG. 46 illustrates a side view of a portion of yet another embodiment of a fiber optic connector having features that are examples of inventive aspects in accordance with the present disclosure.

FIG. 46 illustrates yet another embodiment of a fiber optic connector 1910 having features that are examples of inventive aspects in accordance with the present disclosure.

The connector 1910 defines a two-piece front housing portion that is formed from a first front housing 1912 and a second front housing 1914. The first front housing 1912 is slidably mounted to the second front housing 1914. The first front housing 1912 defines a rear extension 1916 that is used to provide a pulling force on the first front housing 1912. When the first front housing 1912 is pulled, a ramp 1918 defined adjacent a front side 1920 contacts a latch 1922 of the connector 1910 which is located on the second front housing 1914. The interaction of the ramp 1918 with the front profile of the latch 1922 causes the latch 1922 to move downwardly as the first front housing 1912 is pulled rearward with respect to the second front housing 1914. This two-piece connector design is similar in concept to an SC style connector that has two relatively slidable housing pieces for the purpose of unlatching the connector from an adapter.

FIGS. 47-50 illustrate another embodiment of a fiber optic connector 2010 having features that are examples of inventive aspects in accordance with the present disclosure. The fiber optic connector 2010 is a variation on the concept illustrated in connector 1910 of FIG. 46.

Figure 47:
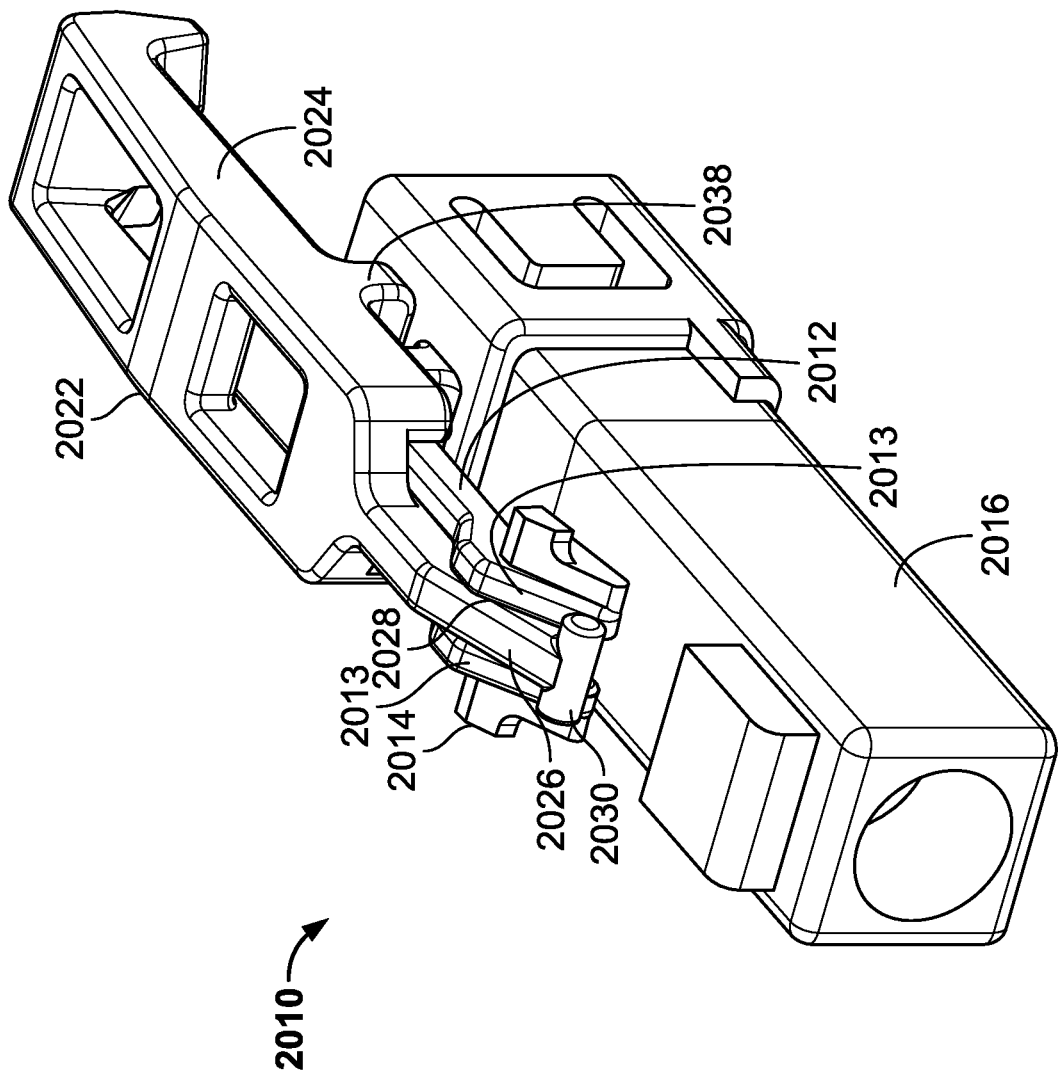
FIG. 47 illustrates a front perspective view of a portion of yet another embodiment of a fiber optic connector having features that are examples of inventive aspects in accordance with the present disclosure, the fiber optic connector having features similar to the connector of FIG. 46.
Figure 48:
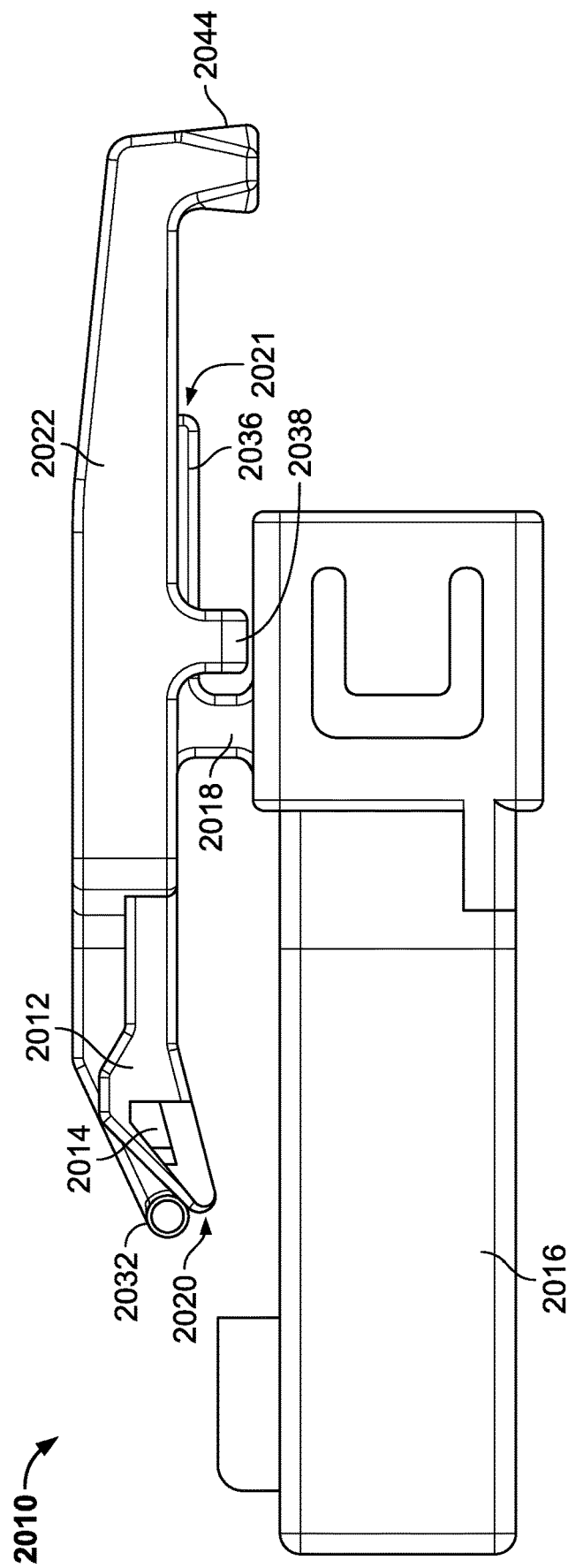
FIG. 48 is a side view of the fiber optic connector of FIG. 47.

It should be noted FIG. 47 is a front perspective view of the fiber optic connector 2010. FIG. 48 is a side view of the fiber optic connector 2010. FIG. 49 is a bottom perspective view of a duplex version of the fiber optic connector 2010. FIG. 50 illustrates a cross-sectional view taken along a plane parallel to the longitudinal axis of the fiber optic connector 2010, illustrating the latching of the fiber optic connector 2010 with an LC format fiber optic adapter 100.

In the fiber optic connector 2010, a latch 2012 of the connector 2010 that defines shoulders 2014 for mating with a fiber optic adapter 100 is integrally molded with a front connector housing portion 2016. In the embodiment shown, the integral latch 2012 is elastically pivotable with respect to the front housing portion 2016 about a connection point 2018. The connection point 2018 is located at a position between a front end 2020 of the latch 2012 and a rear end 2021 of the latch 2012.

In connector 2010, in addition to the latch 2012, the connector 2010 includes a release trigger 2022 that is provided in the form of a slider structure 2024 that fits around and slides relative to the latch 2012. As shown in FIGS. 47-50, the slider structure 2024 is configured to slide linearly in the rearward direction relative to the latch 2012. In the depicted embodiment, a majority of a length of the movable slider 2024 is configured to overlap with the latch 2012.

The slider 2024 defines a front portion 2026 that fits and rides within a center slot 2028 dividing the latch 2012 into two halves 2013. And, as the slider 2024 is moved, contact pins 2030 extending transversely from a front 2032 of the slider structure 2024 contact and force ramped front ends 2020 of both of the latch halves 2013 to move the halves 2013 downward, freeing each shoulder 2014 from the internal mating features of a fiber optic adapter 100. As shown, as the slider 2024 is pulled back, the slider 2024 rides along a rear portion 2036 of the latch 2012. And, as the slider 2024 deflects the front end 2020 of the latch 2012 downward, separation of the slider 2024 from the latch 2012 is limited by a retention portion 2038 that fits under the latch structure 2012.

The slider 2024 may be acted upon directly by a user or be pulled by a strain relief boot 2040 that catches a downwardly extending tab 2042 of a rear extension 2044 of the slider structure 2024. The interaction of the strain relief boot 2040 with the slider structure 2024 can be seen in FIGS. 49 and 50.

Again, for polarity reversal, the front housing portion 2016 including the slider 2024 can be rotated with respect to a rear housing portion 2046, the yoke of the connector 2010, and the boot 2040. The downwardly extending tabs 2042 of the slider 2024 can fit into slots 2048 at the opposite side of the boot 2040 in changing the polarity.

In a design of a connector such as the connector 2010 of FIGS. 47-50, a release of the strain relief boot 2040 (under a spring bias, for example) allows the slider 2024 to slide back toward the front of the connector 2010, allowing the front latch 2012 to move back upward. It should be noted that the inherent elasticity of the latch 2012 will also act to move the slider structure 2024 forward, providing a double spring action on the slider 2024.

FIGS. 51-58 illustrate another embodiment of a fiber optic connector 2110 having features that are examples of inventive aspects in accordance with the present disclosure. The fiber optic connector 2110 includes features similar to the connectors 1910 and 2010 of FIGS. 46-50. The fiber optic connector 2110 is illustrated as a duplex example, the features thereof fully applicable to a simplex version.

Figure 53:
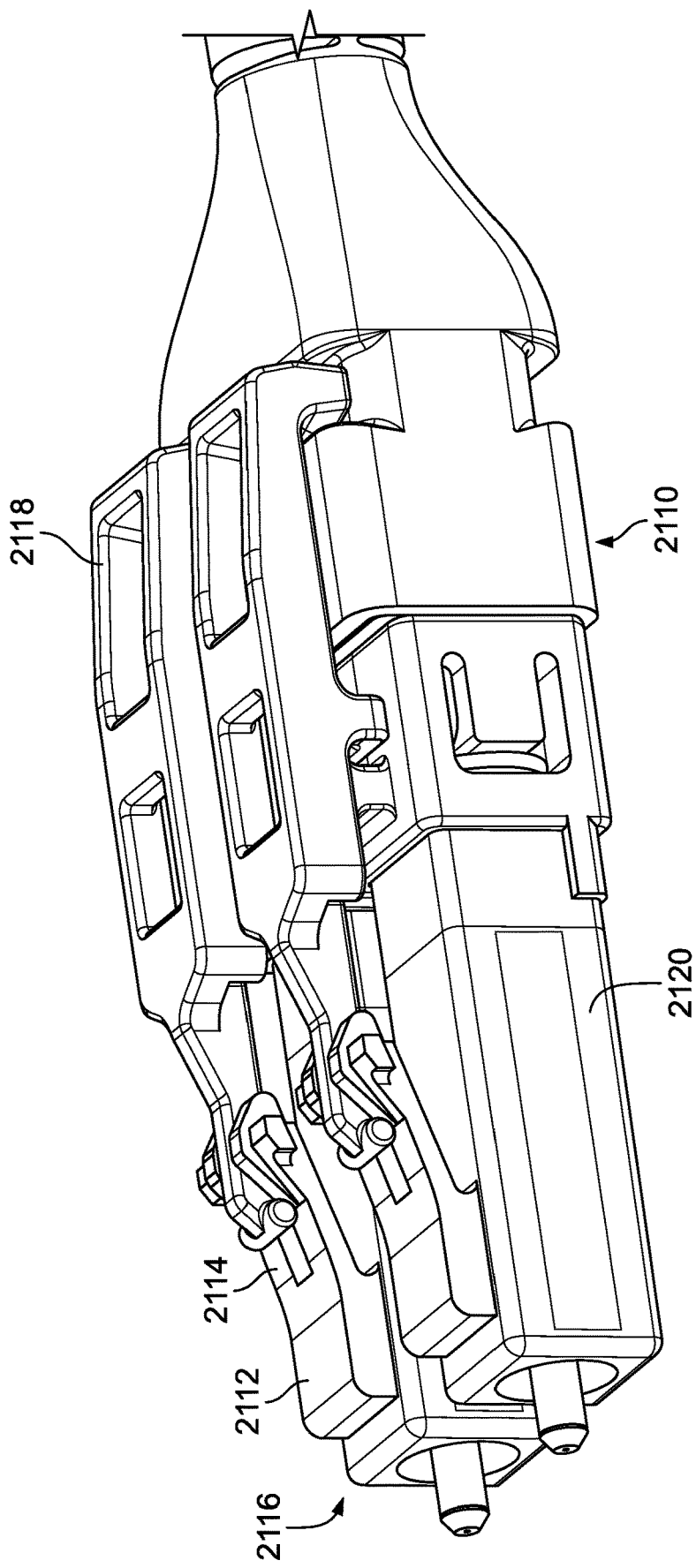
FIG. 53 is a top perspective view of the duplex fiber optic connector of FIG. 51, the duplex connector illustrated outside of a fiber optic adapter.
Figure 54:
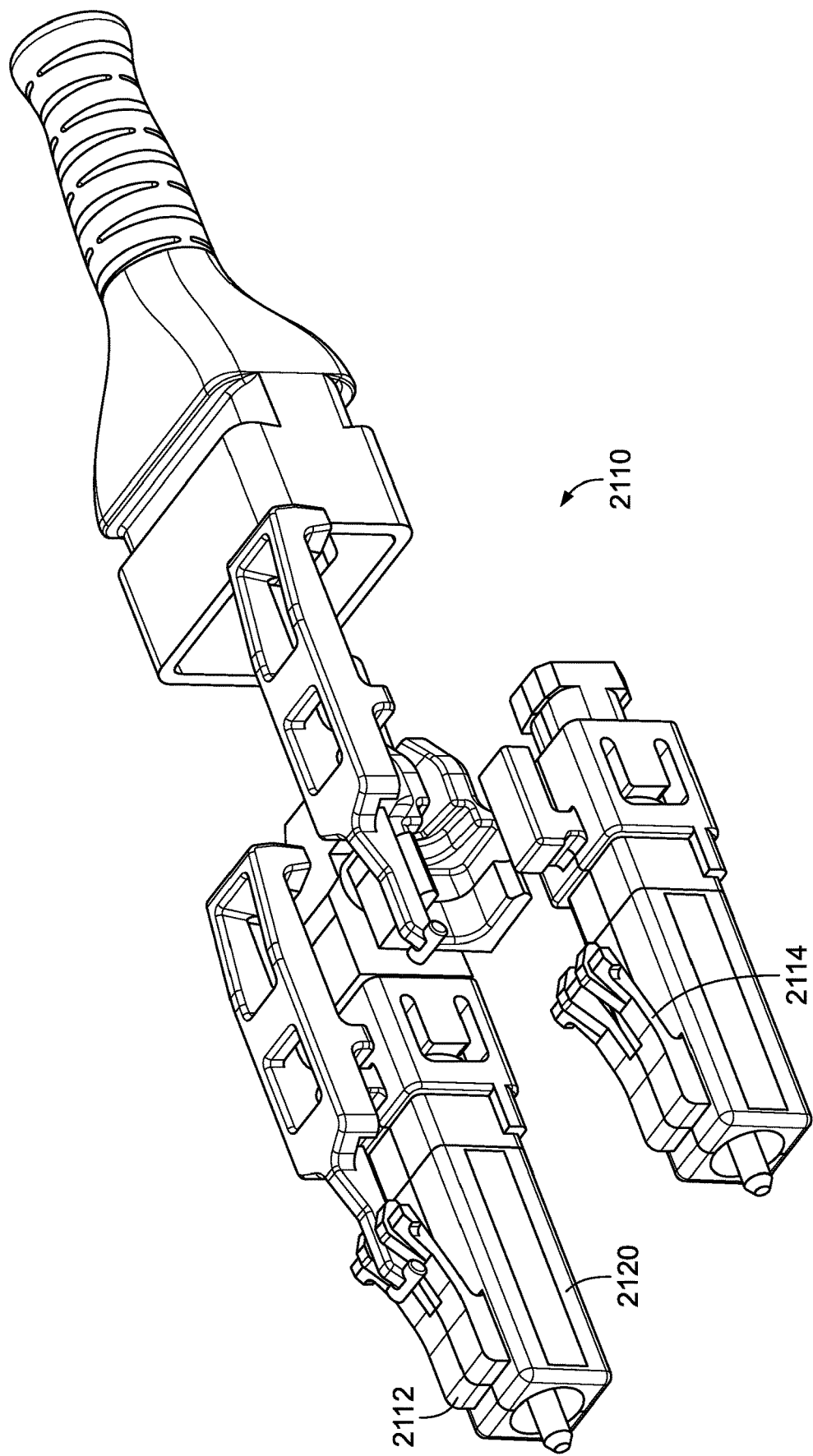
FIG. 54 is an exploded view of the duplex fiber optic connector of FIG. 53.
Figure 55:
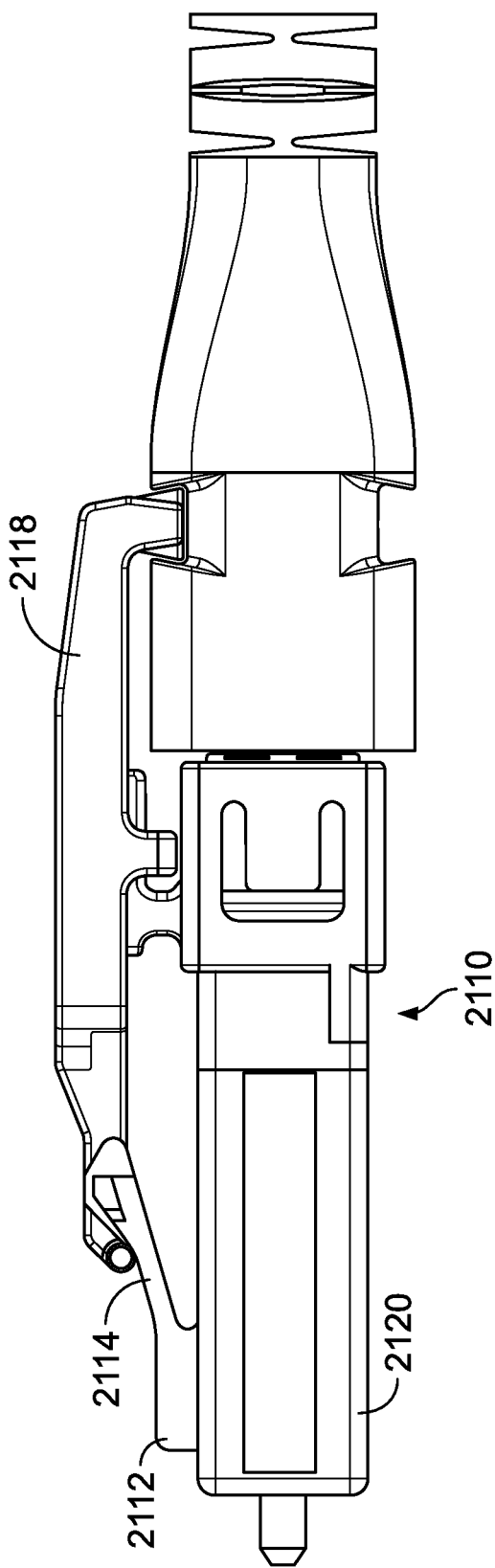
FIG. 55 is a side view of the duplex fiber optic connector of FIG. 53.
Figure 56:
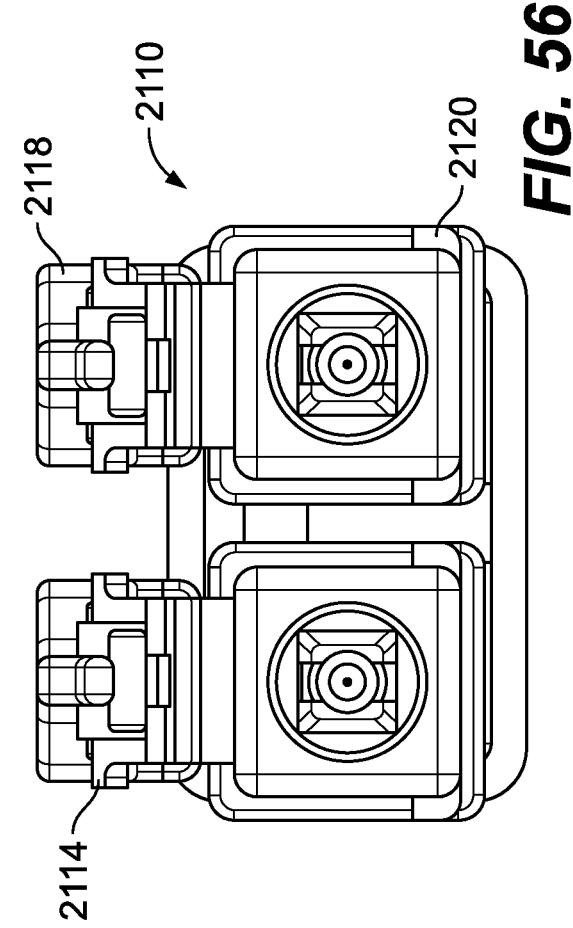
FIG. 56 is a front view of the duplex fiber optic connector of FIG. 53.
Figure 57:
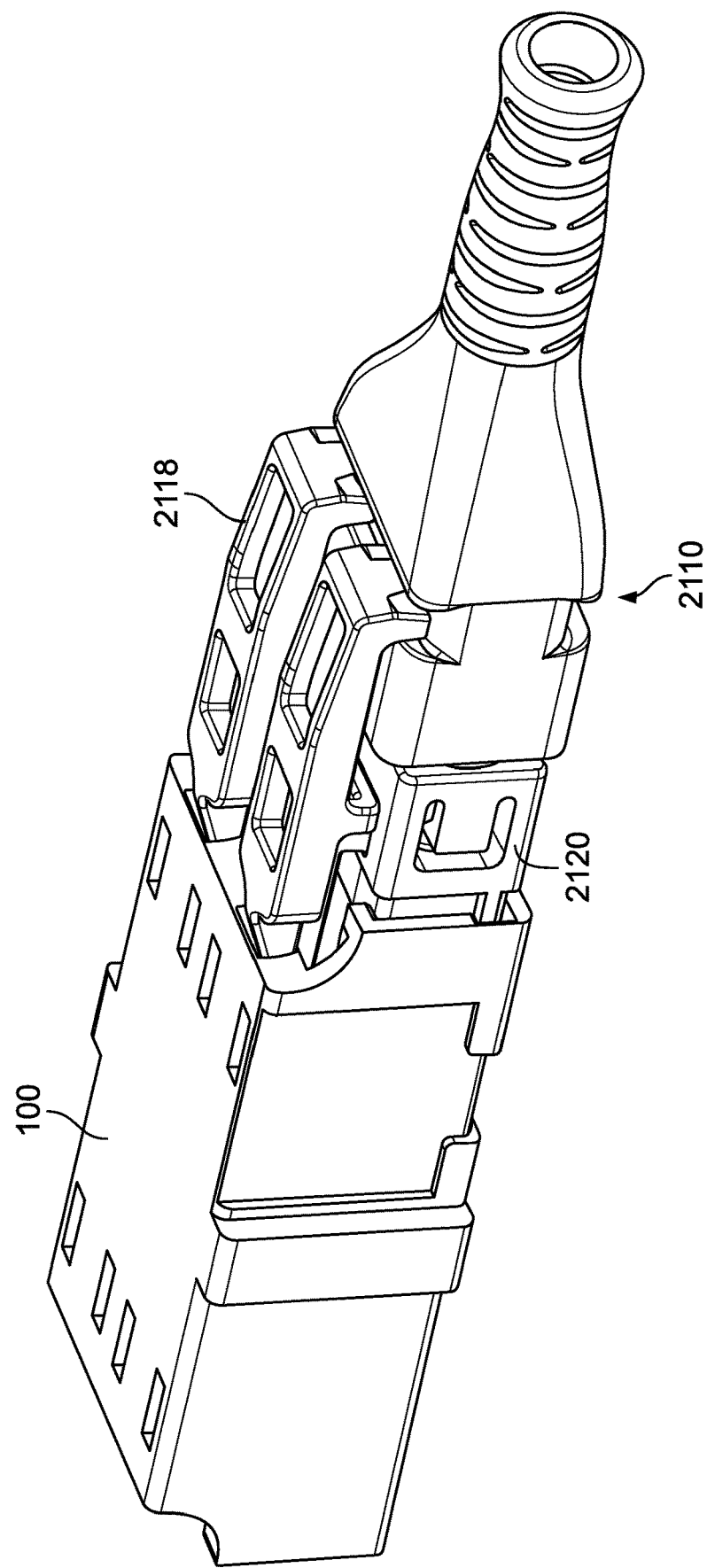
FIG. 57 is a rear perspective view of the duplex fiber optic connector of FIG. 53 when mounted within an LC format fiber optic adapter.
Figure 58:
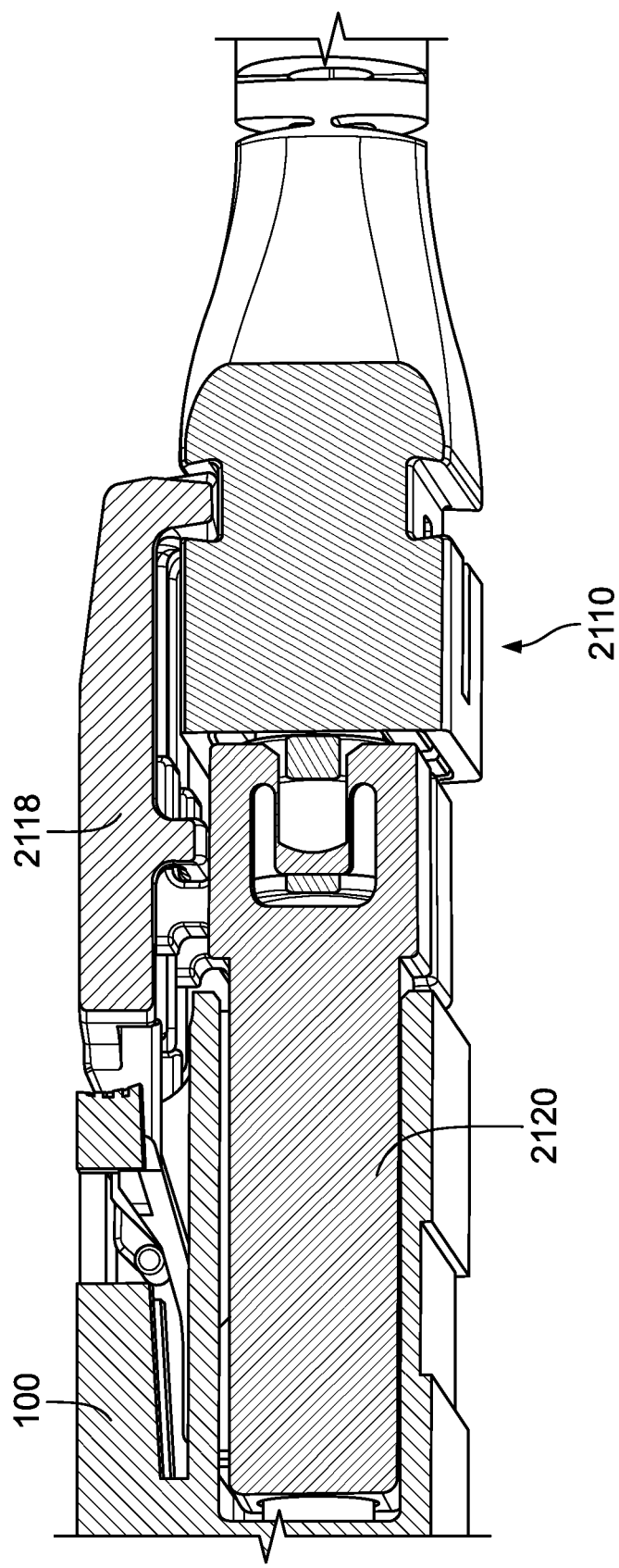
FIG. 58 is another perspective cross-sectional view taken along a plane parallel to the longitudinal axis of the fiber optic connector of FIG. 53 illustrating the latching of the fiber optic connector with the LC format fiber optic adapter of FIG. 57.

It should be noted that FIG. 51 is a bottom perspective view of the fiber optic connector 2110. FIG. 52 is a cross-sectional view taken along a plane parallel to the longitudinal axis of the fiber optic connector 2110, illustrating the latching of the fiber optic connector 2110 with an LC format fiber optic adapter 100. FIG. 53 is a top perspective view of the fiber optic connector 2110, the connector 2110 illustrated outside of a fiber optic adapter 100. FIG. 54 is an exploded view of the duplex fiber optic connector 2110. FIG. 55 is a side view of the duplex fiber optic connector 2110. FIG. 56 is a front view of the duplex fiber optic connector 2110. FIG. 57 illustrates a rear perspective view of the duplex fiber optic connector 2110 when mounted within an LC format fiber optic adapter 100. And, FIG. 58 is another perspective cross-sectional view taken along a plane parallel to the longitudinal axis of the fiber optic connector 2110, illustrating the latching of the fiber optic connector 2110 within the LC format fiber optic adapter 100.

The connector 2110 of FIGS. 51-58 is similar in design and operation to connector 2010 except that the integral connection location 2112 for the front latch 2114 is provided at a position generally near a front end 2116 of the latch 2114, whereas the connection location is provided at a position in between the rear end of the latch and a front end of the latch for the connector 2010 of FIGS. 47-50.

As a slider 2118 of the fiber optic connector 2110 is moved relative to the front housing portion 2120, the latch 2114 is elastically deflected down about the connection location 2112 that is generally near the front end of the latch 2114.

The front connection location 2112 for the latch 2114 of the connector 2110 provides certain advantages over a design such as the design of the connector 2010 of FIGS. 47-50. The front connection location 2112 of the latch 2114 may limit some unwanted bending or deflection of the latch 2114 that might occur in a connector such as the connector 2010 of FIGS. 47-50 when being inserted into an adapter 100 that might lead to inadvertent unlatching of a connector such as the connector 2010.

Figure 59:
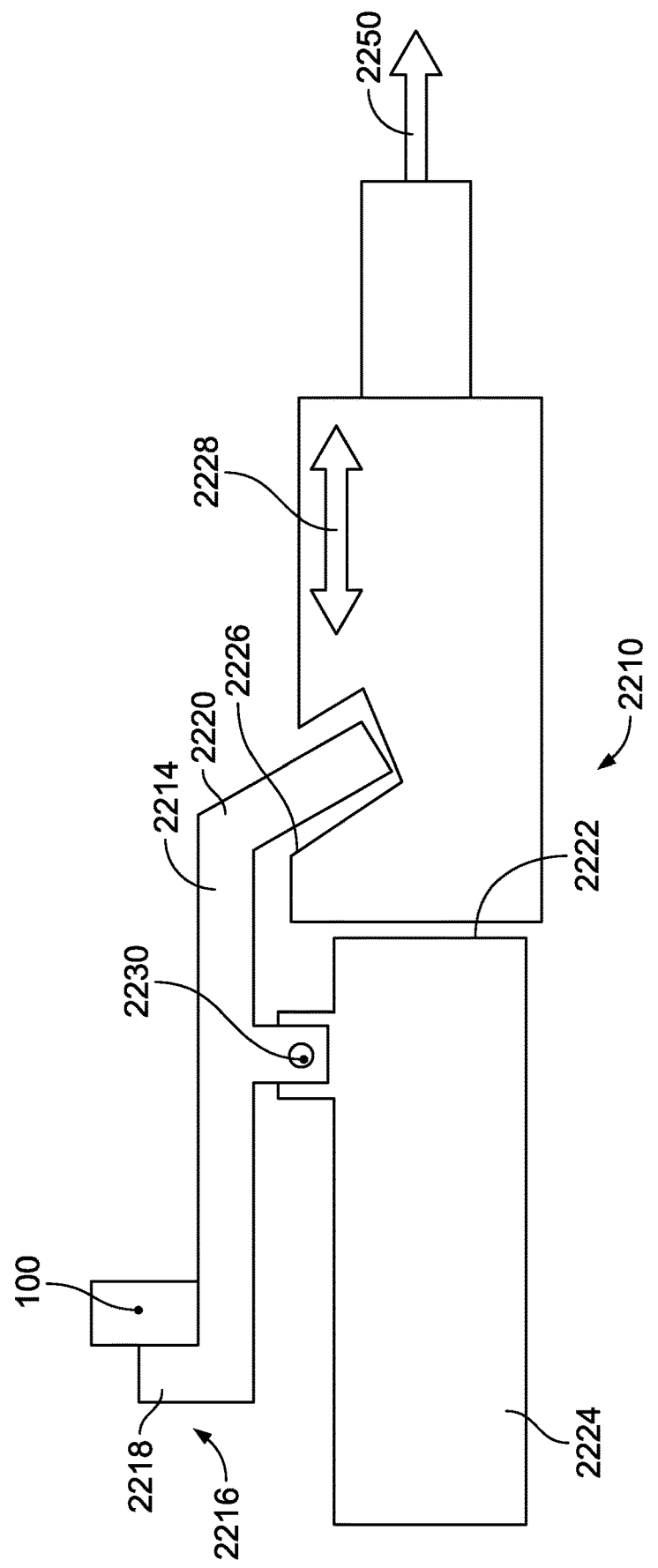
FIG. 59 illustrates a side view of a portion of yet another embodiment of a fiber optic connector having features that are examples of inventive aspects in accordance with the present disclosure.

FIG. 59 illustrates another embodiment of a fiber optic connector 2210 having features that are examples of inventive aspects in accordance with the present disclosure.

In the connector 2210, a latch 2212 and a release trigger 2214 are integrally formed. The integral latch 2212 and the release trigger 2214 define a front end 2216 that includes shoulders 2218 for abutting mating features of a fiber optic adapter 100. A rear extension 2220 of the release trigger 2214 extends past a rear end 2222 of a front housing portion 2224. The rear extension 2220 is configured to cooperate with an angled slot 2226 (or slots for duplex connectors) defined in a strain relief boot 2228 of the connector 2210.

The integral latch 2212 and release trigger 2214 are attached to the front connector housing portion 2224 via a pinned connection 2230 that provides a rotatable pivotal movement. When the strain relief boot 2228 is pulled away from the front housing portion 2224, the angled slot 2226 of the boot 2228 forces the rear extension 2220 of the trigger 2214 upwardly, causing the front latch portion 2212 of the connector 2210 to pivot downwardly about the pivotal pinned connection 2230, and freeing the connector 2210 from the fiber optic adapter 100.

In this embodiment, the strain relief boot 2228 may be loose or free to slide relative to the yoke and a cable 2250. Pulling on the boot 2228 will move the latch 2212 down and pushing on the boot 2228 will cause the latch 2212 to move back up. If the pulling forces are applied to the cable 2250 instead of the boot 2228, the forces bypass the boot 2228 and are transferred directly to the latch 2212 to keep the latch 2212 locked against the adapter 100.

Again, for polarity reversal, the front housing portion 2224 can be rotated with respect to the rear housing portion, a yoke of the connector 2210, and the boot 2228. Angled slots 2226 at the opposite side of the boot 2228 can be utilized after rotation for the latch release functionality.

Figure 60:
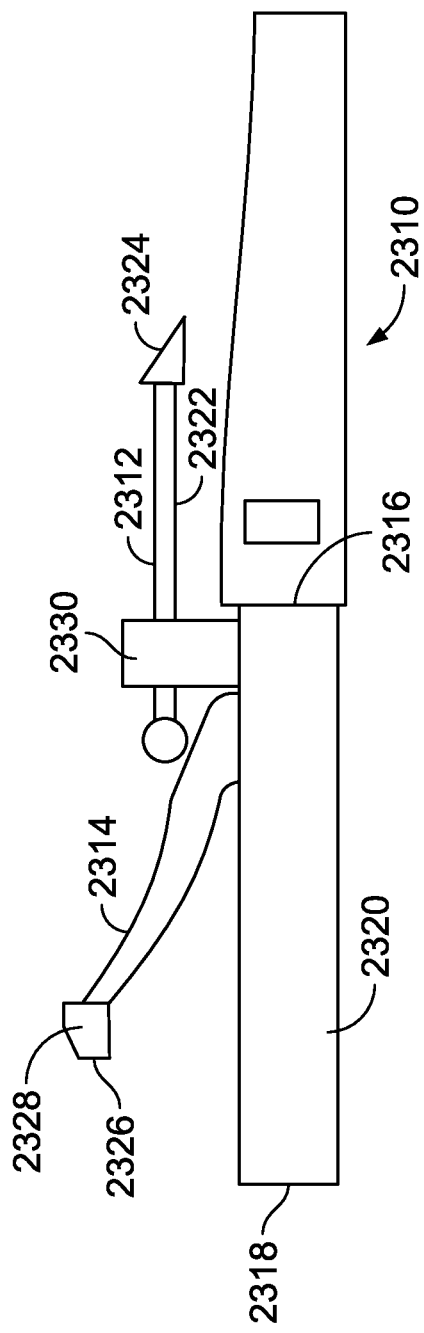
FIG. 60 illustrates a side view of a portion of yet another embodiment of a fiber optic connector having features that are examples of inventive aspects in accordance with the present disclosure.

FIG. 60 illustrates another embodiment of a fiber optic connector 2310 having features that are examples of inventive aspects in accordance with the present disclosure.

The connector 2310 is designed to utilize a push concept for the release trigger 2312 for unlatching the connector 2310 from an adapter. As shown, the connector 2310 is designed with a latch 2314 that angles upwardly in a direction from a rear end 2316 toward a front end 2318 of the front connector housing portion 2320 at an acute angle. The latch 2314 is biased upwardly for providing the latching function. The release trigger 2312 includes a rear extension 2322 that is in the form of a push tab 2324 to be acted on by a user. When pushed forward, the release trigger 2312 contacts the latch 2314 and a slidable linear motion of the release trigger 2312 is transformed into a downward movement of a front end 2326 of the latch 2314 for releasing shoulders 2328 of the latch 2314 from an adapter. As shown, the release trigger 2312 can be slidably guided by an upward extension 2330 of the front connector housing portion 2320 to provide a nested configuration.

Figure 61:
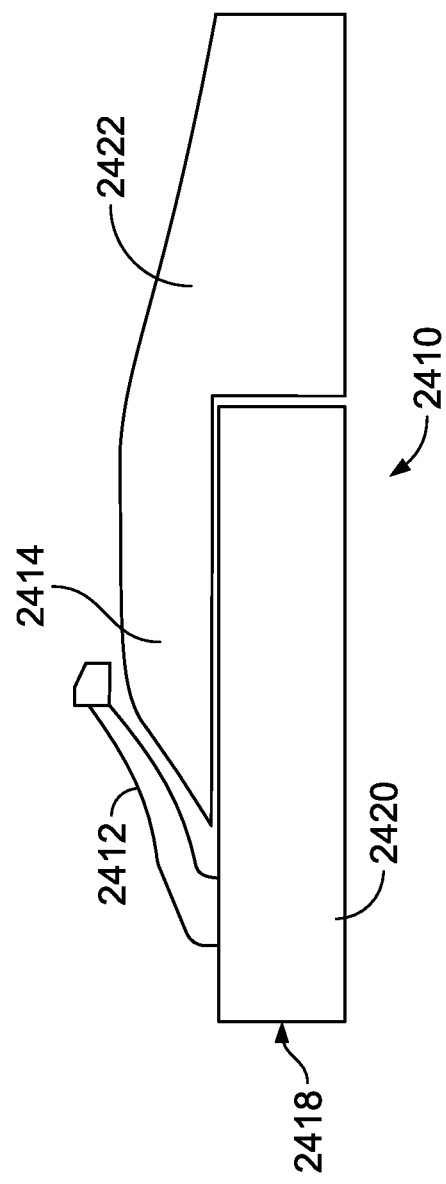
FIG. 61 illustrates a side view of a portion of yet another embodiment of a fiber optic connector having features that are examples of inventive aspects in accordance with the present disclosure.

FIG. 61 illustrates another embodiment of a fiber optic connector 2410 having features that are examples of inventive aspects in accordance with the present disclosure.

The connector 2410 is designed with a latch 2412 that is movable between a raised latching position and a lowered release position, wherein the latch 2412 is spring-biased toward the lowered release position. Thus, when the latch 2412 is not being acted upon, the connector 2410 can be freed from a fiber optic adapter.

As shown, the connector 2410 also includes a movable wedge structure 2414 that is configured to keep the latch 2412 in the raised position against the inherent bias of the latch 2412 when the wedge structure 2414 is at least partially inserted under the latch 2412. The wedge structure 2414 is configured such that when the wedge structure 2414 is moved away from a front end 2418 of the front housing portion 2420, the latch 2412 automatically moves to the lowered release position to free the telecommunications connector 2410 from a fiber optic adapter. In certain embodiments, the movable wedge 2414 may be spring-biased toward the front end 2418 of the front housing portion 2420 to keep the latch 2412 in the latching position. In the embodiment of the connector 2410 shown in FIG. 61, the movable wedge 2414 is defined by at least a portion of a strain relief boot 2422, wherein the boot 2422 is movably mounted to the telecommunications connector 2410 and is movable longitudinally relative to the front housing portion 2420. When the boot 2422 is pulled, the latch 2412 moves downwardly under its own bias and unlatches from the adapter.

Figure 62:
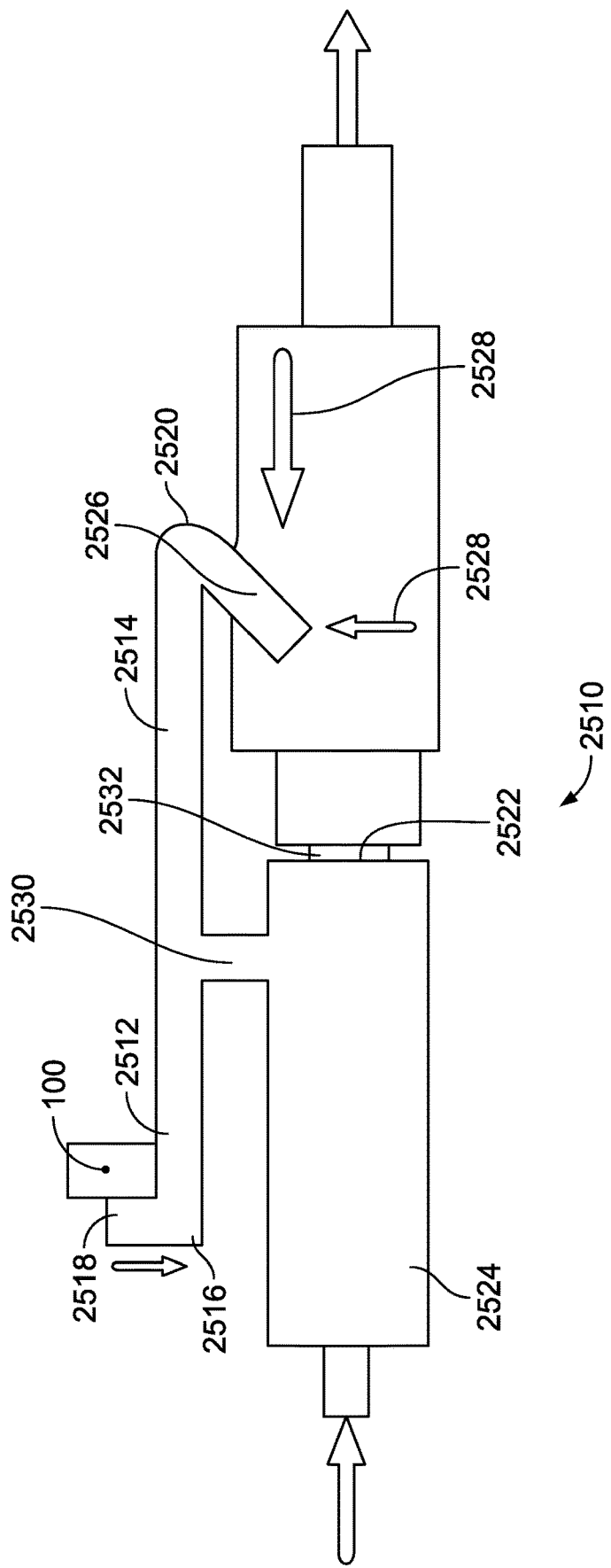
FIG. 62 illustrates a side view of a portion of yet another embodiment of a fiber optic connector having features that are examples of inventive aspects in accordance with the present disclosure.

FIG. 62 illustrates another embodiment of a fiber optic connector 2510 having features that are examples of inventive aspects in accordance with the present disclosure.

In the connector 2510, the latch 2512 and the release trigger 2514 are integrally formed. The integral latch 2512 and release trigger 2514 define a front end 2516 that includes shoulders 2518 for abutting mating features of a fiber optic adapter 100. A rear extension 2520 of the release trigger 2514 extends past a rear end 2522 of a front housing portion 2524. The rear extension 2520 is configured to cooperate with an angled slot 2526 (or slots for duplex connectors) defined in s strain relief boot 2528 of the connector 2510.

The integral latch 2512 and release trigger 2514 are attached to the front connector housing portion 2524 via an elastically formed pivot connection 2530 that is positioned between the front end 2516 of the latch 2512 and the rear extension 2520.

In this embodiment, when the boot 2528 is pushed toward the front housing portion 2524, the latch 2512 will elastically pivot about the connection point 2530 and be deflected downward. Once the latch 2512 clears the adapter 100, then the boot 2528 is again used to pull the entire connector 2510 from the adapter 100. Thus, the design of the connector 2510 utilizes a two-motion mechanism for removal. A pen-click type mechanism may be used to first deflect the latch 2512 down and then to pull the connector 2510 back.

Again, for polarity reversal, the front housing portion 2524 can be rotated with respect to a rear housing portion 2532, a yoke of the connector 2510, and the boot 2528. Angled slots 2526 at the opposite side of the boot 2528 can be utilized after rotation for the latch-release functionality.

Figure 63:
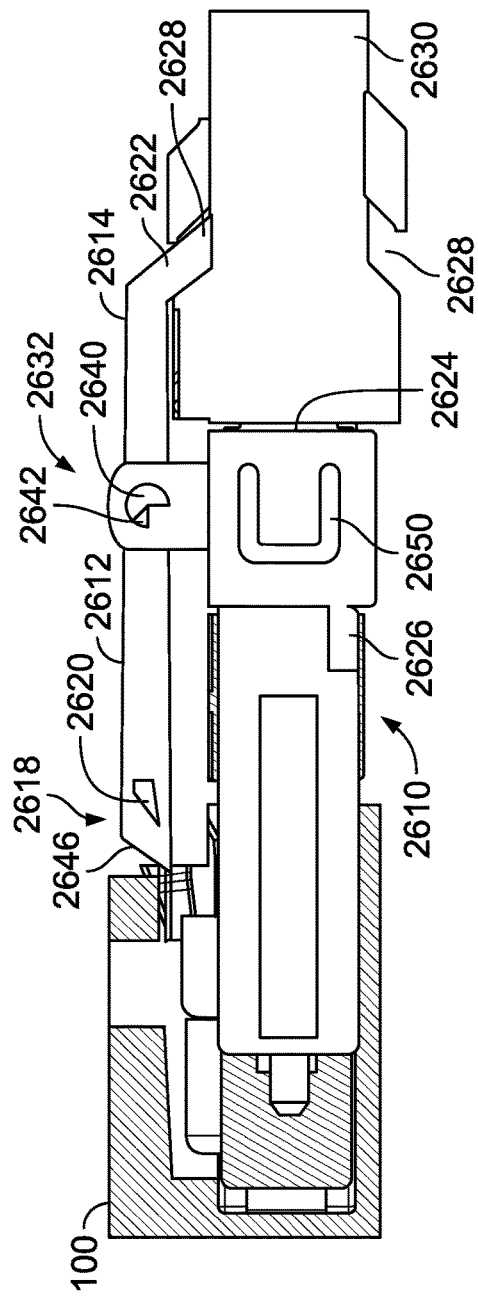
FIG. 63 illustrates a side view of a portion of yet another embodiment of a fiber optic connector having features that are examples of inventive aspects in accordance with the present disclosure.

FIG. 63 illustrates another embodiment of a fiber optic connector 2610 having features that are examples of inventive aspects in accordance with the present disclosure.

In the connector 2610, the latch 2612 and the release trigger 2614 are integrally formed. The integral latch 2612 and release trigger 2614 define a front end 2618 that includes shoulders 2620 for abutting with internal features of a fiber optic adapter 100. A rear extension 2622 of the release trigger 2614 extends past a rear end 2624 of a front housing portion 2626. The rear extension 2622 is configured to cooperate with an angled slot 2628 (or slots for duplex connectors) defined in a strain relief boot 2630 of the connector 2610.

The integral latch 2612 and release trigger 2614 are attached to the front connector housing portion 2626 via a pinned connection 2632 that provides a pivotal movement. When the strain relief boot 2630 is pulled away from the front housing portion 2626, the angled slot 2628 of the boot 2630 forces the rear extension 2622 of the trigger 2614 upwardly, causing the front latch portion 2612 of the connector 2610 to pivot downwardly about the pivotal pinned connection 2632, and freeing the connector 2610 from the fiber optic adapter 100.

A release of the strain relief boot 2630 (under a spring bias, for example) allows the opposite motion for the release trigger 2614, allowing the front latch 2612 to move back upward to lock the connector 2610 within the adapter 100.

As shown in FIG. 63, the pinned connection 2630 may define a rotation limit feature to limit the pivotal movement of a pin 2640 of the integral latch 2612 within a hinge opening 2642 of the pinned connection structure 2630.

It should be noted that a front end 2618 of the latch 2612 is designed with an angled ramp 2646 for deflection during initial connector insertion into the adapter 100.

The integral design of the latch 2612 and the release trigger 2614 where the pivotal pin 2640 of the release trigger 2614 and the front shoulders 2620 of the latch 2612 are linearly aligned, defining a single line of action, may also limit the bending moments between the pin 2640 and the latch shoulders 2620.

Again, for polarity reversal, the front housing portion 2626 can be rotated with respect to a rear housing portion 2650, a yoke of the connector 2610, and the boot 2630. Angled slots 2628 at the opposite side of the boot 2630 can be utilized after rotation for the latch release functionality.

Figure 64:
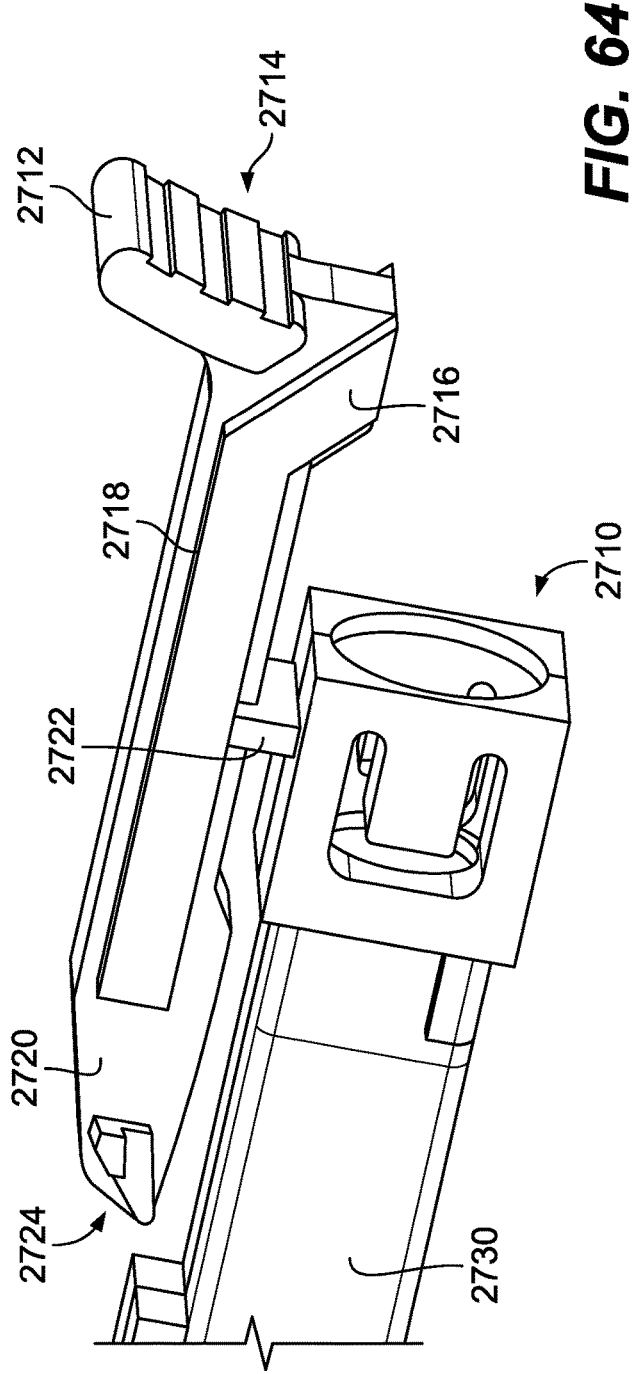
FIG. 64 illustrates a side view of a portion of yet another embodiment of a fiber optic connector having features that are examples of inventive aspects in accordance with the present disclosure.

FIG. 64 illustrates another embodiment of a fiber optic connector 2710 having features that are examples of inventive aspects in accordance with the present disclosure.

The connector 2710 illustrated in FIG. 64 utilizes a push tab 2712 at an end 2714 of a rear extension 2716 of a release trigger 2718. As shown, the release trigger 2718, which is integrally formed with a front latch 2720 of the connector 2710 and which is configured to elastically pivot about a connection location 2722 that is defined between a front end 2724 of the latch 2720 and the rear end 2714 of the release trigger 2718, is provided with a rear extension design 2716 that can cooperate with an angled slot (or slots for duplex connectors) defined in a strain relief boot of the connector 2710.

In such a connector 2710, when a strain relief boot is pulled away from a front housing portion 2730, the angled slot of the boot forces the rear extension 2716 of the trigger 2718 upwardly, causing the front latch 2720 downwardly as the entire integral structure elastically pivots about the pivot connection 2722. A release of the strain relief boot (under a spring bias, for example) allows the opposite motion for the release trigger 2718, allowing the front latch 2720 to move back upward to lock the connector 2710 within an adapter.

However, in instances, where the rear extension 2716 of the release trigger 2718 gets caught in the slots of a strain relief boot due to friction, or if the slidable movement of the strain relief boot, for some reason, fails to move the front latch 2720 downward, the push tab 2712 at the end 2714 of the rear extension 2716 of the release trigger 2718 can be utilized to directly free the connector 2710 from an adapter.

Figure 65:
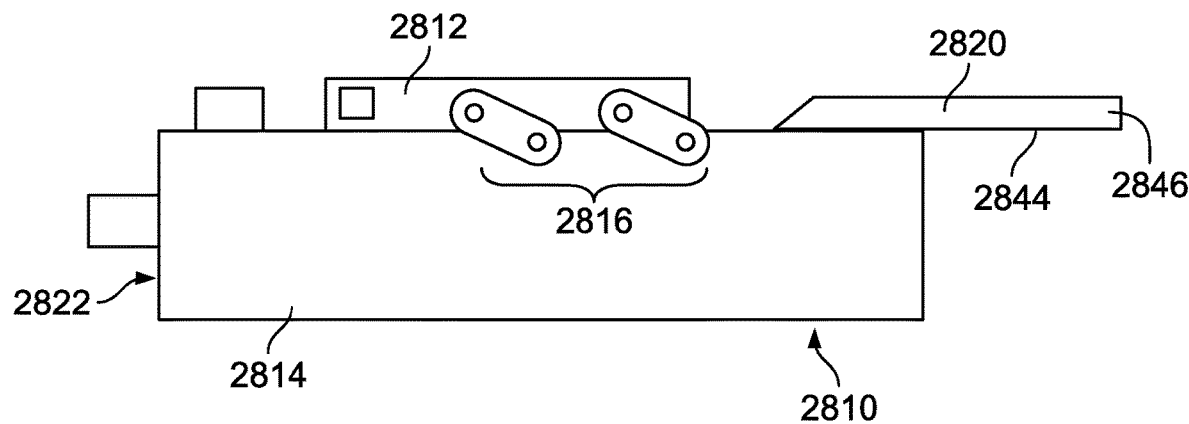
FIG. 65 illustrates a side view of a portion of yet another embodiment of a fiber optic connector having features that are examples of inventive aspects in accordance with the present disclosure, the fiber optic connector shown in a release position.
Figure 66:
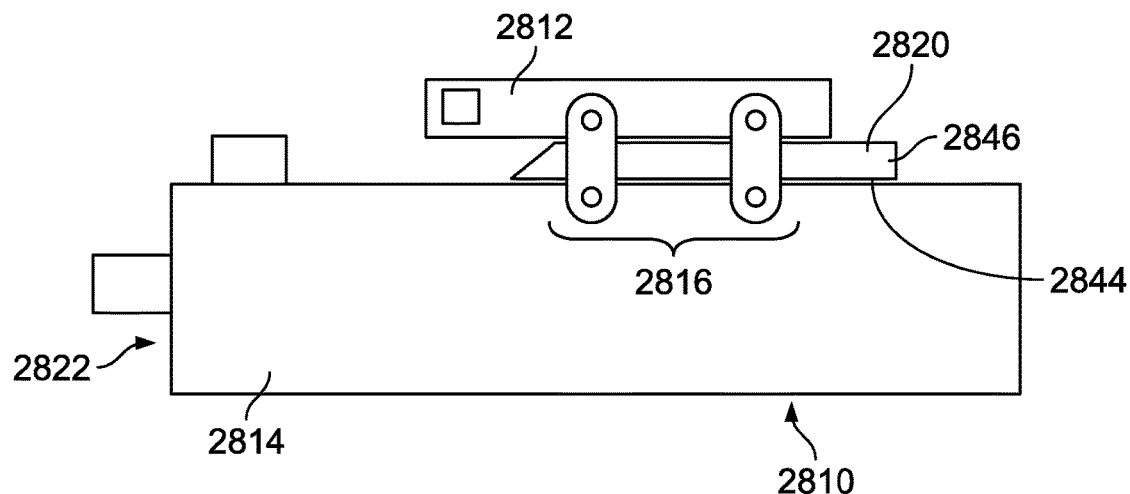
FIG. 66 illustrates the fiber optic connector of FIG. 65 in a latching position.

FIGS. 65-66 illustrate yet another embodiment of a fiber optic connector 2810 having features that are examples of inventive aspects in accordance with the present disclosure. It should be noted that FIG. 65 illustrates a side view of the fiber optic connector 2810 when the fiber optic connector 2810 is in a release position, and FIG. 66 illustrates the fiber optic connector 2810 in a latching position.

The connector 2810 is designed with a latch 2812 that is movable between a raised latching position and a lowered release position, wherein the latch 2812 is spring-biased toward the lowered release position. In the depicted embodiment, the latch 2812 is attached to a front housing portion 2814 via a linkage system 2816 that allows the latch 2812 to both translate in a forward/backward direction and to move in an up/down direction.

As noted, the linkage system 2816 is designed such that when the latch 2812 is not being acted upon, the connector 2810 can be freed from a fiber optic adapter.

As shown, the connector 2810 also includes a movable wedge structure 2820 that is configured to keep the latch 2812 in the raised position against the bias of the latch 2812 when the wedge structure 2820 is at least partially inserted under the latch 2812. The wedge structure 2820 is configured such that when the wedge structure 2820 is moved away from a front end 2822 of the front housing portion 2814, the latch 2812 automatically moves to the lowered release position to free the telecommunications connector 2810 from the fiber optic adapter. In certain embodiments, the movable wedge 2820 may be spring-biased toward the front end 2822 of the front housing portion 2814 to keep the latch 2812 in the latching position. In the embodiment of the connector 2810 shown in FIGS. 65 and 66, the movable wedge 2820 may be defined by a release trigger 2844 that has a rear extension 2846 that can be acted upon to slidably move the trigger 2844. When the release trigger 2844 that defines the wedge structure 2820 is pulled, the latch 2812 moves downwardly under its own bias and unlatches from the adapter.

Although in the foregoing description, terms such as "top," "bottom," "front," "back," "rear," "right," "left," "upper," "lower," "forward," and "rearward" may have been used for ease of description and illustration, no restriction is intended by such use of the terms. The connectors described herein can be used in any orientation, depending upon the desired application.

The above specification, examples and data provide a description of the inventive aspects of the disclosure. Many embodiments of the disclosure can be made without departing from the spirit and scope of the inventive aspects of the disclosure.

The invention claimed is:

1. A telecommunications connector comprising:
   at least one connector portion including a front housing portion coupled to a rear housing portion, the front housing portion defining a front end and a rear end, the front housing portion including a ferrule terminating a cable fixed to the at least one connector portion, the front housing portion further including a latch that is configured to contact a fiber optic adapter for locking the telecommunications connector to the fiber optic adapter when the telecommunications connector is inserted into the fiber optic adapter, wherein the latch is movable about a connection location on the front housing portion, the front housing portion further including a movable release trigger configured to contact the latch for moving the latch about the connection location for freeing the telecommunications connector from the fiber optic adapter, the movable release trigger defining a rear extension that extends rearward past the rear end of the front housing portion, the rear extension of the movable release trigger configured to be contacted for moving the latch for freeing the telecommunications connector from the fiber optic adapter; and
   a strain relief boot movably mounted to the telecommunications connector, the boot movable longitudinally relative to the front housing portion, the boot configured to contact the rear extension of the movable release trigger for moving the release trigger to cause the release trigger to move the latch about the connection location to free the telecommunications connector from the fiber optic adapter.

2. A telecommunications connector according to claim 1, wherein the latch and the movable release trigger are configured such that the boot moves the release trigger when the boot is pulled longitudinally away from the front housing portion.

3. A telecommunications connector according to claim 1, wherein the movable release trigger is configured to be moved longitudinally away from the front end of the front housing portion for contacting and moving the latch for freeing the telecommunications connector from the fiber optic adapter.

4. A telecommunications connector according to claim 3, wherein at least a portion of the movable release trigger slides over the latch to move the latch.

5. A telecommunications connector according to claim 1, wherein the movable release trigger is elastically and pivotally movable for contacting and moving the latch for freeing the telecommunications connector from the fiber optic adapter.

6. A telecommunications connector according to claim 1, further comprising a second movable release trigger in addition to the movable release trigger that is configured to be contacted by the strain relief boot, the second movable release trigger configured to also contact the latch to move to latch separately from the movable release trigger that is configured to be contacted by the strain relief boot.

7. A telecommunications connector according to claim 6, wherein the second movable release trigger is elastically and pivotally movable for contacting and moving the latch for freeing the telecommunications connector from the fiber optic adapter.

8. A telecommunications connector according to claim 6, wherein the movable release trigger that is configured to be contacted by the strain relief boot is slidable with respect to the second movable release trigger.

9. A telecommunications connector according to claim 1, wherein the telecommunications connector is a fiber optic connector and the ferrule terminates an optical fiber.

10. A telecommunications connector according to claim 1, wherein the at least one connector portion is configured to be latched to an LC format fiber optic adapter.

11. A telecommunications connector according to claim 1, wherein the telecommunications connector comprises two connector portions provided in a side-by-side relationship, each connector portion including a front housing portion coupled to a rear housing portion, wherein each front housing portion is rotatable relative to the rear housing portion about a longitudinal axis defined by the front housing portion to change the polarity of the two connector portions, each front housing portion including a ferrule and a latch.

12. A telecommunications connector according to claim 11, wherein the telecommunications connector is a duplex fiber optic connector and each ferrule terminates a separate optical fiber.

13. A telecommunications connector comprising:
at least one connector portion including a front housing portion coupled to a rear housing portion, the front housing portion defining a front end and a rear end, the front housing portion including a ferrule terminating a cable fixed to the at least one connector portion, the front housing portion further including a latch that is configured to contact a fiber optic adapter for locking the telecommunications connector to the fiber optic adapter when the telecommunications connector is inserted into the fiber optic adapter, wherein the latch is movable about a connection location on the front housing portion, the front housing portion further including a movable release trigger configured to contact the latch for moving the latch about the connection location for freeing the telecommunication connector from the fiber optic adapter, the movable release trigger defining a rear extension that extends rearward past the rear end of the front housing portion, the rear extension of the movable release trigger configured to be contacted for moving the latch for freeing the telecommunications connector from the fiber optic adapter, the movable release trigger non-removably attached to the front housing portion.

14. A telecommunications connector according to claim 13, wherein the movable release trigger is configured to be moved longitudinally toward the front end of the front housing portion for contacting and moving the latch for freeing the telecommunications connector from the fiber optic adapter.

15. A telecommunications connector according to claim 13, wherein the movable release trigger is configured to be moved longitudinally away from the front end of the front housing portion for contacting and moving the latch for freeing the telecommunications connector from the fiber optic adapter.

16. A telecommunications connector according to claim 15, wherein at least a portion of the movable release trigger slides over the latch to move the latch.

17. A telecommunications connector according to claim 13, wherein the movable release trigger is elastically and pivotally movable for contacting and moving the latch for freeing the telecommunications connector from the fiber optic adapter.

18. A telecommunications connector according to claim 13, further comprising a strain relief boot movably mounted to the telecommunications connector, the boot movable longitudinally relative to the front housing portion, the boot configured to contact the rear extension of the movable release trigger for moving the release trigger to cause the release trigger to move the latch about the connection location to free the telecommunications connector from the fiber optic adapter.

19. A telecommunications connector according to claim 13, wherein the telecommunications connector is a fiber optic connector and the ferrule terminates an optical fiber.

20. A telecommunications connector according to claim 13, wherein the at least one connector portion is configured to be latched to an LC format fiber optic adapter.

21. A telecommunications connector according to claim 13, wherein the telecommunications connector comprises two connector portions provided in a side-by-side relationship, each connector portion including a front housing portion coupled to a rear housing portion, wherein each front housing portion is rotatable relative to the rear housing portion about a longitudinal axis defined by the front housing portion to change the polarity of the two connector portions, each front housing portion including a ferrule and a latch.

22. A telecommunications connector according to claim 21, wherein the telecommunications connector is a duplex fiber optic connector and each ferrule terminates a separate optical fiber.

23. A telecommunications connector comprising:
at least one connector portion including a front housing portion coupled to a rear housing portion, the front housing portion defining a front end and a rear end, the front housing portion including a ferrule terminating a cable fixed to the at least one connector portion, the front housing portion further including a latch that is configured to contact a fiber optic adapter for locking the telecommunications connector to the fiber optic adapter when the telecommunications connector is inserted into the fiber optic adapter, wherein the latch is movable about a connection location on the front housing portion, the front housing portion further including a movable release trigger configured to contact the latch for moving the latch about the connection location for freeing the telecommunication connector from the fiber optic adapter, the movable release trigger defining a rear extension that extends rearward past the rear end of the front housing portion, the rear extension of the movable release trigger configured to be contacted for moving the latch for freeing the telecommunications connector from the fiber optic adapter, wherein a majority of a length of the movable release trigger is configured to overlap the latch.

24. A telecommunications connector according to claim 23, wherein the movable release trigger slides over the latch to move the latch.

25. A telecommunications connector according to claim 23, wherein the connection location is provided at a position generally near a front end of the latch.

26. A telecommunications connector according to claim 23, wherein the connection location is provided at a position in between a rear end of the latch and a front end of the latch.

27. A telecommunications connector according to claim 23, wherein the telecommunications connector is a fiber optic connector and the ferrule terminates an optical fiber.

28. A telecommunications connector according to claim 23, wherein the at least one connector portion is configured to be latched to an LC format fiber optic adapter.

29. A telecommunications connector according to claim 23, wherein the telecommunications connector comprises two connector portions provided in a side-by-side relationship, each connector portion including a front housing portion coupled to a rear housing portion, wherein each front housing portion is rotatable relative to the rear housing portion about a longitudinal axis defined by the front housing portion to change the polarity of the two connector portions, each front housing portion including a ferrule and a latch.

30. A telecommunications connector according to claim 29, wherein the telecommunications connector is a duplex fiber optic connector and each ferrule terminates a separate optical fiber.

31. A telecommunications connector according to claim 23, further comprising a strain relief boot movably mounted to the telecommunications connector, the boot movable longitudinally relative to the front housing portion, the boot configured to contact the rear extension of the latch for moving the latch to free the telecommunications connector from the fiber optic adapter.

32. A telecommunications connector according to claim 31, wherein the latch is configured such that the boot moves the latch to free the telecommunications connector from the fiber optic adapter when the boot is pulled longitudinally away from the front housing portion.

33. A telecommunications connector according to claim 32, wherein the boot is spring-biased toward the front end of the front housing portion.

* * * * *